(12) United States Patent
Yamashita

(10) Patent No.: US 8,289,445 B2
(45) Date of Patent: Oct. 16, 2012

(54) SIGNAL TRANSMITTING DEVICE AND SIGNAL TRANSMITTING METHOD

(75) Inventor: Shigeyuki Yamashita, Kanagawa (JP)

(73) Assignee: Sony Corporation, Tokyo (JP)

( * ) Notice: Subject to any disclaimer, the term of this patent is extended or adjusted under 35 U.S.C. 154(b) by 637 days.

(21) Appl. No.: 12/523,742

(22) PCT Filed: Nov. 19, 2008

(86) PCT No.: PCT/JP2008/070992
§ 371 (c)(1),
(2), (4) Date: Jul. 20, 2009

(87) PCT Pub. No.: WO2009/066679
PCT Pub. Date: May 28, 2009

(65) Prior Publication Data
US 2010/0007787 A1    Jan. 14, 2010

(30) Foreign Application Priority Data

Nov. 22, 2007 (JP) .................. P2007-303629
Feb. 22, 2008 (JP) .................. P2008-042003

(51) Int. Cl.
*H04N 7/01* (2006.01)
*H04N 5/38* (2006.01)

(52) U.S. Cl. ..... 348/441; 348/723; 348/515; 348/423.1; 348/425.4

(58) Field of Classification Search ............. 348/441, 348/723, 443, 459, 500, 512, 515, 427.1, 348/423.1, 425.4, 426.1; 370/535, 366
See application file for complete search history.

(56) References Cited

U.S. PATENT DOCUMENTS

| | | | |
|---|---|---|---|
| 2002/0191721 A1* | 12/2002 | Tokuhiro | 375/354 |
| 2005/0281296 A1* | 12/2005 | Yamashita | 370/537 |
| 2006/0210254 A1 | 9/2006 | Yamashita et al. | |
| 2007/0263937 A1 | 11/2007 | Rizko | |

FOREIGN PATENT DOCUMENTS

| | | |
|---|---|---|
| CN | 1722828 | 1/2006 |
| CN | 1867053 | 11/2006 |
| EP | 1 589 771 | 10/2005 |
| EP | 1 703 728 | 9/2006 |
| JP | 2002 176362 | 6/2002 |
| JP | 2002 300129 | 10/2002 |
| JP | 2004 88272 | 3/2004 |
| JP | 2005 328494 | 11/2005 |
| JP | 2006 262194 | 9/2006 |
| KR | 10-2006-0101354 | 9/2006 |

* cited by examiner

*Primary Examiner* — Jefferey Harold
*Assistant Examiner* — Jean W Desir
(74) *Attorney, Agent, or Firm* — Frommer Lawrence & Haug LLP; William S. Frommer

(57) ABSTRACT

Pixels extracted from each of an input video signal are thinned out in units of predetermined samples, and the thinned out samples are fetched in equal order frame by frame and mapped into active periods of first, second, third, and fourth sub-images conformable to the HD-SDI format. The mapped first, second, third, and fourth sub-images are each separated into a first-link transmission channel and a second-link transmission channel, and are thus mapped into eight channels. The mapped first, second, third, and fourth sub-images are converted in parallel. Parallel digital data items into which the sub-images are converted in parallel are then outputted.

7 Claims, 27 Drawing Sheets

FIG. 7

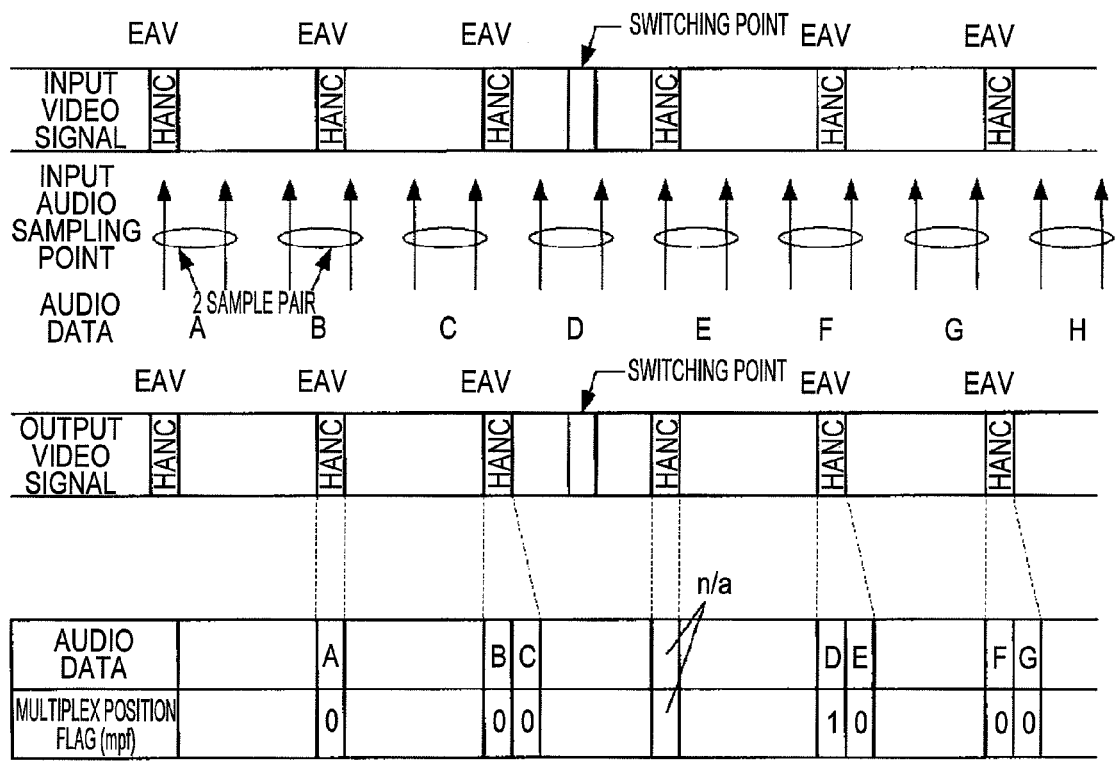

Notes:
(1) For example, in the case of a sample A, B, C, E, F, or G, since an auxiliary data packet is multiplexed into a horizontal auxiliary data space on a line next to the input timing of the audio sample, the multiplex position flag mpf is set to 0.
(2) Not Available (N/A) signifies that multiplexing an auxiliary data packet into a line next to a switching point is inhibited.
(3) In the case of a sample D, since an auxiliary data packet is multiplexed into a horizontal auxiliary data space on the second line with respect to the input timing of the audio sample, the multiplex position flag mpf is set to 1.

FIG. 8

|  | BIT NUMBER | UDW2 | UDW3 | UDW4 | UDW5 |
|---|---|---|---|---|---|
| CH1 | b9 (MSB)<br>b8<br>b7<br>b6<br>b5<br>b4<br>b3<br>b2<br>b1<br>b0 (LSB) | REVERSE OF b8<br>EVEN PARITY [1]<br>$aud_1$ 3<br>$aud_1$ 2<br>$aud_1$ 1<br>$aud_1$ 0 (LSB)<br>Z<br>0<br>0<br>0 | REVERSE OF b8<br>EVEN PARITY [1]<br>$aud_1$ 11<br>$aud_1$ 10<br>$aud_1$ 9<br>$aud_1$ 8<br>$aud_1$ 7<br>$aud_1$ 6<br>$aud_1$ 5<br>$aud_1$ 4 | REVERSE OF b8<br>EVEN PARITY [1]<br>$aud_1$ 19<br>$aud_1$ 18<br>$aud_1$ 17<br>$aud_1$ 16<br>$aud_1$ 15<br>$aud_1$ 14<br>$aud_1$ 13<br>$aud_1$ 12 | REVERSE OF b8<br>EVEN PARITY [1]<br>$P_1$<br>$C_1$<br>$U_1$<br>$V_1$<br>$aud_1$ 23 (MSB)<br>$aud_1$ 22<br>$aud_1$ 21<br>$aud_1$ 20 |

|  | BIT NUMBER | UDW6 | UDW7 | UDW8 | UDW9 |
|---|---|---|---|---|---|
| CH2 | b9 (MSB)<br>b8<br>b7<br>b6<br>b5<br>b4<br>b3<br>b2<br>b1<br>b0 (LSB) | REVERSE OF b8<br>EVEN PARITY [1]<br>$aud_2$ 3<br>$aud_2$ 2<br>$aud_2$ 1<br>$aud_2$ 0 (LSB)<br>0<br>0<br>0<br>0 | REVERSE OF b8<br>EVEN PARITY [1]<br>$aud_2$ 11<br>$aud_2$ 10<br>$aud_2$ 9<br>$aud_2$ 8<br>$aud_2$ 7<br>$aud_2$ 6<br>$aud_2$ 5<br>$aud_2$ 4 | REVERSE OF b8<br>EVEN PARITY [1]<br>$aud_2$ 19<br>$aud_2$ 18<br>$aud_2$ 17<br>$aud_2$ 16<br>$aud_2$ 15<br>$aud_2$ 14<br>$aud_2$ 13<br>$aud_2$ 12 | REVERSE OF b8<br>EVEN PARITY [1]<br>$P_2$<br>$C_2$<br>$U_2$<br>$V_2$<br>$aud_2$ 23 (MSB)<br>$aud_2$ 22<br>$aud_2$ 21<br>$aud_2$ 20 |

|  | BIT NUMBER | UDW10 | UDW11 | UDW12 | UDW13 |
|---|---|---|---|---|---|
| CH3 | b9 (MSB)<br>b8<br>b7<br>b6<br>b5<br>b4<br>b3<br>b2<br>b1<br>b0 (LSB) | REVERSE OF b8<br>EVEN PARITY [1]<br>$aud_3$ 3<br>$aud_3$ 2<br>$aud_3$ 1<br>$aud_3$ 0 (LSB)<br>Z<br>0<br>0<br>0 | REVERSE OF b8<br>EVEN PARITY [1]<br>$aud_3$ 11<br>$aud_3$ 10<br>$aud_3$ 9<br>$aud_3$ 8<br>$aud_3$ 7<br>$aud_3$ 6<br>$aud_3$ 5<br>$aud_3$ 4 | REVERSE OF b8<br>EVEN PARITY [1]<br>$aud_3$ 19<br>$aud_3$ 18<br>$aud_3$ 17<br>$aud_3$ 16<br>$aud_3$ 15<br>$aud_3$ 14<br>$aud_3$ 13<br>$aud_3$ 12 | REVERSE OF b8<br>EVEN PARITY [1]<br>$P_3$<br>$C_3$<br>$U_3$<br>$V_3$<br>$aud_3$ 23 (MSB)<br>$aud_3$ 22<br>$aud_3$ 21<br>$aud_3$ 20 |

|  | BIT NUMBER | UDW14 | UDW15 | UDW16 | UDW17 |
|---|---|---|---|---|---|
| CH4 | b9 (MSB)<br>b8<br>b7<br>b6<br>b5<br>b4<br>b3<br>b2<br>b1<br>b0 (LSB) | REVERSE OF b8<br>EVEN PARITY [1]<br>$aud_4$ 3<br>$aud_4$ 2<br>$aud_4$ 1<br>$aud_4$ 0 (LSB)<br>0<br>0<br>0<br>0 | REVERSE OF b8<br>EVEN PARITY [1]<br>$aud_4$ 11<br>$aud_4$ 10<br>$aud_4$ 9<br>$aud_4$ 8<br>$aud_4$ 7<br>$aud_4$ 6<br>$aud_4$ 5<br>$aud_4$ 4 | REVERSE OF b8<br>EVEN PARITY [1]<br>$aud_4$ 19<br>$aud_4$ 18<br>$aud_4$ 17<br>$aud_4$ 16<br>$aud_4$ 15<br>$aud_4$ 14<br>$aud_4$ 13<br>$aud_4$ 12 | REVERSE OF b8<br>EVEN PARITY [1]<br>$P_4$<br>$C_4$<br>$U_4$<br>$V_4$<br>$aud_4$ 23 (MSB)<br>$aud_4$ 22<br>$aud_4$ 21<br>$aud_4$ 20 |

Notes:
(1) The even parity is concerned with bits b0 to b7.
(2) Z denotes an AES block synchronization bit.
(3) Un denotes an AES user bit on channel n.
(4) Pn denotes an AES parity bit on channel n.
(5) aud(0-23) denotes 24-bit AES audio data on channel n.
(6) Vn denotes an effective indication bit of an AES sample on channel n.
(7) Cn denotes an AES channel status bit on channel n.
(8) The Vn, Un, Cn, and Pn values shall be identical to associated data values in an AES sub CPU 81 frame.

ECC5
ECC4
ECC3
ECC2
ECC1
ECC0

BIT SEQUENCE OF BITS b0 TO b7 OF EACH OF 24 WORDS
(FROM LEADING WORD OF ADF TO WORD UDW17)

FIG. 14
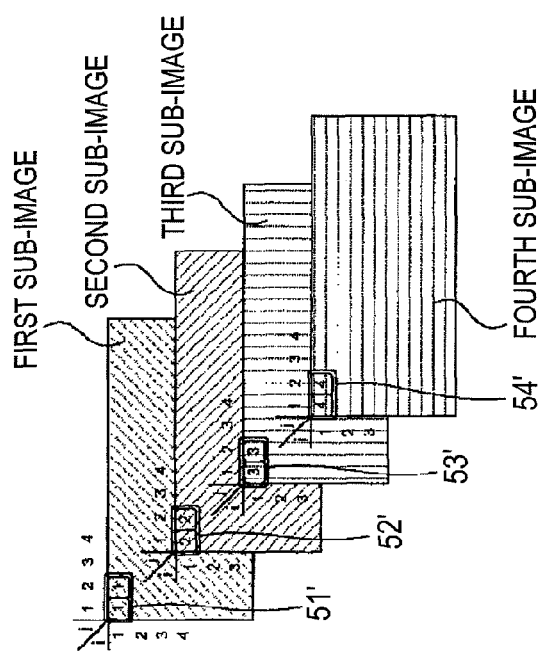
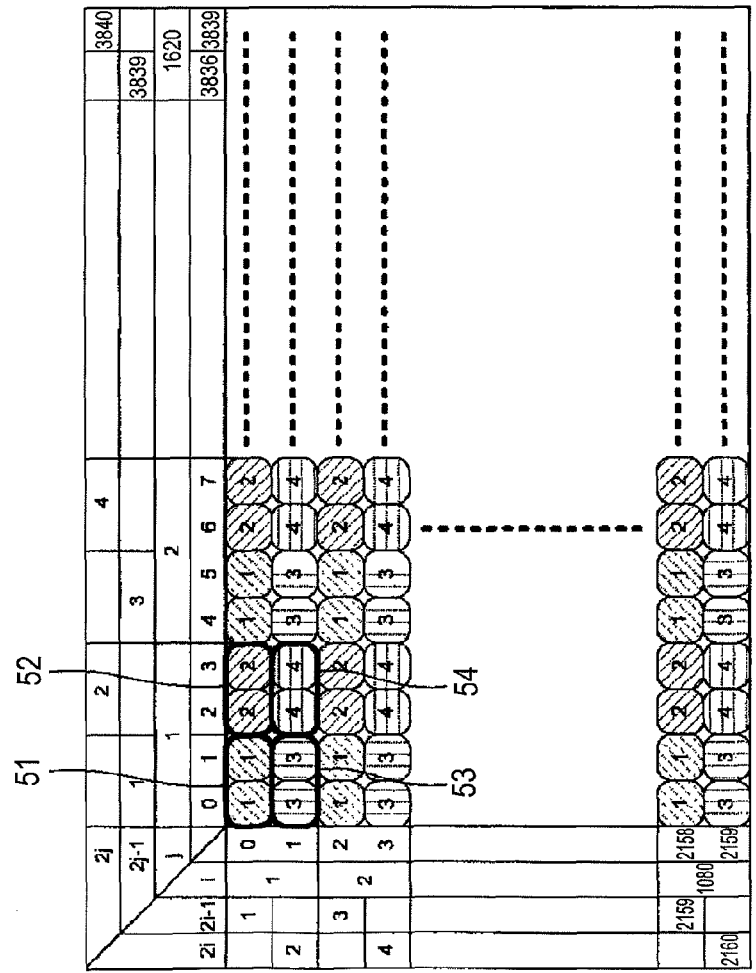

FIG. 18
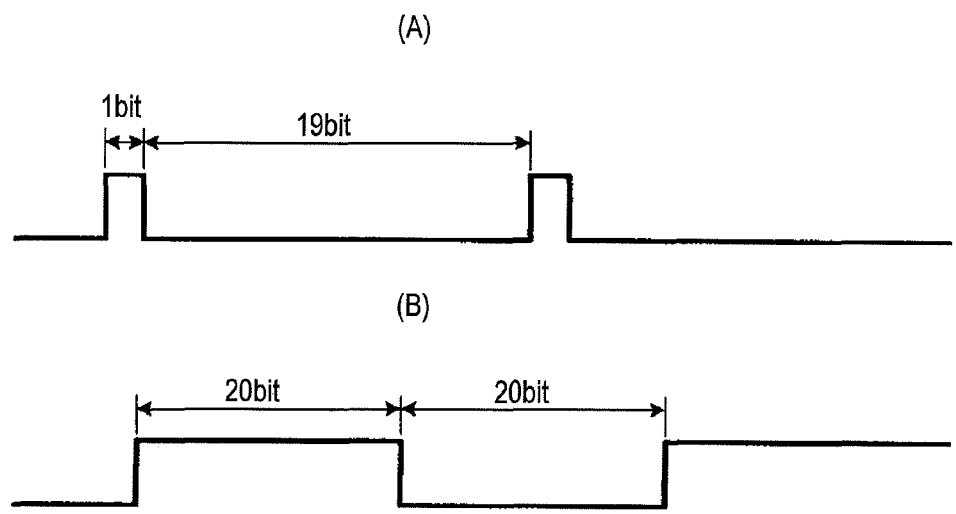
FIG. 19
FIG. 20
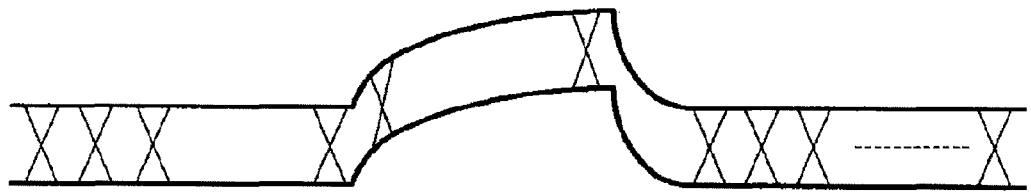
| Word | 9 (MSB) | 8 | 7 | 6 | 5 | 4 | 3 | 2 | 1 | 0 (LSB) |
|------|---------|---|---|---|---|---|---|---|---|---------|
| XYZ  | 1       | F | V | H | P3 | P2 | P1 | P0 | 0 | 0 |

Notes:
(1) Line numbers in the 1125 progressive mode specified in the SMPTE274M
(2) The 1125 interlacing digital line numbers are specified in the SMPTE274M.
   For transmission through an interface, the line numbers should be line numbers assigned to the interface but should not be line numbers assigned to an image.

LINE NUMBERS OF DUAL-LINK INTERFACE AND PACKAGE

SIGNAL TRANSMITTING DEVICE AND SIGNAL TRANSMITTING METHOD

TECHNICAL FIELD

The present invention relates to a signal transmitting device and method for serially transmitting a video signal, in which the number of pixels of one frame is equal to or larger than the number of pixels specified in the HD-SDI format, and an audio signal synchronous with the video signal.

BACKGROUND ART

Development of an image receiving system and an imaging system that handle an ultra-high-definition video signal which overwhelms a high-definition (HD) signal, that is, an existing video signal (image signal) in which one frame has 1920 samples on each of 1080 lines has made progress. For example, ultra-high-definition television (UHDTV) specifications that constitute a new-generation broadcasting method of handling four times or sixteen times larger the number of pixels than an existing HD broadcasting method have been proposed to or standardized by the International Telecommunication Union (ITU) or the Society of Motion Picture and Television Engineers (SMPTE). Video specifications having been proposed to the ITU or SMPTE describe a video signal of 3840 samples×2160 lines or 7680 samples×4320 lines that represents twice or four times larger the numbers of samples and lines than a signal of 1920 samples×1080 lines does. The specifications having been standardized by the ITU are called the large screen digital imagery (LSDI) standard, and the specifications having been proposed to the SMPTE are called the ultra-high-definition TV (UHDTV) standard. As for the UHDTV, signals listed in Table 1 below are specified.

TABLE 1

| System category | System name | Luminance per effective line or Number of R'G'B' samples | Number of effective lines per frame | Frame rate (Hz) |
|---|---|---|---|---|
| UHDTV1 | 3840 × 2160/50/P | 3840 | 2160 | 50 |
|  | 3840 × 2160/59.94/P | 3840 | 2160 | 60/1.001 |
|  | 3840 × 2160/60/P | 3840 | 2160 | 60 |
| UHDTV2 | 7680 × 4320/50/P | 7680 | 4320 | 50 |
|  | 7680 × 4320/59.94/P | 7680 | 4320 | 60/1.001 |
|  | 7680 × 4320/60/P | 7680 | 4320 | 60 |

As an interface for the signals, a method of transmitting a video signal over a transmission line of a bit rate of 10 Gbps using two channels has been proposed for a video signal of 3840 samples/60 frames conformable to the UHDTV standard. A method of transmitting a video signal over the transmission line of the bit rate of 10 Gbps using eight channels has been proposed for a video signal of 7680 samples/60 frames.

In a patent document 1, a technology for serially transmitting a 3840×2160/30P,30/1.001P/4:4:4/12-bit signal that is a kind of 4 k×2 k signal (an ultra-high-definition signal of 4 k samples×2 k lines) at a bit rate of 10 Gbps or more is disclosed. The wording of 3840×2160/30P refers to the number of pixels in a horizontal direction×the number of lines in a vertical direction/the number of frames per sec. The same applies to the remaining part of this description. Further, 4:4:4 refers to the ratio of a red signal R to a green signal G to a blue signal B in case of a primary-color signal transmission method, or refers to the ratio of a luminance signal Y to a first color-difference signal Cb to a second color-difference signal Cr in case of a color-difference signal transmission method.

Patent document 1: JP-A-2005-328494

DISCLOSURE OF THE INVENTION

Under the standard for an ultra-high-definition video signal, an audio signal also represents high-quality sounds. For example, for use in the UHDTV, transmission of audio (hereinafter 96 kHz audio), which is sampled at a sampling frequency of 96 kHz that is a sampling frequency twice higher than a sampling frequency of 48 kHz at which audio for an existing HDTV (hereinafter 48 kHz audio) is sampled, is presumably performed. As for audio signal channels, 24 channels are needed at most.

However, according to the conventional transmission method, even if the transmission method adopts an optical fiber, of which transmission rate is the highest, as a transmission line, transmission at about 10 Gbps at most can be performed on one channel. The transmission rate is therefore not high enough to transmit an ultra-high-definition video signal. The ultra-high-definition video signal has to be separated into and transmitted on multiple channels. An audio signal is transmitted using any of the channels. The audio signal synchronous with a video signal has to be transmitted at the same timing as the video signal is. Processing of synchronizing the video signal and audio signal with each other is therefore ineeded. In order to transmit 96 kHz audio on up to 24 channels synchronously with the video data separated into the multiple channels, some synchronizing processing is needed. This poses a problem in that a synchronizing processing constitution may become complex.

A method of multiplexing 48 kHz audio with another data and transmitting the resultant data at 10.692 Gbps and a specification for an audio phase have not been discussed. Likewise, a method of multiplexing 96 kHz audio with another data and transmitting the resultant data at 10.692 Gbps and a specification for an audio phase have not been discussed.

The present invention is intended to break through the foregoing situation. An object of the present invention is to allow a receiving side to readily perform synchronizing processing of video and audio when an audio signal is transmitted synchronously with a high-definition video signal.

In order to solve the aforesaid problems, a signal transmitting device in accordance with the present invention is adapted to a signal transmitting device that transmits an input video signal, in which one frame includes a larger number of pixels than the number of pixels specified in the HD-SDI format, and an audio signal inputted synchronously with the input video signal.

As for the constitution, a mapping unit, a parallel-to-serial conversion unit, and a transmission unit are included.

The mapping unit thins out pixel samples, which are extracted from each frame of an input video signal in units of predetermined samples, fetches the thinned out pixel samples in even order frame by frame, and maps the pixel samples into active periods of first, second, third, and fourth sub-images conformable to the HD-SDI format. Further, the mapping unit maps an audio signal into a blanking period of the first sub-image, separates each of the mapped first, second, third, and fourth sub-images into a first-link transmission channel and a second-link transmission channel, and thus maps the sub-images into eight channels.

The parallel-to-serial conversion unit serially converts the mapped first, second, third, and fourth sub-images.

An output unit outputs serial digital data into which the sub-images are serially converted by the parallel-to-serial conversion unit.

A signal transmitting method in accordance with the present invention is adapted to a signal transmitting method of transmitting an input video signal in which one frame has a larger number of pixels than the number of pixels specified in the HD-SDI format.

As for processing, mapping processing, parallel-to-serial conversion processing, and transmitting processing are carried out.

The mapping processing is to thin out pixel samples, which are extracted from each frame of an input video signal, in units of predetermined samples, fetch the thinned out pixel samples in even order frame by frame, and map the pixel samples into active periods of first, second, third, and fourth sub-images conformable to the HD-SDI format. Further, the mapping processing is to separate each of the mapped first, second, third, and fourth sub-images into a first-link transmission channel and a second-link transmission channel, and thus map the sub-images into eight channels.

The parallel-to-serial conversion processing is to serially convert the first, second, third, and fourth sub-images mapped through mapping processing.

Output processing is to output serial digital data into which the sub-images are serially converted through the parallel-to-serial conversion processing.

According to the present invention, an audio signal is appended to a serial digital video signal conformable to the HD-SDI format in a case where: a video signal is mapped into multiple serial digital video signals conformable to the HD-SDI format; and the digital video signals are separated into and transmitted on multiple channels. If the mapping is achieved so that the phase relationship between the video signal on the channel, on which the audio signal is appended, and the audio signal will be nearly identical to the phase relationship between the original input video signal and input audio signal, the synchronous relationship between the video signal and audio signal is sustained. This obviates the necessity of the processing of keeping a synchronous phase among multiple channels into and on which the video signal is separated and transmitted. A constitution for synchronizing processing is simplified.

BRIEF DESCRIPTION OF THE DRAWINGS

FIG. 7 is an explanatory diagram showing the relationship between a multiplex position flag (mpf) and multiplex positions of an audio data packet.

FIG. 8 is an explanatory diagram showing an example of bit assignment of audio data (channel n).

FIG. 14 is an explanatory diagram showing an example in which samples contained in one frame of a 4 k×2 k signal are mapped into first to fourth sub-images.

FIG. 18A and FIG. 18B are diagrams showing pathological patterns.

FIG. 19 is a diagram showing a warp of a base line in an ac-coupled transmission system.

FIG. 20 is a diagram showing an XYZ code in a timing reference signal SAV.

BEST MODE FOR CARRYING OUT THE INVENTION

Referring to FIG. 1 to FIG. 27, the first embodiment of the present invention will be described below.

Figure 1:
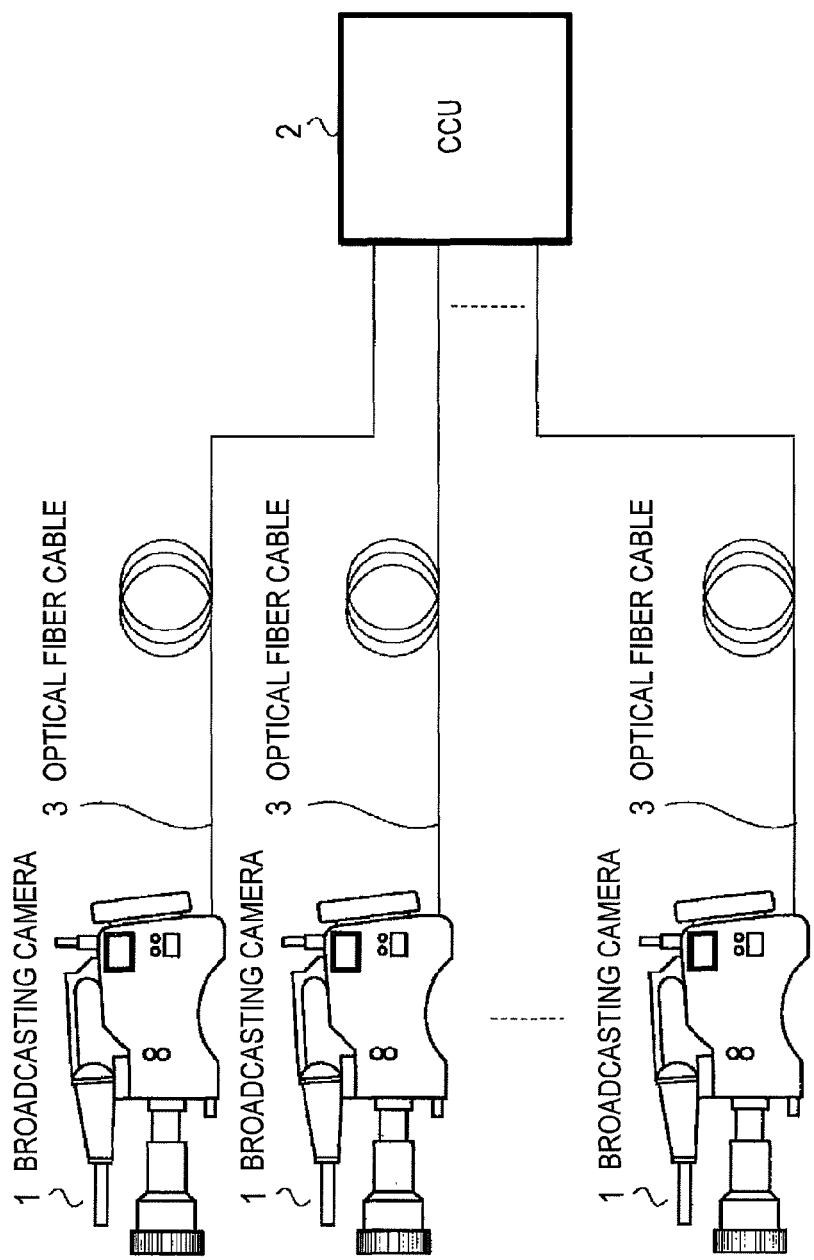
FIG. 1 is a diagram showing the overall constitution of a camera transmission system for television broadcasting stations in accordance with the first embodiment of the present invention.

FIG. 1 is a diagram showing an overall constitution of a camera transmission system for television broadcasting stations to which the present embodiment is adapted. The camera transmission system includes multiple broadcasting cameras 1 and a camera control unit (CCU) 2. The broadcasting cameras 1 are connected to the CCU 2 over optical fiber cables 3.

The broadcasting cameras 1 are cameras that share the same constitution and function as signal transmitting devices 5 that produce and transmit as a 4 k×2 k signal (an ultra-high-definition signal of 4 k samples×2 k lines) a 3840×2160/24P, 25P,30P/4:4:4,4:2:2,4:2:0/10,12-bit signal equivalent to an LSDI signal.

The CCU 2 is a unit that controls each of the broadcasting cameras 1, receives a video signal from each of the broadcasting camera 1, or transmits a video signal (return video) to be used to display on a monitor of each of the broadcasting camera 1 a picture which is being picked up by any other broadcasting camera 1. The CCU 2 functions as a signal receiving apparatus that receives a video signal from each of the broadcasting cameras 1.

Figure 2:
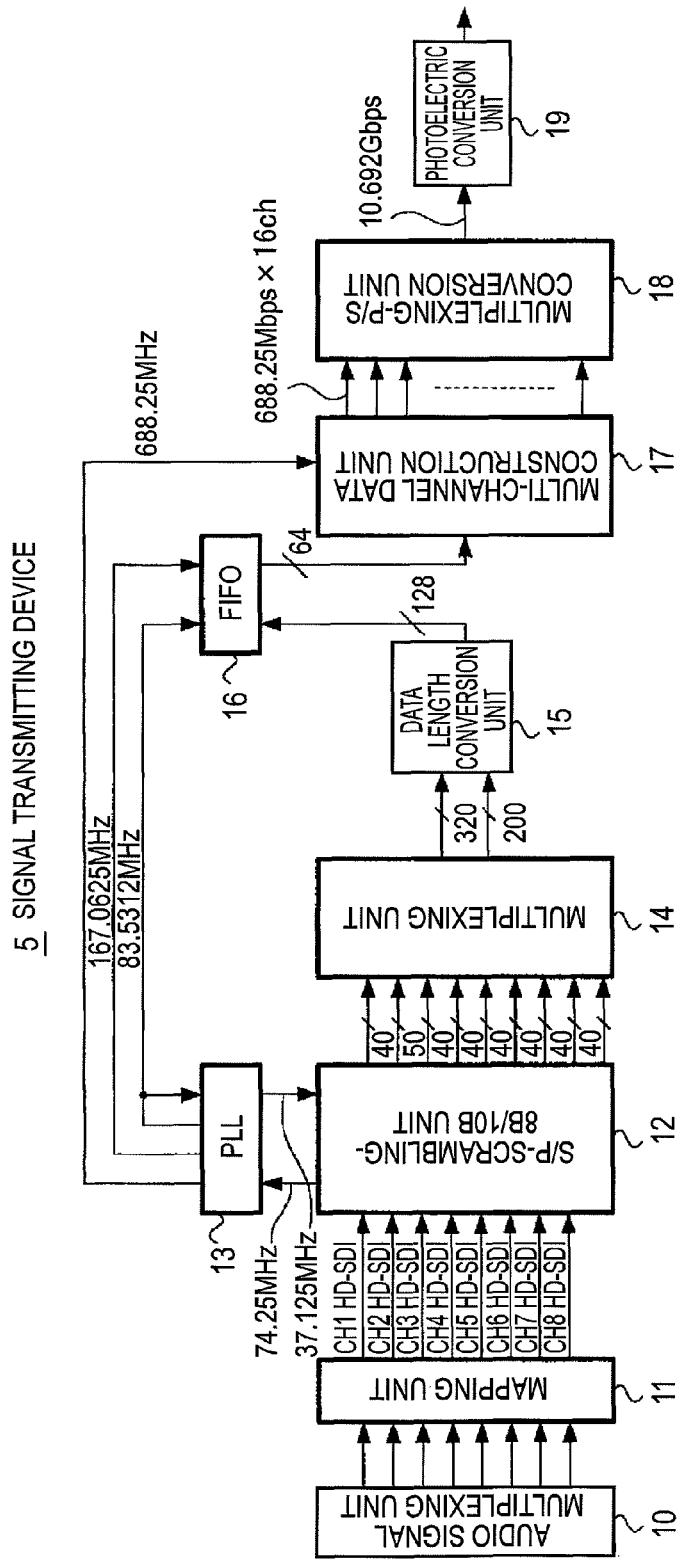
FIG. 2 is a block diagram showing an example of an internal constitution of a signal transmitting device out of the circuitry of a broadcasting camera.
Figure 3:
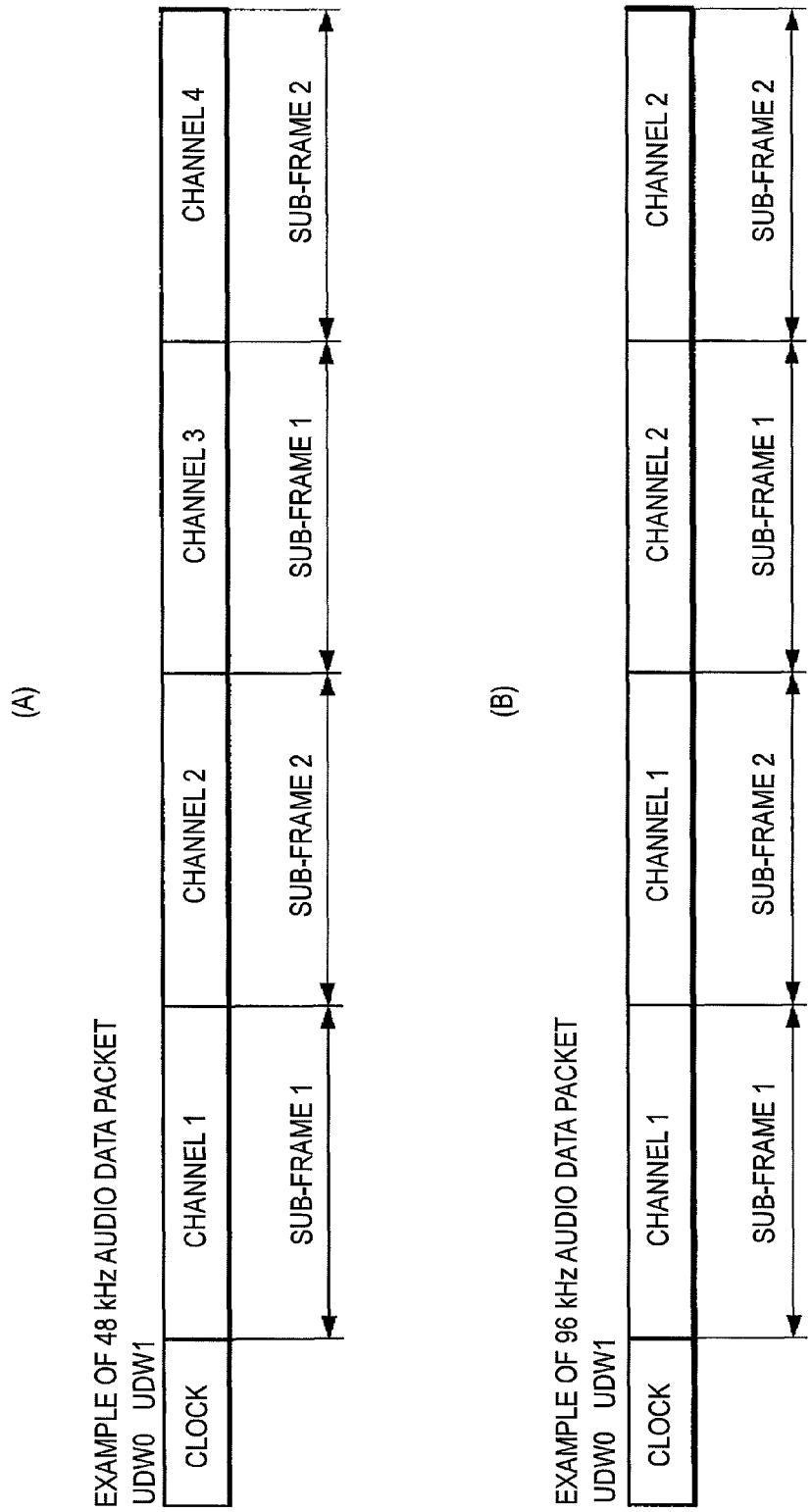
FIG. 3A and FIG. 3B are explanatory diagrams showing examples of an audio data packet.

FIG. 2 is a block diagram showing a portion of the circuitry of the broadcasting camera 1 relating to the present embodiment. A 3840×2160/24P,25P,30P/4:4:4,4:2:2,4:2:0/10,12-bit signal produced by an imaging unit and a video signal processing unit (not shown) incorporated in the broadcasting camera 1 is transmitted to an audio signal multiplexing unit 10. The audio signal multiplexing unit 10 (hereinafter may be called a formatter) multiplexes an audio data packet into a horizontal auxiliary data space succeeding a video line from which audio is sampled at a predetermined frequency (for example, 48 kHz or 96 kHz). The audio signal multiplexing unit 10 transmits an input video signal, to which the audio data packet is multiplexed, to a mapping unit 11.

A 3840×2160/24P,25P,30P/4:4:4,4:2:2,4:2:0/10,12-bit signal is a signal of 36 bits wide having a green (G) data stream, a blue (B) data stream, and a red (R) data stream, each of which has a word length of 12 bits, synchronized and juxtaposed. One frame period is any of 1/24 sec, 1/25 sec, and 1/30 sec, and an effective line period for 2160 lines is included in the one frame period.

Within an effective line (horizontal line) period of an input video signal, a timing reference signal EAV (end of active video), a line number LN, an error detection code CRC, a horizontal blanking period (an interval for an auxiliary data space or undefined word data), a timing reference signal SAV (start of active video), and an active line representing an interval for video data are arranged. The number of samples on the active line is 3840. To the active line of a G data stream, a B data stream, or an R data stream, G, B, or R video data is allocated.

FIG. 3A and FIG. 3B show examples of the construction of an audio data packet employed when audio data sampled at a predetermined sampling frequency is transmitted using sub-frames 1 and 2. The data structure of the audio data packet is determined in conformity with the SMPTE299M.

FIG. 3A shows an example of an audio data packet employed when audio sampled at a sampling frequency of 48 kHz (hereinafter 48 kHz audio) is transmitted using sub-frames 1 and 2. The audio data packet includes a clock field containing two words of user data words (UDW) and data items on channels CH1 to CH4 containing four words of user data words. The user data word includes three kinds of data items of audio clock phase data (CLK), audio data items (CHn), and an error correction code (ECC). The contents of data items contained in the user data word will be described later.

FIG. 3B schematically shows an example of an audio data packet employed when audio sampled at a sampling frequency of 96 kHz (hereinafter 96 kHz audio) is transmitted using sub-frames 1 and 2. The audio data packet includes a clock region containing two words of user data words and data items on channels CH1 and channels CH2 containing four words of user data words.

Into the clock region, as shown in Table 2 presented below, audio clock phase data is inserted. An audio sample position at which audio data is sampled responsively to a predetermined sampling clock is defined as a sample position that comes at 74.25 MHz within a horizontal (H) period of each frame. An audio data packet is multiplexed to a horizontal (H) blanking period by the formatter.

TABLE 2

| Bit number | UDW0 | UDW1 |
|---|---|---|
| b9 (MSB) | Reverse of b8 | Reverse of b8 |
| b8 | Even parity[1] | Even parity[1] |
| b7 | ck7 audio clock phase data | Reserved (set to 0) |
| b6 | ck6 audio clock phase data | Reserved (set to 0) |
| b5 | ck5 audio clock phase data | ck12 audio clock phase data (MSB) |
| b4 | ck4 audio clock phase data | mpf multiplex position flag |
| b3 | ck3 audio clock phase data | ck11 audio clock phase data |
| b2 | ck2 audio clock phase data | ck10 audio clock phase data |
| b1 | ck1 audio clock phase data | ck9 audio clock phase data |
| b0 (LSB) | ck0 audio clock phase data (LSB) | ck8 audio clock phase data |

[1]The even parity is appended to bits b0 to b7.

An audio phase signifying where audio data is generated is determined based on audio clock phase data listed in Table 2 (SMPTE299M). The audio clock phase data is determined with 13 bits ck0 to ck12. The ck0 to ck12 bits represent the number of video clocks indicating a difference between a pixel sample, which is inputted simultaneously with an audio sample inputted to the formatter, and the first word of EAV of a video data stream. In a system employing a sampling clock of 74.25 MHz conformable to the SMPTE292M, the ck0 to ck12 bits can manage by up to audio phases of 8192 clocks within a horizontal period into which audio samples sampled responsively to a predetermined sampling clock are inserted.

A sub-frame format is defined in FIG. 2 of the AES3-2003 that is a digital audio serial interface standard. In addition, it is specified as a frame format that in the case of a two-channel mode, 2-channel 48 kHz audio is transmitted using successive sub-frames 1 and 2. In the SMPTE299M, it is specified that 48 kHz audio is assigned to channels 1 and 2.

In the past, as shown in FIG. 3A, the channel 1 is transmitted using the sub-frame 1 and the channel 2 is transmitted using the sub-frame 2. Further, a channel 3 is transmitted using the sub-frame 1, and a channel 4 is transmitted using the sub-frame 2.

In the present embodiment, since the signal transmitting device 5 is compatible with equipment on a receiving side in terms of signal transmission, successive audio samples (first and second audio samples) of 96 kHz audio on a channel 1 are assigned to channels 1 and 2 respectively. Further, successive audio samples of 96 kHz audio on a channel 2 are assigned to channels 3 and 4. As shown in FIG. 3B, among the successive samples of 96 kHz audio on one channel, the samples on the channel 1 are characteristically transmitted using successive sub-frames 1 and 2, and the samples on the channel 2 are transmitted using the successive sub-frames 1 and 2.

Further, in the present embodiment, a clock phase defined in an audio data packet of 96 kHz audio is determined with the position of the second audio sample out of two successive audio samples (first and second audio samples). Now, an example of processing to be performed by the audio signal multiplexing unit 10 will be described below in relation to a data format.

Figure 4:
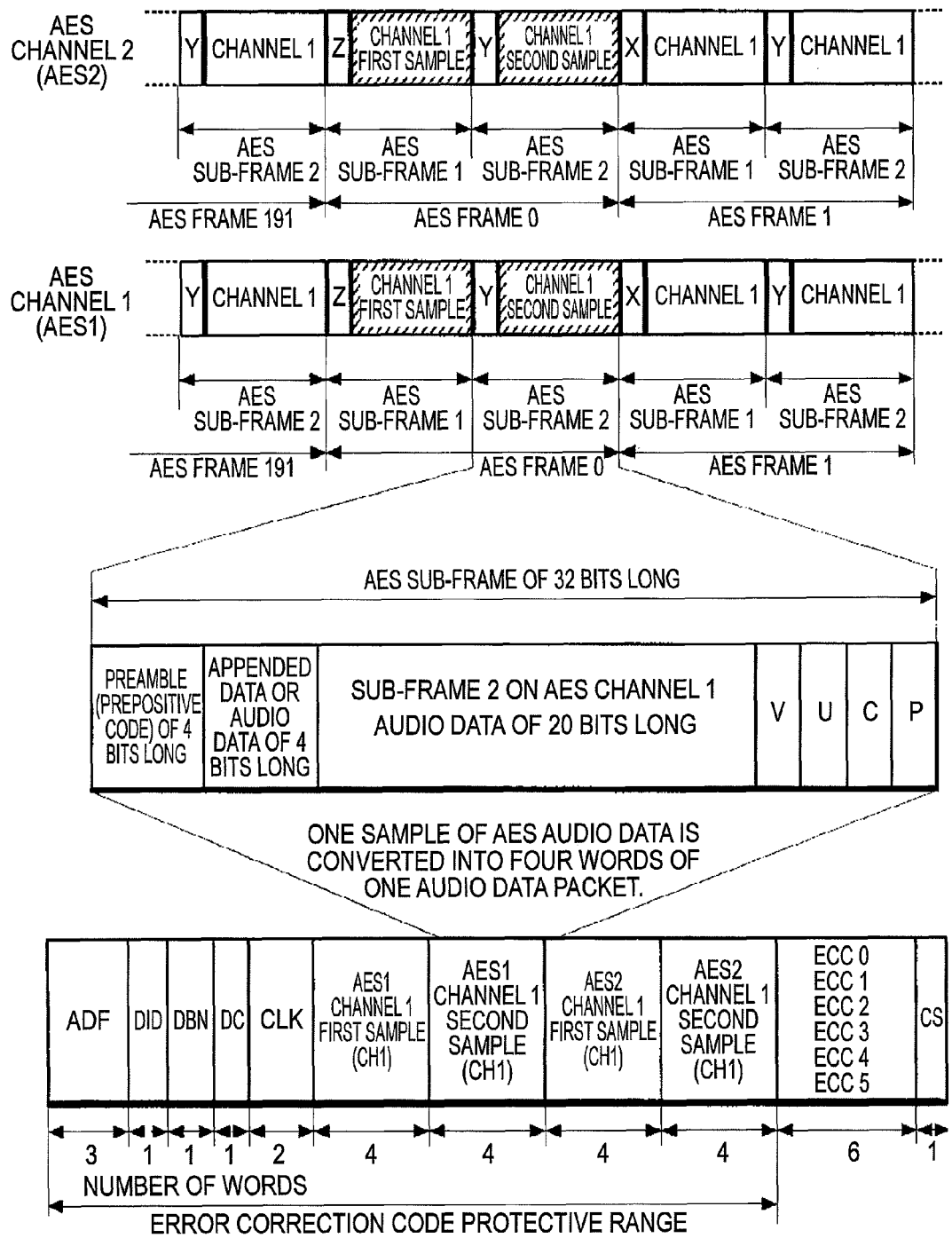
FIG. 4 is an explanatory diagram showing the relationship between AES audio and an audio data packet.

FIG. 4 shows the relationship between 96 kHz audio, which is defined under the AES3 and relates to the present embodiment, and an audio data packet.

AES audio refers to all VUCP data items contained in an AES digital stream specified in the AES3, audio data, and appended data.

A frame having two AES sub-frames juxtaposed in the order of an AES sub-frame on a channel 1 and an AES sub-frame on a channel 2 shall be called an AES frame.

AES sub-frames 1 and 2 are successively assigned to a 96 kHz audio channel 2 defined by the AES3 as shown in FIG. 4. First and second audio samples sampled at a predetermined frequency are successively assigned to successive channels 2. Likewise, the AES sub-frames 1 and 2 are successively assigned to an AES channel 1, and the first and second audio samples are assigned to the successive channels 1. The AES sub-frame includes 32 bits while having a preamble of 4 bits long, appended data or audio data of 4 bits long, audio data of 20 bits long, and V, U, C, and P data items of 1 bit long arranged in that order.

Audio data has a field of a first audio sample (CH1) on an AES channel 1, a field of a second audio sample (CH2) on the AES channel 1, a field of a first audio sample (CH3) on an AES channel 2, a field of a second audio sample (CH4) on the AES channel 2, and an ECC field between a clock (CLK) and a checksum field.

An audio data packet includes an auxiliary data flag (ADF) field, a data ID (DID) field, a data block number (DBN) field, a data count (DC) field, an audio clock phase data (CLK) field, a user data word (UDW) field, and a checksum (CS) field. An audio data packet is multiplexed into a horizontal auxiliary data space of a Cb/Cr data stream.

The number of audio samples per video frame of audio synchronous with video is listed in Table 3 below. In Table 3, the numbers of audio samples for each frame are listed in relation to audio sampling rates of 32.0 kHz, 44.1 kHz, 48.0 kHz, and 96.0 kHz.

TABLE 3

| | Number of samples per frame | | | | |
| --- | --- | --- | --- | --- | --- |
| Audio sampling rate | 30.00 (Number of frames per sec) | 30.00/1.001 (Number of frames per sec) | 25.00 (Number of frames per sec) | 24.00 (Number of frames per sec) | 24.00/1.001 (Number of frames per sec) |
| 96.0 kHz | 3200/1 | 16016/5 | 3840/1 | 4000/1 | 4004/1 |
| 48.0 kHz | 1600/1 | 8008/5 | 1920/1 | 2000/1 | 2002/1 |
| 44.1 kHz | 1470/1 | 147147/100 | 1764/1 | 3675/2 | 147147/80 |
| 32.0 kHz | 3200/3 | 16016/15 | 1280/1 | 4000/3 | 4004/3 |

Table 4 lists examples of channel assignment for user data words UDWn. Herein, UDWn refers to the n-th user data word. As seen from Table 4, channels to be assigned vary depending on whether an audio sampling rate is any of 32.0 kHz, 44.1 kHz, and 48.0 kHz or the audio sampling rate is 96.0 kHz.

TABLE 4

| Audio sampling rate | Audio group 1 | | | |
| --- | --- | --- | --- | --- |
| | UDW2 to UDW5 CH1 | UDW6 to UDW9 CH2 | UDW10 to UDW13 CH3 | UDW14 to UDW17 CH4 |
| 32.0 kHz, 44.1 kHz, or 48.0 kHz | AES1 Channel 1 | AES1 Channel 2 | AES2 Channel 1 | AES2 Channel 2 |
| 96.0 kHz | AES1 Channel 1 First sample | AES1 Channel 1 Second sample | AES2 Channel 1 First sample | AES2 Channel 1 Second sample |

Figure 5:
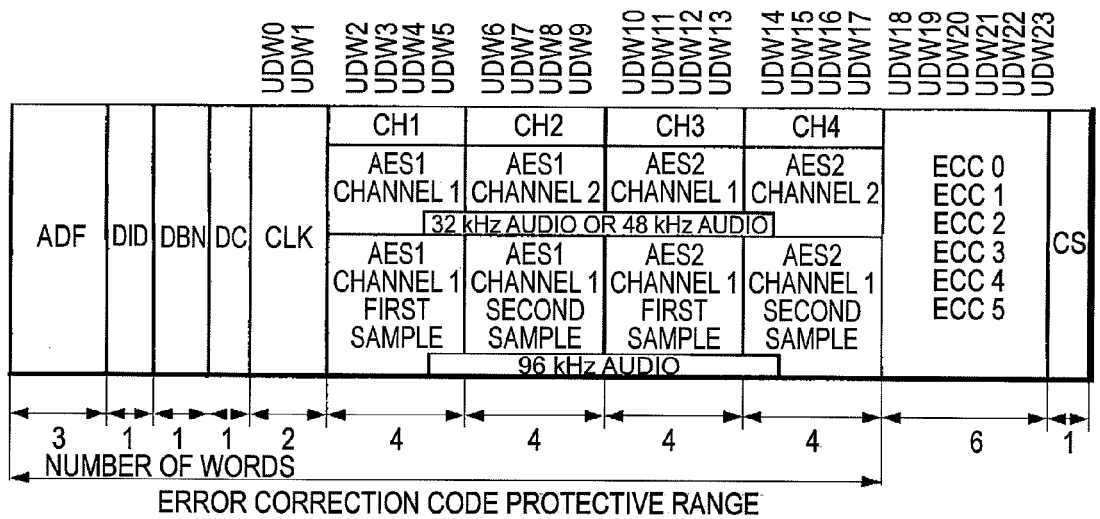
FIG. 5 is an explanatory diagram showing an example of the structure of an audio data packet.

FIG. 5 shows an example of a construction of an audio data packet in accordance with the present embodiment.

Data items to be placed on channels CH1 to CH4 differ between a case where audio is sampled at a sampling frequency of 32 kHz (hereinafter called 32 kHz audio), audio is sampled at 44.1 kHz (hereinafter called 44.1 kHz audio), or audio is 48 kHz audio, and a case where audio is 96 kHz audio.

Figure 6:
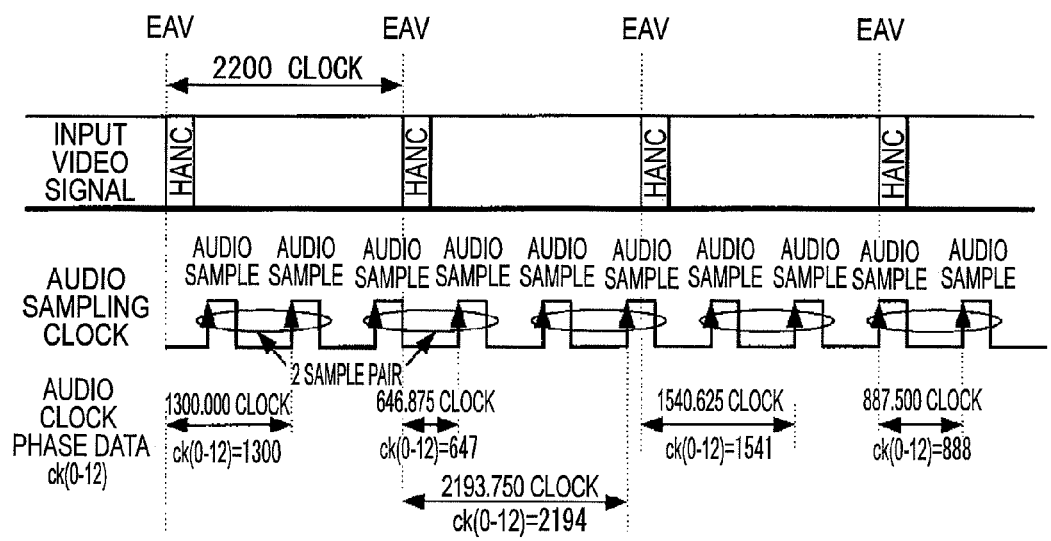
FIG. 6 is an explanatory diagram showing the relationship among a video line, digital audio sampling points, and audio clock phase data.

FIG. 6 shows the relationship among a video line, digital audio data sampling points, and audio clock phase data which relate to the present embodiment. Herein, the sampling points for 96 kHz audio will be described.

The sampling points for an input audio signal are determined by two successive audio samples (first and second audio samples) in relation to each audio data. The two samples may be called a sample pair. In the case of 96 kHz audio, an audio clock phase is determined at the position of the second audio sample out of the sample pair with respect to the leading word of EAV. The clock phase is calculated by dividing the time from the leading word of EAV to the position, at which audio is generated, by a pulse duration of a 74.25 MHz clock or 74.25/1.001 MHz clock conformable to the HB-SDI. Further, the clock phase is written in audio clock phase data items ck0 to ck12 (0 to 8191) of a user data word UDW0 or UDW1. The audio data packet is multiplexed into a horizontal auxiliary data space, which succeeds a video line from which audio is sampled, by the audio signal multiplexing unit 10. If the horizontal auxiliary data space succeeds a switching point, the audio data packet is delayed for one horizontal line and then multiplexed in order to prevent an error in data.

A multiplex position flag (mpf) to be defined in a 96 kHz audio data packet is designated with the position of the second audio sample out of a sample pair as a reference. The multiplex position of an audio data packet is the position of a line next to a horizontal line on which an audio sampling point arises, or the position of a horizontal auxiliary data space (HANC) (may be called a horizontal auxiliary period) that lags by one line behind the horizontal line. The multiplex position flag (mpf) specifies the relationship between the multiplex position of an audio data packet and associated video data.

FIG. 7 shows an example of a specification for the multiplex position flag (mpf) for 96 kHz audio in accordance with the present embodiment. Audio data items A to H each include a sample pair.

In the case of the audio data A, B, C, E, F, or G, the audio data packet is multiplexed into a horizontal auxiliary data space on a horizontal line next to the position of the second audio sample out of the sample pair. At this time, mpf=0 is established.

The audio signal multiplexing unit 10 recognizes the first horizontal line on which sampling points at which an audio signal is sampled at a predetermined frequency arise, and multiplexes and inserts an audio data packet, which includes first and second audio samples, into an auxiliary data space on the second horizontal line succeeding the first horizontal line. An input video signal to which the audio data packet is multiplexed and inserted is fed to the mapping unit 11. By the way, when the horizontal auxiliary data space succeeds a switching point, the audio signal multiplexing unit 10 delays the audio data packet for the next line and then multiplexes it for the purpose of preventing an error in data. Specifically, the audio signal multiplexing unit 10 multiplexes and inserts the first audio data packet, which contains the first and second audio samples, and the second audio packet, which succeeds the first audio data packet, into an auxiliary data space on the third horizontal line succeeding the second horizontal line.

N/A (Not Available) signifies that an audio data packet cannot be multiplexed into a horizontal auxiliary data space on a line next to a switching point. For example, at a sampling point of audio data D, a switching point arises in an input video signal. Therefore, the audio data packet is multiplexed into a horizontal auxiliary data space on the second line with respect to the audio sample input timing. The multiplex position flag mpf is therefore set to 1.

FIG. 8 shows an example of bit assignment of audio data (channel n).

In FIG. 8, values determined for respective bits of each of user data words assigned to channels CH1 to CH4 respectively. All the bits of an AES sub-frame are transmitted using four successive user data words (UDW4$n$-2, UDW4$n$-1, UDW4$n$, and UDW4$n$+1). The user data words UDW2 to UDW17 are used for an audio data packet and always assigned to channels CHn.

The user data words UDW2 to UDW5 are assigned to a channel CH1, the user data words UDW6 to UDW9 are assigned to a channel CH2, and the user data words UDW10 to UDW13 are assigned to a channel CH3. The user data words UDW14 to UDW17 are assigned to a channel CH4.

The constructions of the user data words UDW18 to UDW23 are shown in Table 5.

TABLE 5

| Bit number | UDW18 ECC0 | UDW19 ECC1 | UDW20 ECC2 | UDW21 ECC3 | UDW22 ECC4 | UDW23 ECC5 |
|---|---|---|---|---|---|---|
| b9 (MSB) | Reversal of b8 | Reversal of b8 | Reversal of b8 | Reversal of b8 | Reversal of b8 | Reversal of b8 |
| b8 | Even parity[1] | Even parity[1] | Even parity[1] | Even parity[1] | Even parity[1] | Even parity[1] |
| b7 | ecc0 7 | ecc1 7 | ecc2 7 | ecc3 7 | ecc4 7 | ecc5 7 |
| b6 | ecc0 6 | ecc1 6 | ecc2 6 | ecc3 6 | ecc4 6 | ecc5 6 |
| b5 | ecc0 5 | ecc1 5 | ecc2 5 | ecc3 5 | ecc4 5 | ecc5 5 |
| b4 | ecc0 4 | ecc1 4 | ecc2 4 | ecc3 4 | ecc4 4 | ecc5 4 |
| b3 | ecc0 3 | ecc1 3 | ecc2 3 | ecc3 3 | ecc4 3 | ecc5 3 |
| b2 | ecc0 2 | ecc1 2 | ecc2 2 | ecc3 2 | ecc4 2 | ecc5 2 |
| b1 | ecc0 1 | ecc1 1 | ecc2 1 | ecc3 1 | ecc4 1 | ecc5 1 |
| b0 (LSB) | ecc0 0 | ecc1 0 | ecc2 0 | ecc3 0 | ecc4 0 | ecc5 0 |

[1]The even parity is appended to bits b0 to b7.

An error correction code (ECC) is used to correct or detect an error in each of twenty-four words ranging from the first word of ADF to the user data word UDW17. The error correction code is a BCH code.

The BCH code is produced from a bit sequence of bits b0 to b7. The ECC includes six words and is determined by a productive equation presented below.

$$ECC(X)=(X+1)(X^5+X^2+1)=X^6+X^5+X^3+X^2+X+1 \quad [\text{Mathematics 1}]$$

Figure 9:
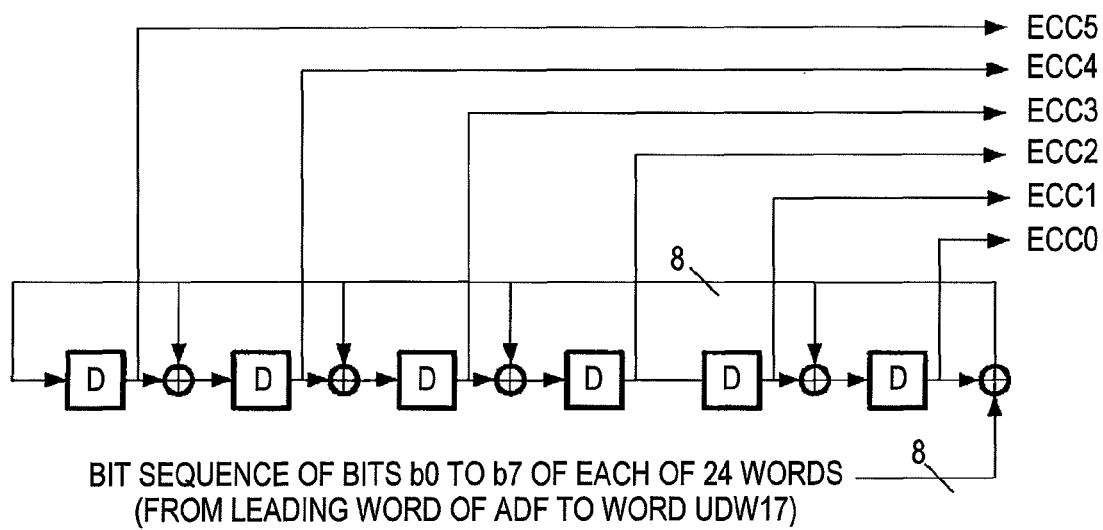
FIG. 9 is an explanatory diagram showing an example of a block diagram of a BCH code production circuit.

FIG. 9 shows an example of a constitution of a BCH code production circuit or is a block diagram thereof.

Error correction codes ECC0 to ECC5 are each determined using a bit sequence of bits b0 to b7 of each of twenty-four words as an input.

Figure 10:
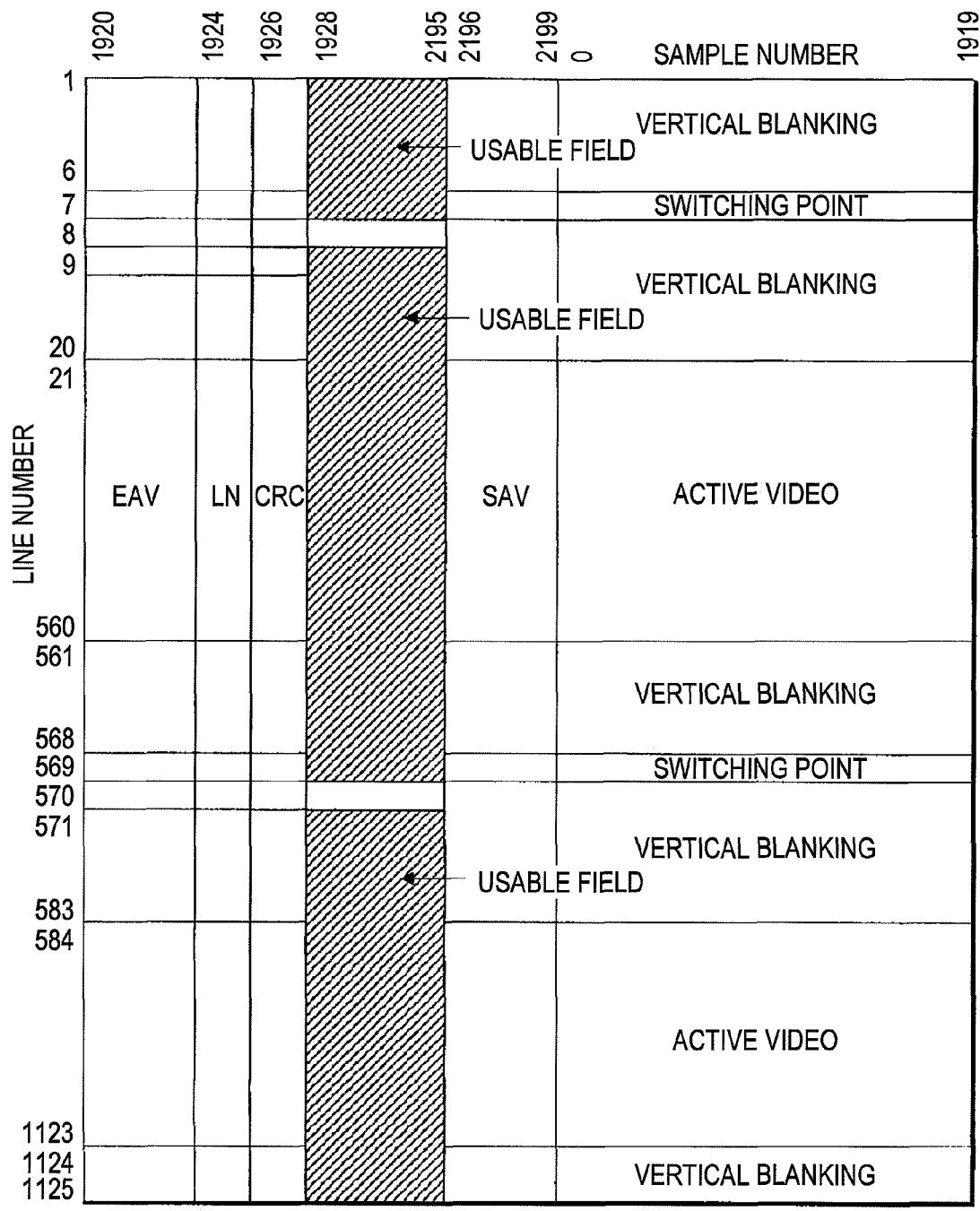
FIG. 10 is an explanatory diagram showing an auxiliary database (1080/60I system) for a Cr/Cb data stream usable for transmission of an audio data packet.

FIG. 10 shows an auxiliary data space of a Cr/Cb data stream usable for transmission of an audio data packet.

A horizontal line in an input video signal includes a timing reference signal representing an effective line period of the input video signal, and an auxiliary data space representing a horizontal blanking period on the horizontal line. A horizontal auxiliary data space of a data stream of a color difference signal (Cr/Cb) is used to originate an audio data packet. The horizontal auxiliary data space includes samples ranging from sample number 1928 to sample number 2195, and serves as a field on each of lines ranging from line number 1 to line number 7, from line number 9 to line number 569, and from line number 571 to line number 1125. However, the horizontal auxiliary data space on a line next to a switching point is not used for multiplexing.

The number of times of multiplexing by which an audio data packet is allocated to one horizontal auxiliary data space is limited to Na/2 or less calculated according to a conditional equation presented below. At this time, the number of audio samples No per channel that can be multiplexed to one horizontal auxiliary data space is deduced from the Na value (number of audio samples) according to a conditional equation below.

$$No=\text{int}(\text{number of audio samples per line})+1 \quad [\text{Mathematics 2}]$$

If No×(the number of all lines per video frame−the number of switching lines per video frame)<(the number of audio samples per video frame) is established, $$Na=No+1$$

Otherwise, Na=No
If an audio sampling rate is 96 kHz, $$Na=\text{even function}(Na)$$

Notes:
(1) the number of audio samples per line=an audio sampling rate/a line frequency
(2) The even function is a function for rounding a value up to the nearest even value.

A multiplex position is the position of a horizontal auxiliary data space next to a space in which an audio sample is generated, or a horizontal auxiliary data space succeeding the next space.

Now, an audio control packet will be described below.

Figure 11:
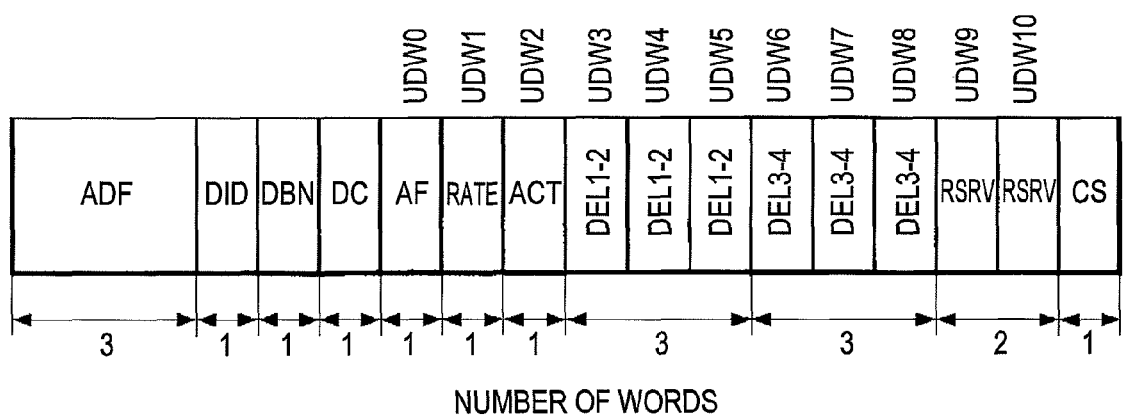
FIG. 11 is an explanatory diagram showing an example of the structure of an audio control packet.
Figure 12:
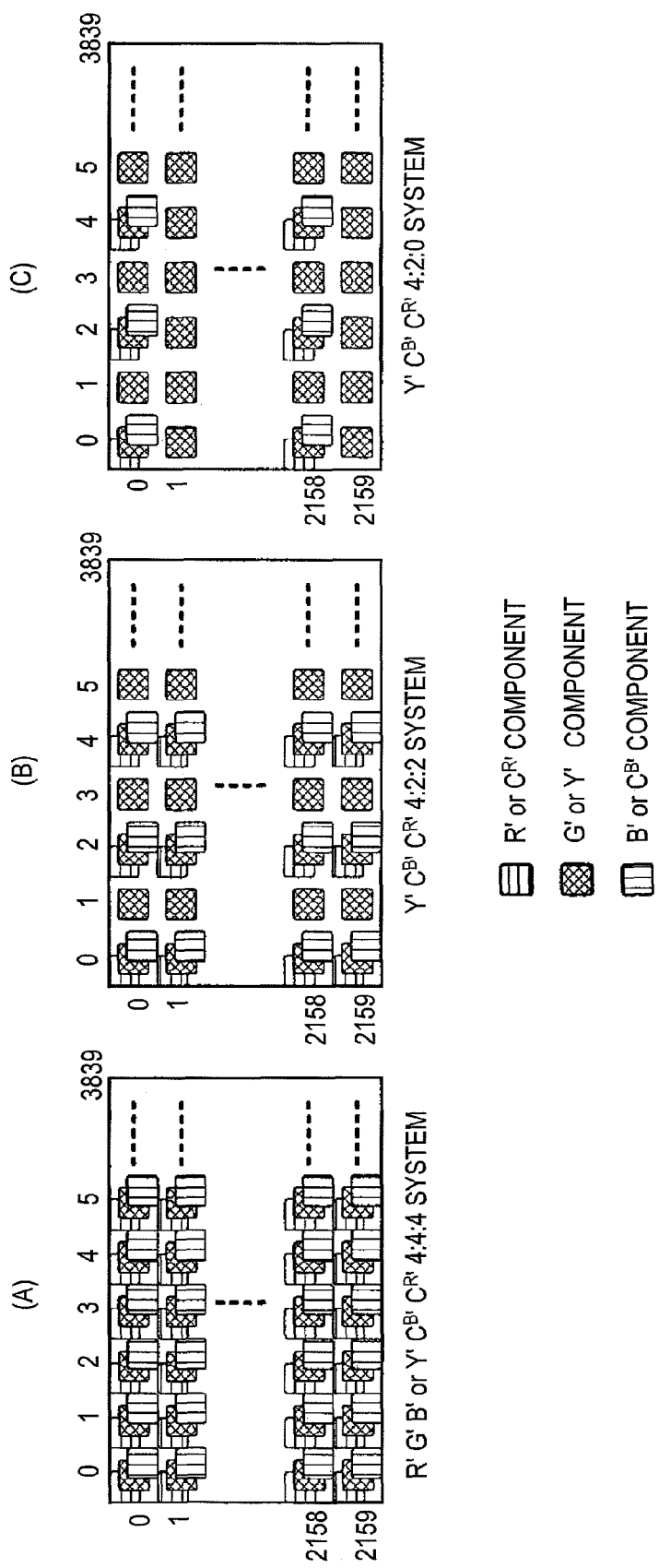
FIG. 12A, FIG. 12B, and FIG. 12C are diagrams showing examples of a sample structure for one frame conformable to the UHDTV standard.

FIG. 11 shows a construction of an audio control packet.

The audio control packet is originated once for one field in an interlacing system or originated once for one frame in a progressive system while being placed in a horizontal auxiliary data space of a Y data stream on the second line succeeding a switching point. The horizontal auxiliary data space includes samples of sample numbers 1928 to 2195, and serves as a field on each of lines of line numbers 9 and 571. One audio control packet includes eleven user data words all the time.

The audio control packet is formatted according to the SMPTE291M standard. The audio control packet includes an auxiliary data flag (ADF) field, a data ID (DID) field, a data block number (DBN) field, a data count (DC) field, a user data word (UDW) field, and a checksum (CS) field.

The data ID DID is defined as follows: data items on channels CH1 to CH4 are classified into audio group 1; data items on channels CH5 to CH8 are classified into audio group 2; data items on channels CH9 to CH12 are classified into audio group 3; and data items on channels CH13 to CH16 are classified into audio group 4.

A construction of a user data word (UDWn) will be described below.

The construction of a user data word UDW0 is shown in Table 6. Table 6 shows bit assignment for audio frame number data (AF).

TABLE 6

| Bit number | UDW0<br>AF |
|---|---|
| b9 (MSB) | Reverse of b8 |
| b8 | f8 audio frame formatter (MSB) |
| b7 | f7 audio frame formatter |
| b6 | f6 audio frame formatter |
| b5 | f5 audio frame formatter |
| b4 | f4 audio frame formatter |
| b3 | f3 audio frame formatter |
| b2 | f2 audio frame formatter |
| b1 | f1 audio frame formatter |
| b0 (LSB) | f0 audio frame formatter (LSB) |

Construction of user data word UDW0 (bit assignment for audio frame number data (AF))

The audio frame number data (AF) represents a sequential number of a video frame. When the number of audio samples per video frame does not have an integral relationship, the audio frame number data represents the number of a frame among all video frames (audio frame sequence). The first number of the sequence is 1, and the last number equals the length of the audio frame sequence. When the audio frame number data AF is zero, it means that a frame number is unavailable.

In an audio frame sequence that begins with 1 and lasts to the end, the number of audio samples per frame is basically expressed with either of two integers of m and m+1.

Basically, an odd-numbered audio frame (1, 2, 5, etc.) includes audio samples that numbers a larger one of the two integers. An even-numbered audio frame (2, 4, 6, etc.) includes audio samples that numbers a smaller one of the two integers. However, there are exceptional frames as shown in Table 7.

TABLE 7

| Television system | Sampling rate (kHz) | Frame sequence | Basic number of samples | | Exception | |
|---|---|---|---|---|---|---|
| | | | Number of samples in odd-numbered audio frame (m) | Number of samples in even-numbered audio frame (m + 1) | Frame number | Number of samples |
| 30.00 frames/sec | 96.0 | 1 | 3200 | | None | |
| | 48.0 | 1 | 1600 | | None | |
| | 44.1 | 1 | 1470 | | None | |
| | 32.0 | 3 | 1067 | 1066 | None | |
| 30.00/1.001 frames/sec | 96.0 | 5 | 3204 | 3202[1] | None | |
| | 48.0 | 5 | 1602 | 1601 | None | |
| | 44.1 | 100 | 1472 | 1471 | 23, 47, 71 | 1471 |
| | 32.0 | 15 | 1068 | 1067 | 4, 8, 12 | 1068 |

[1] Number of successive samples in an audio data packet

Exceptions in an Audio Frame Sequence

As shown in Table 7, sampling rates, frame sequences, basic numbers of samples, and exceptions are listed in association with television systems that support 30.00 frames/sec and 30.00/1.001 frames/sec respectively.

Table 8 shows a construction of a user data word UDW1. A RATE code for determining a sampling rate is assigned to the user data word UDW1. The RATE word defines the sampling rate for all channel pairs. What is referred to as a channel pair is two digital audio channels for signals from the same AES audio signal source.

TABLE 8

| Bit number | UDW1 RATE |
|---|---|
| b9 (MSB) | Reverse of b8 |
| b8 | Reserved (set to 0) |
| b7 | Reserved (set to 0) |
| b6 | Reserved (set to 0) |
| b5 | Reserved (set to 0) |
| b4 | Reserved (set to 0) |
| b3 | X2 (MSB) |
| b2 | X1 Rate code |
| b1 | X0 (LSB) |
| b0 (LSB) | asx 0 = synchronous audio |
| | 1 = asynchronous audio |

Construction of user data word UDW1 (bit assignment for RATE word)

Assignment of the RATE code to the bits b1, b2, and b3 of the user data word UDW1 shown in Table 8 is shown in Table 9.

TABLE 9

| X2 | X1 | X0 | Sampling rate |
|---|---|---|---|
| 0 | 0 | 0 | 48.0 kHz |
| 0 | 0 | 1 | 44.1 kHz |
| 0 | 1 | 0 | 32.0 kHz |
| 1 | 0 | 0 | 96.0 kHz |
| 0 | 1 | 1 | Reserved |
| 1 | 0 | 1 | Reserved |
| 1 | 1 | 0 | Reserved |
| 1 | 1 | 1 | Free run |

Table 9 demonstrates that when the X2, X1, and X0 fields in the user data word UDW1 specify 1, 0, and 0 respectively, a sampling rate is 96.0 kHz.

Table 10 shows a construction of a user data word UDW2.

TABLE 10

| Bit number | UDW2 ACT |
|---|---|
| b9 (MSB) | Reverse of b8 |
| b8 | Even parity[1] |
| b7 | Reserved (set to 0) |
| b6 | Reserved (set to 0) |
| b5 | Reserved (set to 0) |
| b4 | Reserved (set to 0) |
| b3 | a4 used: 1, unused: 0 (CH4) |
| b2 | a3 used: 1, unused: 0 (CH3) |
| b1 | a2 used: 1, unused: 0 (CH2) |
| b0 (LSB) | a1 used: 1, unused: 0 (CH1) |

[1] The even parity is appended to bits b0 to b7.

The Act word represents an active channel. As for a1 to a4 bits, a bit associated with an active channel (any of channels CH1 to CH4) belonging to the audio group is set to 1, and bits associated with inactive channels are set to 0.

Constructions of user data words UDW3 to UDW8 are shown in Table 11. Bits for DELm-n words are assigned to the user data words UDW3 to UDW8.

TABLE 11

| Bit number | UDW3 | UDW4 DEL1-2 | UDW5 | UDW6 | UDW7 DEL3-4 | UDW8 |
|---|---|---|---|---|---|---|
| b9 (MSB) | Reverse of b8 | Reverse of b8 | Reverse of b8 | Reverse of b8 | Reverse of b8 | Reverse of b8 |
| b8 | del 7 | del 16 | del 25 (±) | del 7 | del 16 | del 25 (±) |
| b7 | del 6 | del 15 | del 24 (MSB) | del 6 | del 15 | del 24 (MSB) |
| b6 | del 5 | del 14 | del 23 | del 5 | del 14 | del 23 |
| b5 | del 4 | del 13 | del 22 | del 4 | del 13 | del 22 |
| b4 | del 3 | del 12 | del 21 | del 3 | del 12 | del 21 |

TABLE 11-continued

| Bit number | UDW3 | UDW4 DEL1-2 | UDW5 | UDW6 | UDW7 DEL3-4 | UDW8 |
|---|---|---|---|---|---|---|
| b3 | del 2 | del 11 | del 20 | del 2 | del 11 | del 20 |
| b2 | del 1 | del 10 | del 19 | del 1 | del 10 | del 19 |
| b1 | del 0 (LSB) | del 9 | del 18 | del 0 (LSB) | del 9 | del 18 |
| b0 (LSB) | e | del 8 | del 17 | e | del 8 | del 17 |

The DELm-n word represents a magnitude of delay of video accumulated during audio processing (accumulated audio processing delay). The magnitude of delay relates to a channel pair of channels CHm and CHn, and is determined with an audio sampling clock interval as a reference unit. Each of twenty-six bits DEL0 to DEL25 is expressed with a two's complement. A positive value signifies that video leads audio.

Constructions of user data words UDW9 and UDW10 are shown in Table 12. Bits of reserve (RSRV) words are assigned to the user data words UDW9 and UDW10. Data fields for the user data words UDW9 and UDW10 are used when specifications are modified in the future.

TABLE 12

| Bit number | UDW9 RSRV | UDW10 RSRV |
|---|---|---|
| b9 (MSB) | Reverse of b8 | Reverse of b8 |
| b8 | Reserved (set to 0) | Reserved (set to 0) |
| b7 | Reserved (set to 0) | Reserved (set to 0) |
| b6 | Reserved (set to 0) | Reserved (set to 0) |
| b5 | Reserved (set to 0) | Reserved (set to 0) |
| b4 | Reserved (set to 0) | Reserved (set to 0) |
| b3 | Reserved (set to 0) | Reserved (set to 0) |
| b2 | Reserved (set to 0) | Reserved (set to 0) |
| b1 | Reserved (set to 0) | Reserved (set to 0) |
| b0 (LSB) | Reserved (set to 0) | Reserved (set to 0) |

FIG. 12A, FIG. 12B, and FIG. 12C are explanatory diagrams showing examples of sample structures specified in the UHDTV standard. A frame employed in a description to be made in conjunction with FIG. 12A to FIG. 12C is a frame formed with 3840 samples×2160 samples (hereinafter may be called a frame of a 4 k×2 k signal).

The sample structures specified in the UHDTV standard include three kinds of structures described below. Incidentally, a signal denoted by a symbol with a dash such as R', G', or B' is a signal having undergone gamma correction or the like.

FIG. 12A shows an example employed in a R'G'B', Y'Cb'Cr',4:4:4 system. In this system, all pixel samples contain R, G, and B components or Y, Cb, and Cr components.

FIG. 12B shows an example employed in a Y'Cb'Cr',4:2:2 system. In this system, even-numbered samples contain Y, Cb, and Cr components, and odd-numbered samples contain a Y component.

FIG. 12C shows an example employed in a Y'Cb'Cr',4:2:0 system. In this system, even-numbered samples contain Y, Cb, and Cr components, and odd-numbered samples contain a Y component. Further, the Y component (having Cb and Cr components thinned out) is contained on even-numbered lines.

Figure 13:
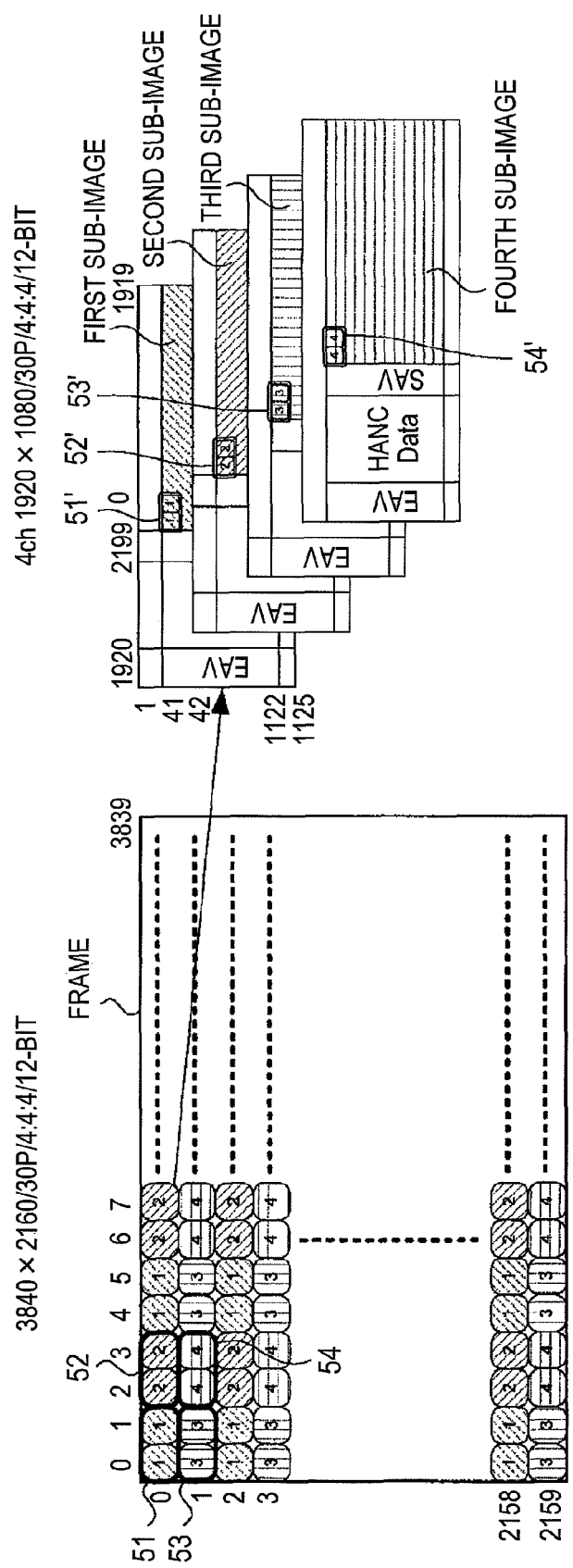
FIG. 13 is an explanatory diagram showing an example in which samples contained in one frame of a 4 k×2 k signal are mapped into first to fourth sub-images.

FIG. 13 is an explanatory diagram showing an example in which pixel samples constituting a frame of a 4 k×2 k signal are mapped into first to fourth sub-images by the mapping unit 11. Herein, the mapping unit 11 thins out pixel samples, which are extracted from each frame of an input video signal, in units of predetermined samples. In this example, two adjoining samples on the same line are thinned out. The mapping unit 11 fetches the thinned out samples in even order frame by frame, and maps them into active periods of the first, second, third, and fourth sub-images conformable to the HD-SDI format. At this time, the mapping unit 11 maps an audio signal into a blanking period of the first sub-image.

At this time, the mapping unit 11 maps two pixel samples on an even-numbered line in each of frames alternately to the first sub-image and second sub-image, and maps two pixel samples on an odd-numbered line in each of the frames alternately to the third sub-image and fourth sub-image. Characteristically, the phase of the audio signal to be mapped relative to the first sub-image, which is attained when the audio signal is mapped into the blanking period of the first sub-image, is nearly squared with the phase of an input audio signal relative to an input video signal.

As a result, pixel samples constituting one frame of a 2 k×1 k signal are mapped into the first to fourth sub-images that is arisen in the active period defined in the HD-SDI format.

Further, the mapping unit 11 separates each of the mapped first, second, third, and fourth sub-images into a first-link transmission channel (LinkA) and a second-link transmission channel (LinkB), and thus maps the sub-images to eight channels.

The mapping unit 11 is a circuit that maps a frame, which is formed with a 3840×2160/24P,25P,30P/4:4:4,4:2:2,4:2:0/10,12-bit video signal, into HD-SDI signals on channels CH1 to CH8 (eight channels of channels CH1, CH3, CH5, and CH7 belonging to a link LinkA, and channels CH2, CH4, CH6, and CH8 belonging to a link LinkB), which permit a bit rate of 1.485 Gbps or 1.485 Gbps/1.001 (hereinafter, simply, 1.485 Gbps), in conformity with the SMPTE435.

The mapping unit 11 in this example maps a video signal, which is extracted from a frame formed with 3840 pixel samples and 2160 lines, into first to fourth sub-images, and maps the video signal, which is mapped into the first to fourth sub-images, into HD-SDI signals on eight channels CH1 to CH8 permitting a bit rate of 1.485 Gbps.

As shown in FIG. 13, a frame formed with a 4 k×2 k signal includes multiple pixel samples. Herein, the position of each of pixel samples in a frame is expressed as (sample number, line number).

A first sample group 51 including two adjoining samples at positions (0,0) and (1,0) on the 0th line is mapped into positions (0,42) and (1,42) in the first sub-image and indicated as a first sample group 51'.

A second sample group 52 including two adjoining samples at positions (2,0) and (3,0) on the 0th line is mapped into positions (0,42) and (1,42) in the second sub-image and indicated as a second sample group 52'.

A third sample group 53 including two adjoining samples at positions (0,1) and (1,1) on the first line is mapped into positions (0,42) and (1,42) in the third sub-image and indicated as a third sample group 53'.

A fourth sample group 54 including two adjoining samples at positions (2,1) and (3,1) on the first line is mapped into positions (0,42) and (1,42) in the fourth sub-image and indicated as a fourth sample group 54'.

Referring to FIG. 14, a concrete example of mapping will be described below on the assumption that a position of each of samples included in a frame of a 4 k×2 k signal or each of the first to fourth sub-images is expressed as (sample number, line number). Referring to FIG. 14, an example in which the first to fourth sub-images are extracted and mapped will be described below.

As shown in FIG. 14, to one frame of a 4 k×2 k signal, i, 2i and 2i−1 values are assigned in a line direction, and j, 2j, and 2j−1 values are assigned in a sample direction.

To the first to fourth sub-images, i values are assigned in the line direction, and j values are assigned in the sample direction.

Assuming that two samples adjoining on the same line are regarded as a sample group, the mapping unit 11 maps a first sample group, which is located at the 2j−1-th (where j denotes a natural number) sample group position on the 2i−1-th (where i denotes a natural number) line in a frame, into the j-th sample group position on the i-th line in the first sub-image.

The mapping unit 11 maps a second sample group, which is located at the 2j-th sample group position on the 2i−1-th line in the frame, into the j-th sample group position on the i-th line in the second sub-image.

The mapping unit 11 maps a third sample group, which is located at the 2j−1-th sample group position on the 2i-th line in the frame, into the j-th sample group position on the i-th line in the third sub-image.

The mapping unit 11 maps a fourth sample group, which is located at the 2j-th sample group position on the 2i-th line in the frame, into the j-th sample group position on the i-th line in the fourth sub-image.

A reason why samples are mapped as mentioned above will be described below.

A frame is constructed according to any of the RGB, YCbCr/4:4:4 mode, YCbCr/4:2:2 mode, or YCbCr/4:2:0 mode.

If a frame can be transmitted over a single HD-SDI cable, no problem would occur. However, since an amount of data increases, it is impossible to transmit the frame over the single HD-SDI cable. Therefore, pixel samples of the frame (information including a video signal) are appropriately extracted and transmitted in the form of multiple sub-images.

As shown in FIG. 12A, if a frame is constructed in the RGB-or-YCbCr-and-4:2:2 mode, whichever of pixel samples are extracted, original video can be reproduced.

As shown in FIG. 12B, if a frame is constructed in the YCbCr/4:2:2, odd-numbered samples contain only information Y on a luminance signal. Therefore, each of the odd-numbered samples is mapped together with an adjoining even-numbered sample (including CbCr) into a sub-image. Thus, video can be directly reproduced from the sub-image, though the resolution of the original video of the frame is degraded.

As shown in FIG. 12C, if a frame is constructed in the YCbCr/4:2:0, odd-numbered samples contain only information Y on a luminance signal. Further, only the information Y on the luminance signal is contained in odd-numbered lines. Therefore, each of the odd-numbered samples is mapped together with an adjoining even-numbered sample (including CbCr) into a sub-image. Thus, video can be reproduced directly from the sub-image, though the resolution of the original video of the frame is degraded. Only the information Y on the luminance signal is contained in the third and fourth sub-images. For checking video to be reproduced, video representing luminance values alone poses no problem.

When samples are mapped into the first to fourth sub-images, a frame can be transmitted over a dual link (two HD-SDI cables). Therefore, the samples mapped into the first to fourth sub-images can be transmitted over a total of eight HD-SDI cables.

Figure 15:
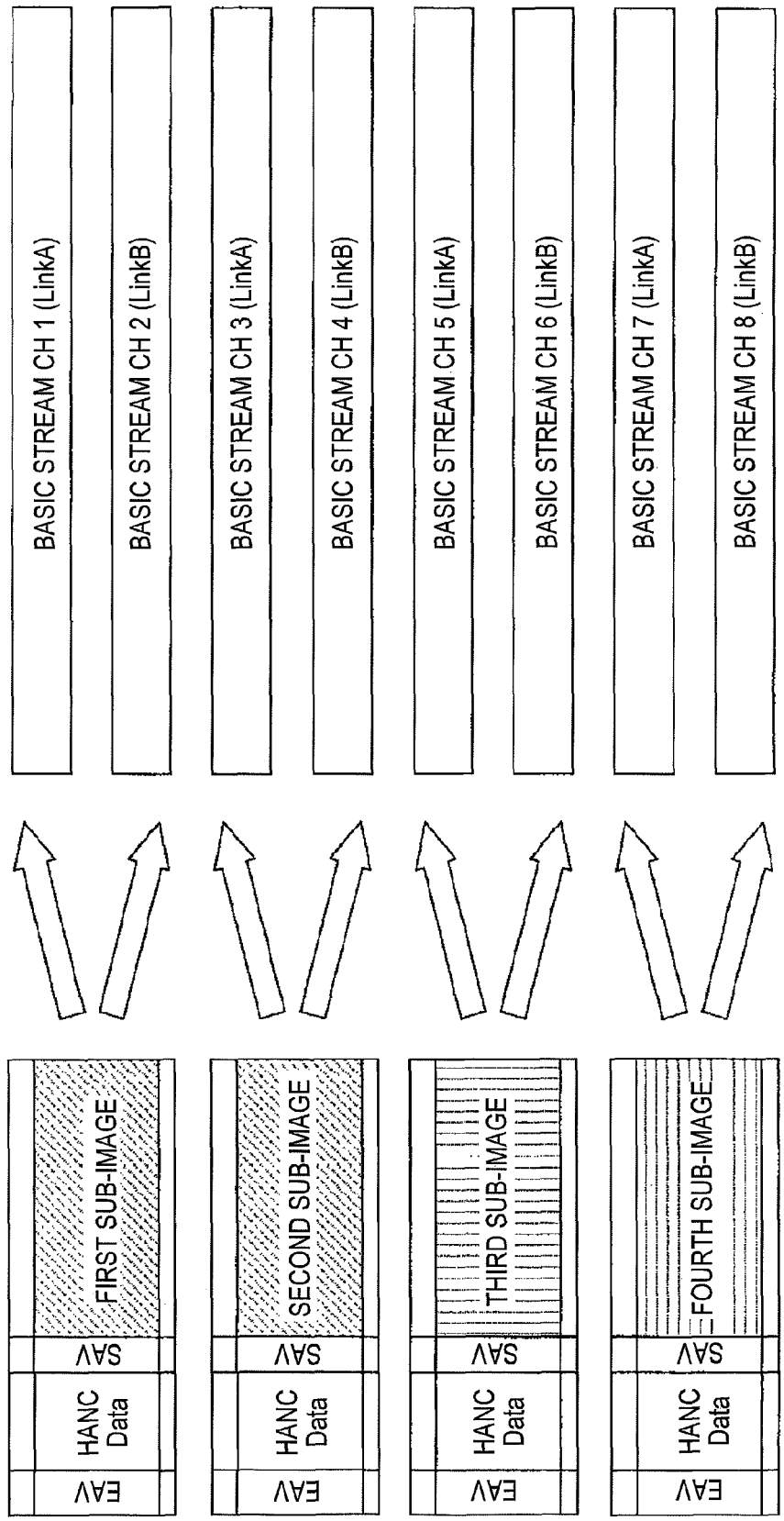
FIG. 15 is a diagram outlining a method of mapping a 4 k×2 k signal into HD-SDI signals in conformity with the 5.4 Octa Link 1.5 Gbps Class of Part 1 of the SMPTE435 standard.

FIG. 15 shows an example in which the first to fourth sub-images into which samples are mapped are mapped into channels classified into links LinkA and LinkB.

The SMPTE435 is a 10G interface standard signifying that HD-SDI signals placed on multiple channels are 8 B/10 B-encoded in units of two samples (40 bits), thus converted into 50-bit signals, multiplexed channel by channel, and then serially transmitted at a bit rate of 10.692 Gbps or 10.692 Gbps/1.001 (hereinafter, simply, 10.692 Gbps). A technology for mapping a 4 k×2 k signal into the HD-SDI signals is stipulated in FIG. 3 and FIG. 4 in 5.4 Octa Link 1.5 Gbps Class of Part 1 of the SMPTE435.

As shown in FIG. 15, from the mapped first to fourth sub-images, signals on channels CH1(LinkA) and CH2(LinkB), signals on channels CH3(LinkA) and CH4(LinkB), signals on channels CH5(LinkA) and CH6(LinkB), and signals on channels CH7(LinkA) and CH(LinkB) are constructed in conformity with the SMPTE372M (dual link).

Since each of the first to fourth sub-images is mapped into dual-link HD-SDI signals, the signals can be multiplexed and transmitted at 10.692 Gbps. At this time, since only a horizontal (H) blanking signal on the channel CH1 can be transmitted, audio data has to be multiplexed into the H blanking period of the signal on the channel CH1 and transmitted. The SMPTE299M stipulates that 48 kHz audio can be transmitted on up to sixteen channels during the H blanking period of the HD-SDI signal.

For transmission of 96 kHz audio, two channels of AES channels 1 and 2 for 48 kHz audio stipulated in FIG. 1 of the SMPTE299M are specified to be used to transmit 96 kHz audio on the first channel. Likewise, two channels of AES channels 1 and 2 for 48 kHz audio are specified to be used to transmit 96 kHz audio on the second channel. Owing to the specifications, transmission on up to eight channels can be carried out.

An audio phase is determined in conformity with the SMPTE299M (see FIG. 3B). Specifically, the audio phase is defined based on phase information from EAV to a 3840/30P horizontal period defined by the formatter, and the phase of a clock of 74.25 MHz that is a quarter of the frequency of a sampling clock (equivalent to 297 MHz) in the 3840/30P.

Now, a 1920/30P mode and a 3840/30P mode will be compared with each other. Periods of two lines in the 3840/30P are equivalent to a period of one line in the 1920/30P. Audio clock phase data is 13 bits long (ck0 to ck12) and can be used for up to 8192 clocks. Therefore, audio phases on about eight lines can be specified.

In other words, conventional audio clock phase data is used to manage phases on two or more lines in the 3840/30P. Therefore, even when audio is multiplexed into a channel CH1 alone, if an audio sample is found on a line in a signal on a channel CH3, the audio phase can be specified.

The mapping unit 11 in accordance with the present embodiment thins a 3840×2160/24P,25P,30P/4:4:4,4:2:2,4:2:0/10,12-bit signal in units of two samples in a line direction, and multiplexes the obtained samples into an active period of an HD-SDI signal. Since each sample can be mapped to a 1920×1080/24P,25P,30P/4:4:4,4:2:2,4:2:0/10,12-bit signal on each of four channels, the resultant signals can be transmitted over existing HD-SDI dual-link cables. Further, the signals can be multiplexed and transmitted at 10.692 Gbps.

When 200 h (10-bit system) or 800 h (12-bit system) that is a default value for Cch is assigned to 0 in 4:2:0, a 4:2:0 signal can be treated as a signal equivalent to a 4:2:2 signal. For transmission of a 4:2:2/10-bit or 4:2:0/10-bit signal, the link LinkB is not used but only the link LinkA including four channels is used. Talking of a 10.692 Gbps serial interface, the channel CH1 is needed for clock synchronization. When cables for the channels CH2 to CH8 are not connected, D0.0 is embedded in signals on the channels CH2 to CH8.

Mapped HD-SDI signals on eight channels (see FIG. 15) are equivalent to "a quad link 292 comparable to a 1920× 1080/5P,60P/4:4:4,4:2:2,4:2:0/12-bit signal×2 channels."

Figure 16A:
FIG. 16A and FIG. 16B are diagrams schematically showing data structures for links LinkA and LinkB respectively in conformity with the SMPTE372M.
Figure 16B:
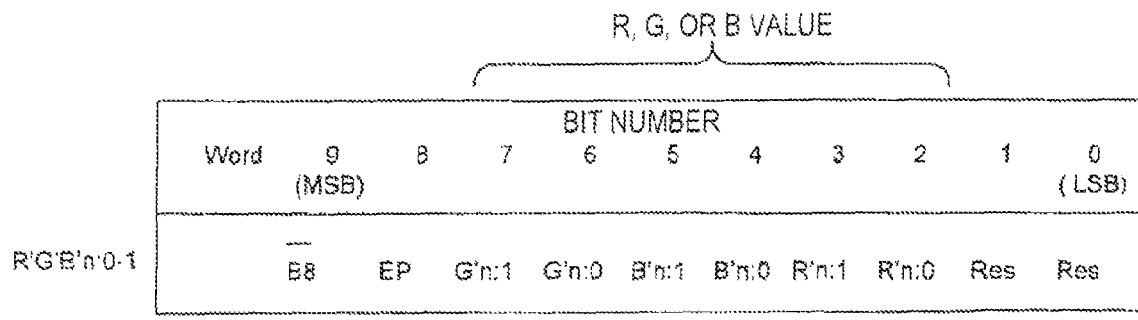

The data structures for signals on the links LinkA and LinkB are specified in Table 2 and FIG. 6 of the SMPTE372M. FIG. 16A and FIG. 16B schematically show the data structures. As shown in FIG. 16A, on the link LinkA, one sample is 20 bits long, and all the bits represent R, G, or B values. Even on the link LinkB, as shown in FIG. 16A, one sample is 20 bits long. As shown in FIG. 16B, out of 10 bits R'G'B'n:0-1, six bits of bit numbers 2 to 7 represent R, G, or B values. Therefore, the number of bits representing R, G, or B values in one sample is 16.

The HD-SDI signals on the channels CH1 to CH8 mapped as mentioned above by the mapping unit 11 are, as shown in FIG. 2, transmitted to an S/P-scrambling-8 B/10 B unit 12.

Figure 17:
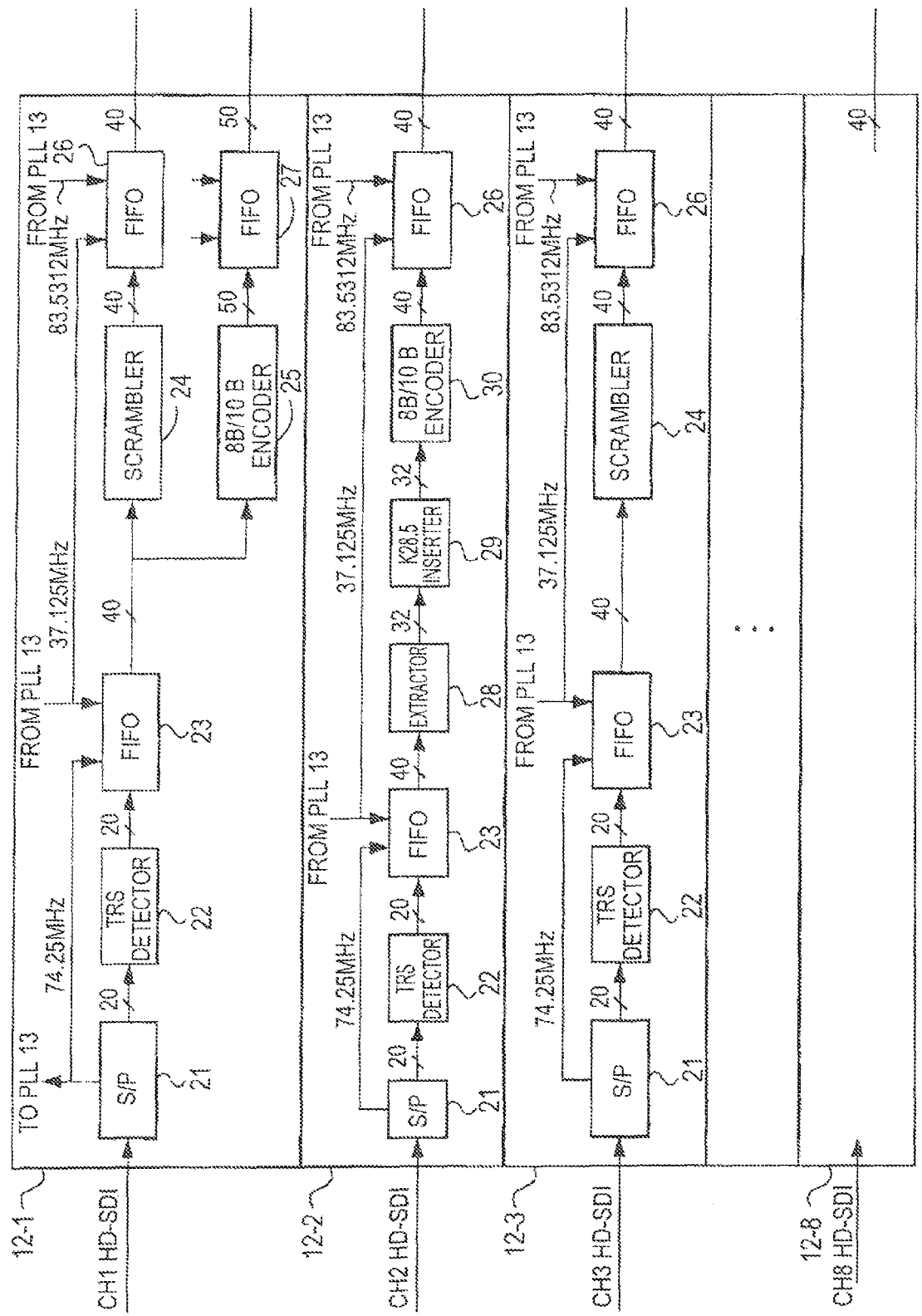
FIG. 17 is a block diagram showing a constitution of an S/P-scrambling-8 B/10 B unit.
Figure 21:
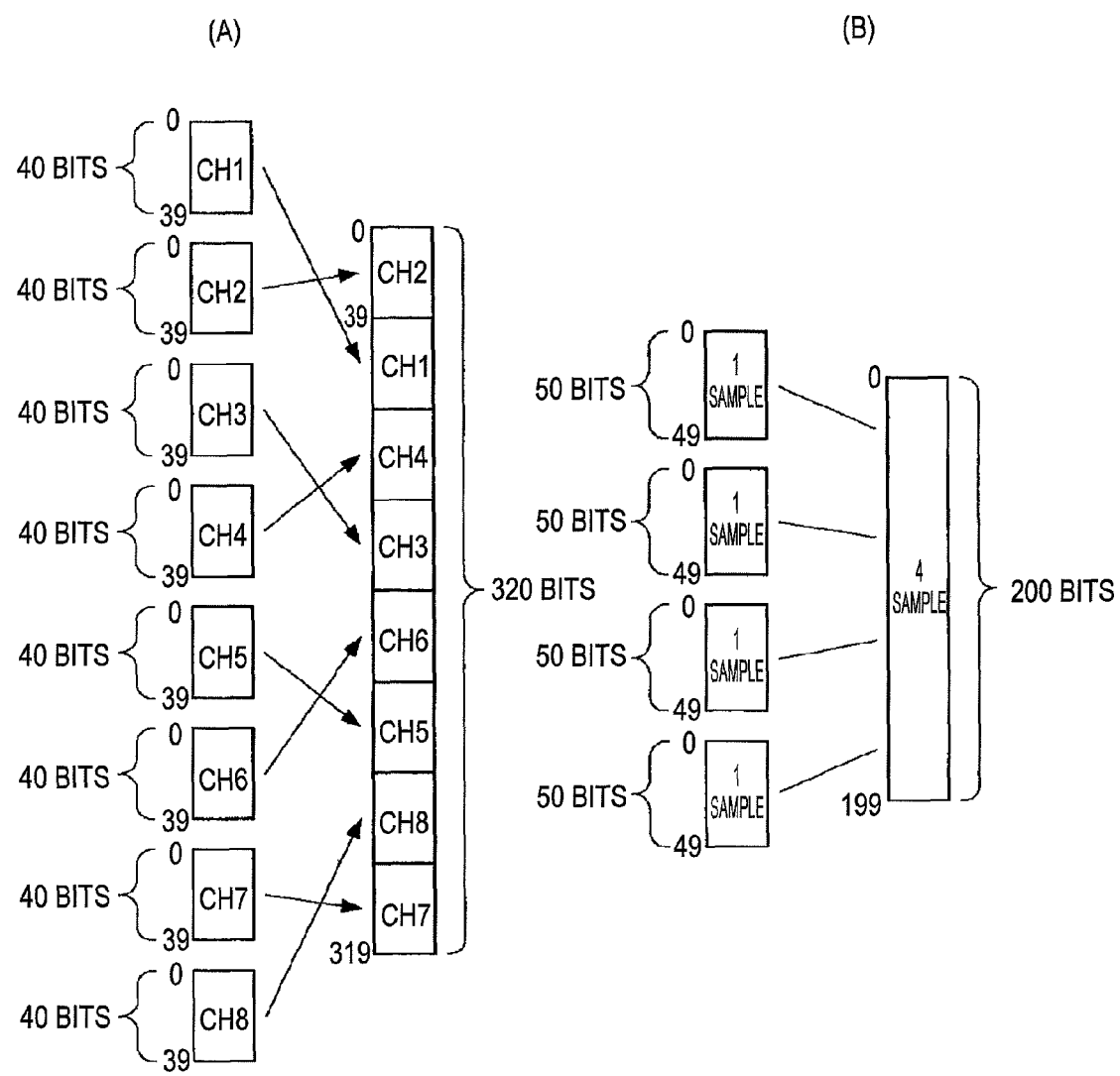
FIG. 21A and FIG. 21B are diagrams showing multiplexing in a multiplexing unit.

FIG. 17 is a block diagram showing the constitution of the S/P-scrambling-8 B/10 B unit 12. The S/P-scrambling-8 B/10 B unit 12 includes eight blocks 12-1 to 12-8 associated on one-to-one basis with the channels CH1 to CH8.

Among the blocks 12-1, 12-3, 12-5, and 12-7 for the channels CH1, CH3, CH5, and CH7 belonging to the link LinkA, the constitution of the block 12-1 is different from those of the blocks 12-3, 12-5, and 12-7. The blocks 12-3, 12-5, and 12-7 share the same constitution (in the drawing, the constitution of the block 12-3 is shown but the constitutions of the blocks 12-5 and 12-7 are not shown). The blocks 12-2, 12-4, 12-6, and 12-8 for the channels CH2, CH4, CH6, and CH8 belonging to the link LinkB share the same constitution (in the drawing, the constitution of the block 12-2 is shown but the constitutions of the blocks 12-4, 12-6, and 12-8 are not shown). In the blocks, the same reference numerals are assigned to components that perform pieces of identical processing.

To begin with, the blocks 12-1, 12-3, 12-5, and 12-7 for the link LinkA will be described. In the blocks 12-1, 12-3, 12-5, and 12-7, inputted HD-SDI signals on the channels CH1, CH3, CH5, and CH7 are transferred to serial-to-parallel (S/P) converters 21. The S/P converter 21 serial-to-parallel converts the HD-SDI signal into parallel digital data of 20 bits wide to be transmitted at a bit rate of 74.25 Mbps or 74.25 Mbps/1.001 (hereinafter, simply, 74.25 Mbps), and extracts a clock of 74.25 MHz.

Parallel digital data serial-to-parallel converted by the S/P converter 21 is transmitted to a TRS detector 22. A clock of 74.25 MHz extracted by the S/P converter 21 is transmitted as a writing clock to a FIFO memory 23. Moreover, the clock of 74.25 MHz extracted by the S/P converter 21 in the block 12-1 is also transmitted to a phase locked loop (PLL) 13 shown in FIG. 2.

The TRS detector 22 detects timing reference signals SAV and EAV from a parallel digital video signal sent from the S/P converter 21, and establishes bit synchronization and word synchronization on the basis of the result of the detection.

Parallel digital data having undergone processing of the TRS detector 22 is transmitted to the FIFO memory 23, and written in the FIFO memory 23 responsively to the clock of 74.25 MHz sent from the S/P converter 21.

The PLL 13 in FIG. 2 transmits as a reading clock a clock of 37.125 MHz, which is produced by halving the frequency of the clock of 74.25 MHz sent from the S/P converter 21 in the block 12-1, to the FIFO memories 23 in the respective blocks 12-1 to 12-8, and transmits the clock as a writing clock to FIFO memories 26 in the respective blocks 12-1 to 128 and a FIFO memory 27 in the block 12-1.

The PLL 13 transmits as a reading clock a clock of 83.5312 MHz, which is produced by multiplying the frequency of the clock of 74.25 MHz sent from the S/P converter 21 in the block 12-1 by 9/8, to the FIFO memories 26 in the respective blocks 12-1 to 12-8 and the FIFO memory 27 in the block 12-1, and also transmits the clock as a writing clock to the FIFO memory 16 shown in FIG. 2.

The PLL 13 transmits as a reading clock a clock of 167.0625 MHz, which is produced by multiplying the frequency of the clock of 74.25 MHz sent from the S/P converter 21 in the block 12-1 by 9/4, to the FIFO memory 16 shown in FIG. 2.

The PLL 13 transmits as a reading clock a clock of 668.25 MHz, which is produced by multiplying the frequency of the clock of 74.25 MHz sent from the S/P converter 21 in the block 12-1 by 9, to a multi-channel data construction unit 17 shown in FIG. 2.

As shown in FIG. 17, parallel digital data of 20 bits wide written responsively to the clock of 74.25 MHz sent from the S/P converter 21 is read from the FIFO memory 23 as parallel digital data of 40 bits wide in units of two samples responsively to the clock of 37.125 MHz sent from the PLL 13 in FIG. 2, and transmitted to a scrambler 24. In the block 12-1, the parallel digital data of 40 bits wide read from the FIFO memory 23 is also transmitted to an 8 B/10 B encoder 25.

The scrambler 24 is a self-synchronous scrambler. A self-synchronous scrambling method is a scrambling method adopted in the SMPTE292M, and is such that: a transmitting side regards an inputted serial signal as a polynomial expression, sequentially divides the polynomial expression by a nine-degree primitive polynomial expression $X^9+X^4+1$, transmits the result of the division or the quotient, and thus statistically averagely halves the mark ratio (ratio of 1s to 0s) of transmission data. The scrambling has the meaning of encryption of a signal using a primitive polynomial expression. The quotient is divided by X+1, whereby polarity-free data (data and reverse data have the same information) is transmitted. On a receiving side, an original serial signal is reproduced by performing the processing (descrambling) of multiplying a received serial signal by X+1 and further multiplying the resultant signal by the primitive polynomial expression $X^9+X^4+1$.

The scrambler 24 does not scramble all data items on each horizontal line but scrambles only a timing reference signal SAV, an active line, a timing reference signal EAV, a line number LN, and an error detection code CRC. The scrambler 24 does not scramble data of a horizontal blanking period. Immediately previously to the timing reference signal SAV, all the values in a register in the scrambler are set to 0s, and encoding is carried out. Data of up to 10 bits long succeeding the error detection code CRC is outputted.

A reason why the scrambler 24 performs the foregoing processing will be described below. In the conventional self-synchronous scrambling method, all data items on each horizontal line are unintermittently transmitted. However, in the present example, data of a horizontal blanking period having undergone self-synchronous scrambling is not transmitted. As a method for this purpose, there is a method in which although all data items on each horizontal line including the horizontal blanking period are scrambled, the data of the horizontal blanking period is not transmitted. However, according to the method, continuity of data items is not ensured by the scrambler for transmission and a descrambler for reception. Therefore, when the descrambler on the receiving side reproduces data, the descrambler miscalculates or incorrectly carries the last several bits of a CRC. The error detection code CRC is therefore not accurately reproduced. There is a method in which a clock for a scrambler is stopped during a horizontal blanking interval, during which no data is transmitted, so that the CRC can be accurately reproduced. When the method id adopted, the subsequent timing reference signal SAV is needed during calculation of the CRC. This poses a problem in that timing control becomes hard to do.

Only data items of a timing reference signal SAV, an active line, a timing reference signal EAV, a line number LN, and an error detection code CRC are therefore scrambled. Immediately previously to the timing reference signal SAV, all the values in a register in the scrambler 24 are set to 0s, and encoding is carried out. Data of at least several bits (for example, 10 bits) long succeeding the error detection code CRC is outputted.

Thus, in an apparatus on a receiving side, immediately previously to the timing reference signal SAV, all the values in a register in a descrambler are set to 0s, and decoding is initiated. Data of at least several bits long succeeding the error detection code CRC is descrambled. Thus, calculation is accurately performed in consideration of carrying by the descrambler serving as a multiplication circuit, whereby original data can be reproduced.

Further, calculations have revealed that when all the values in the register in the scrambler are set to 0s immediately previously to the timing reference signal SAV, a pathological pattern is not generated in scrambled data. What is referred to as the pathological pattern is generation of a signal exhibiting a pattern (or a reverse pattern) that has, as shown in FIG. 18A, "H" of one bit succeeded by continuation of "L" over nineteen bits, or generation of a signal exhibiting a pattern (or a reverse pattern) that has, as shown in FIG. 18B, continuation of "H" over twenty bits succeeded by continuation of "L" over twenty bits.

The pattern shown in FIG. 18A and the reverse pattern are patterns having a dc component as a majority. In order to realize a transmission rate that is as high as 10 Gbps, an ac-coupled transmission system is generally employed. However, in the ac-coupled transmission system, when the dc component occupies the majority, a warp of a base line like the one shown in FIG. 19 takes place. Therefore, an apparatus on a receiving side has to reproduce the dc component.

The pattern shown in FIG. 18B and the reverse pattern are patterns in which a transition from 0 to 1 or from 1 to 0 hardly occurs. A receiving apparatus therefore has difficulty in reproducing a clock from a serial signal.

As described previously, calculations have revealed that when all the values in a register in a scrambler are set to 0s immediately previously to a timing reference signal SAV, the pathological pattern does not occur. A produced signal can be said to be acceptable as a transmission code.

As shown in FIG. 20, two low-order bits of XYZ that is the last word in the timing reference signal SAV (word for use in discriminating a first field of a frame from a second field thereof or discriminating SAV from EAV) may be set to 0s. For example, the scrambler 24 in the block 12-1 performs scrambling with the two low-order bits set to 0s. The scrambler 24 in the block 12-3 performs scrambling after rewriting the two low-order bits to 0 and 1 respectively. The scrambler 24 in the block 12-5 performs scrambling after rewriting the two low-order bits into 1 and 0 respectively. The scrambler 24 in the block 12-7 performs scrambling after rewriting the two low-order bits to 1s. Thus, scrambling is performed with the values of the two low-order bits varied among the channels CH1, CH3, CH5, and CH7.

A reason why the foregoing processing is performed will be described below. When a 3840×2160/24P,25P,30P/4:4:4, 4:2:2,4:2:0/10,12-bit signal is a flat signal (representing nearly the same R, G, and B values over an entire screen), if data values are uniform between the channel CH1, CH3, CH5, or CH7 and the channel CH2, CH4, CH6, or CH8, electromagnetic interference (EMI) or the like takes place. This is not preferable. In contrast, when the values of the two low-order bits of XYZ in SAV are varied among the channels CH1, CH3, CH5, and CH7, if scrambling is performed, the result of division of each of 0 and 1, 1 and 0, and 1 and 1 by a production polynomial expression is transmitted in addition to data, which has the two low-order bits of XYZ set to 0s, as scrambled data. Therefore, uniformity of data items can be avoided.

Further, calculations have revealed that even when the values of the two low-order bits of XYZ are varied channel by channel, if all the values in the register in the scrambler are set to 0s immediately previously to the timing reference signal SAV, the pathological pattern does not occur.

Parallel digital data of 40 bits wide scrambled by the scrambler 24 as mentioned above is written in the FIFO memory 26 responsively to the clock of 37.125 MHz sent from the PLL 13 shown in FIG. 2. Thereafter, the parallel digital data is read from the FIFO memory 26 responsively to the clock of 83.5312 MHz sent from the PLL 13 while having the width of 40 bits left intact, and then transmitted to a multiplexing unit 14 shown in FIG. 2.

The 8 B/10 B encoder 25 in the block 12-1 8-bit-to-10-bit encodes data of a horizontal blanking period alone out of parallel digital data of 40 bits wide read from the FIFO memory 23.

Parallel digital data of 50 bits wide having been 8-bit-to-10-bit encoded by the 8 B/10 B encoder 25 is written in the FIFO memory 27 responsively to the clock of 37.125 MHz sent from the PLL 13 in FIG. 2. Thereafter, the parallel digital data is read from the FIFO memory 27 responsively to the clock of 83.5312 MHz sent from the PLL 13 while having the width of 50 bits left intact, and transmitted to the multiplexing unit 14 shown in FIG. 2.

Data of a horizontal blanking period is transmitted from the block 12-1 alone (that is, data on the channel CH1 is transmitted) to the multiplexing unit 14, but data items of horizontal blanking periods (on the channels CH3, CH5, and CH7) are not transmitted from the respective blocks 12-3, 12-5, and 12-7 to the multiplexing unit 14. This is because of the restrictions imposed on an amount of data.

Next, the blocks 12-2, 12-4, 12-6, and 12-8 for the link LinkB will be described below. In the blocks 12-2, 12-4, 12-6, and 12-8, inputted HD-SDI signals on the channels CH2, CH4, CH6, and CH8 are subjected to the same processing as the processing, which is performed in the blocks 12-1, 12-3, 12-5, and 12-7, by the respective S/P converters 21 and TRS detectors 22, and then transmitted to respective extractors 28.

The extractor 28 is a circuit that extracts bits of R, G, and B values (sixteen bits representing R, G, and B values out of twenty bits constituting one sample on the link LinkB shown in FIG. 16B) from data items of a timing reference signal SAV, an active line, a timing reference signal EAV, a line number LN, and an error detection code CRC out of all data items on each horizontal line on the link LinkB.

Parallel digital data of 16 bits wide extracted by the extractor 28 is written in the FIFO memory 23 responsively to the clock of 74.25 MHz sent from the S/P converter 21. Thereafter, the parallel digital data is read as parallel digital data of 32 bits wide in units of two samples responsively to the clock of 37.125 MHz sent from the PLL 13 in FIG. 2, and transmitted to a K28.5 inserter 29.

The K28.5 inserter 29 inserts 8-bit word data to the leading part of the timing reference signal SAV or EAV. The 8-bit word data is converted into 10-bit word data (called a code name of K28.5), which is not used as word data representing a video signal, during 8-bit-to-10-bit encoding.

Parallel digital data of 32 bits wide having undergone the processing of the K28.5 inserter 29 is transmitted to an 8 B/10 B encoder 30. The 8 B/10 B encoder 30 8-bit-to-10-bit encodes the parallel digital data of 32 bits wide, and outputs the resultant data.

The reason why parallel digital data of 32 bits wide constructed in units of two samples is 8-bit-to-10-bit encoded by the 8 B/10 B encoder 30 is to make the parallel digital data compatible with forty high-order bits of a content ID of 50 bits long specified in the SMPTE435 that is an 10G interface standard.

Parallel digital data of 40 bits wide 8-bit-to-10-bit encoded by the 8 B/10 B encoder 30 is written in the FIFO memory 26 responsively to the clock of 37.125 MHz sent from the PLL 13 in FIG. 2. Thereafter, the parallel digital data is read from the FIFO memory 26 responsively to the clock of 83.5312 MHz sent from the PLL 13 while having the width of 40 bits left intact, and transmitted to the multiplexing unit 14 shown in FIG. 2.

The multiplexing unit shown in FIG. 2 multiplexes parallel digital data items of 40 bits wide on the channels CH1 to CH8 (data items of a timing reference signal SAV, an active line, a timing reference signal EAV, a line number LN, and an error detection code CRC), which are read from the FIFO memories 26 in the respective blocks 12-1 to 12-8 in the S/P-scrambling-8 B/10 B unit 12, in units of 40 bits in the order of the channel CH2 (channel whose data is 8-bit-to-10-bit encoded), the channel CH1 (channel whose data is subjected to self-synchronous scrambling), the channel CH4 (channel whose data is 8-bit-to-10-bit encoded), the channel CH3 (channel whose data is subjected to self-synchronous scrambling), the channel CH6 (channel whose data is 8-bit-to-10-bit encoded), the channel CH5 (channel whose data is subjected to self-synchronous scrambling), the channel CH8 (channel whose data is 8-bit-to-10-bit encoded), and the channel CH7 (channel whose data is subjected to self-synchronous scrambling). Thus, the multiplexing unit 14 produces data of 320 bits wide.

Data 8-bit-to-10-bit encoded is inserted to data, which is subjected to self-synchronous scrambling, in units of 40 bits. Therefore, a variation in a mark ratio (a ratio of 0s to 1s) dependent on a scrambling method and unstableness in a transition from 0 to 1 or from 1 to 0 are resolved. Eventually, occurrence of the aforesaid pathological pattern can be prevented.

The multiplexing unit 14 multiplexes, as shown in FIG. 21B, parallel digital data items of 50 bits wide of four samples, which are contained in a horizontal blanking period of data on the channel CH1 and are read from the FIFO memory 27 in the block 12-1 in the S/P-scrambling-8 B/10 B unit 12, so as to produce data of 200 bits wide.

Parallel digital data of 320 bits wide and parallel digital data of 200 bits wide which result from multiplexing performed by the multiplexing unit 14 are transmitted to a data length conversion unit 15. The data length conversion unit 15 is formed using a shift register. Data of 256 bits wide into which the parallel digital data of 320 bits wide is converted, and data of 256 bits wide into which the parallel digital data of 200 bits wide is converted are used to construct parallel digital data of 256 bits wide. The parallel digital data of 256 bits wide is further converted into data of 128 bits wide.

Figure 22:
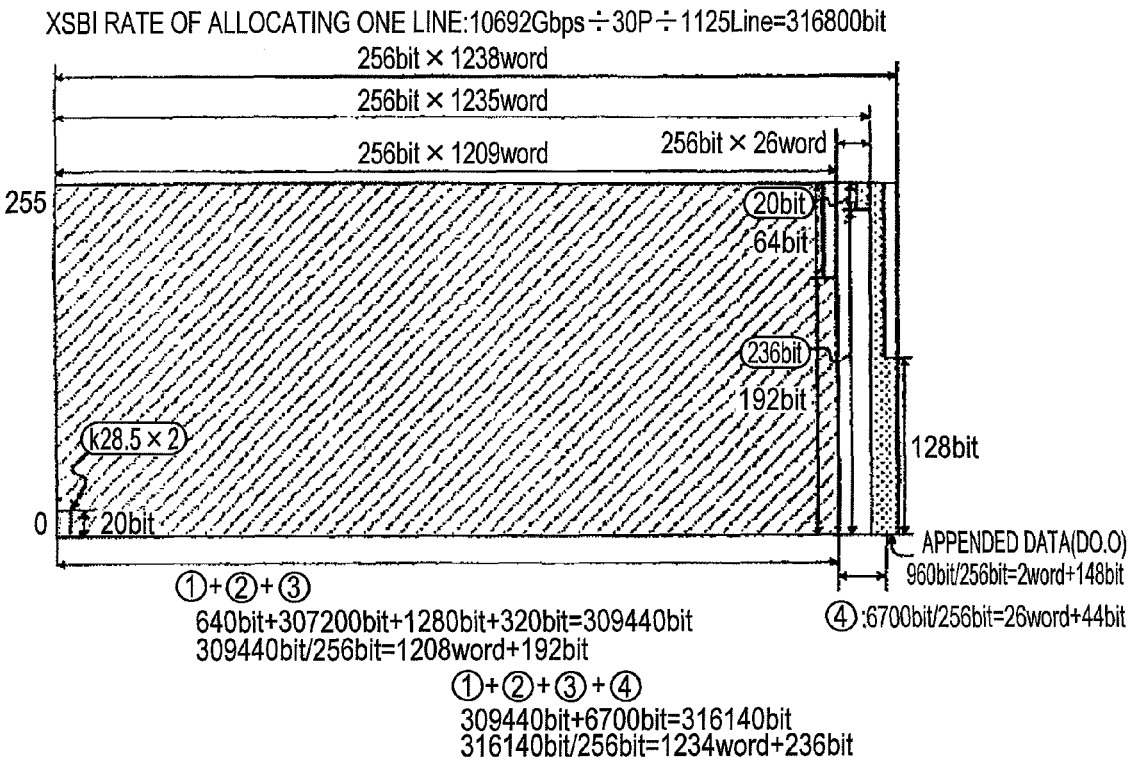
FIG. 22 is a diagram showing the structure of data to be constructed by a data length conversion unit.
Figure 23:
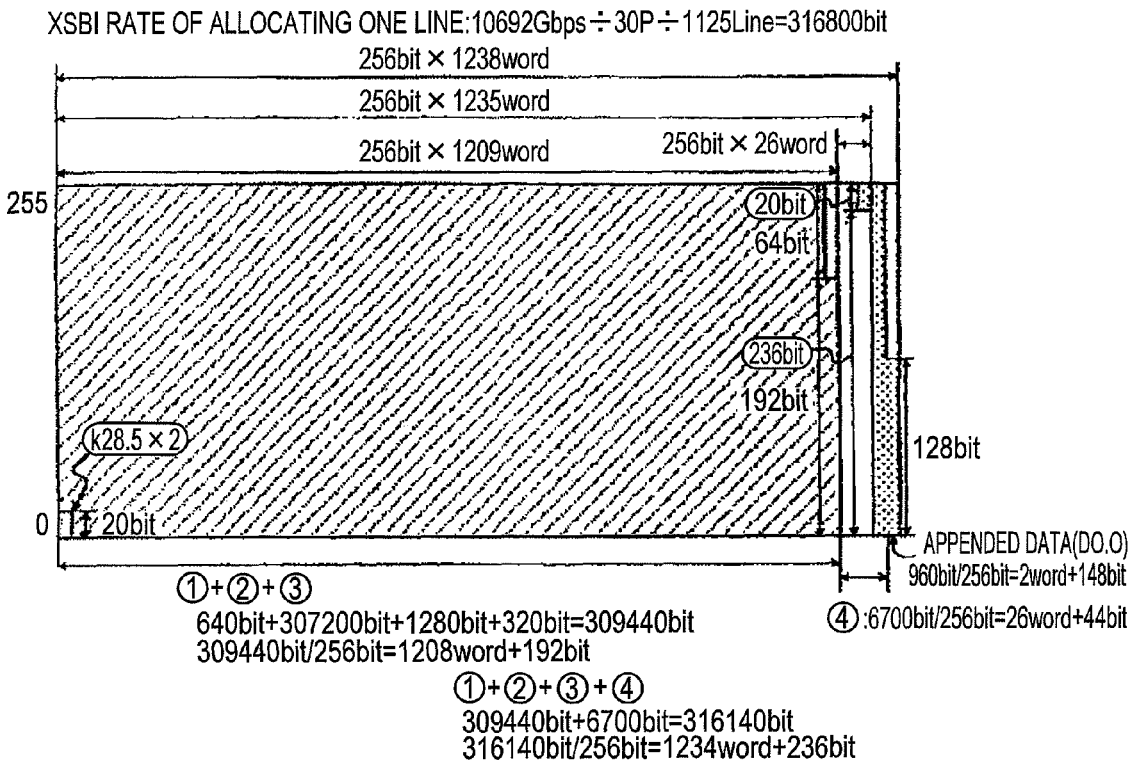
FIG. 23 is a diagram showing the structure of data to be constructed by the data length conversion unit.
Figure 24:
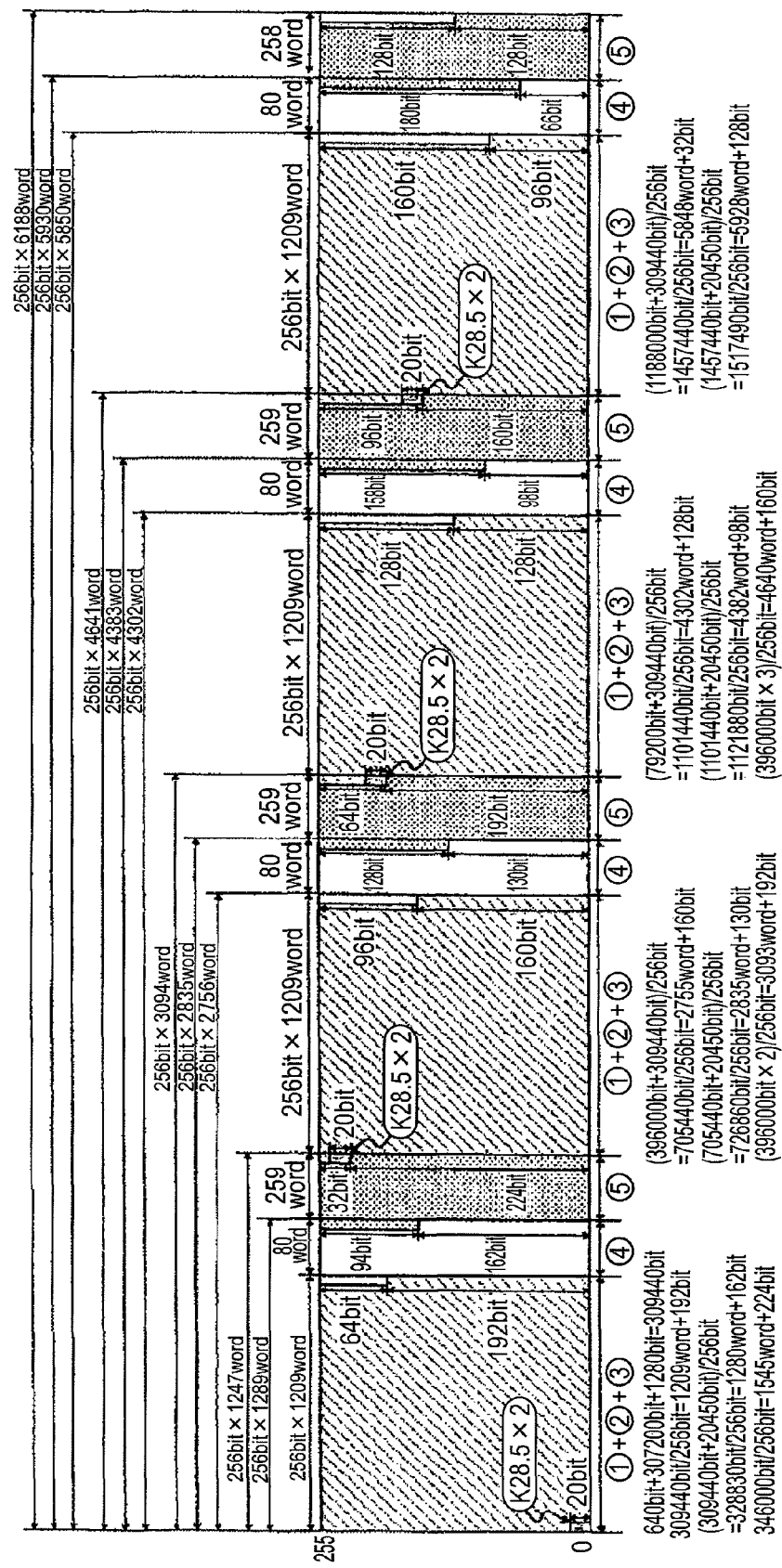
FIG. 24 is a diagram showing the structure of data to be constructed by the data length conversion unit.
Figure 25:
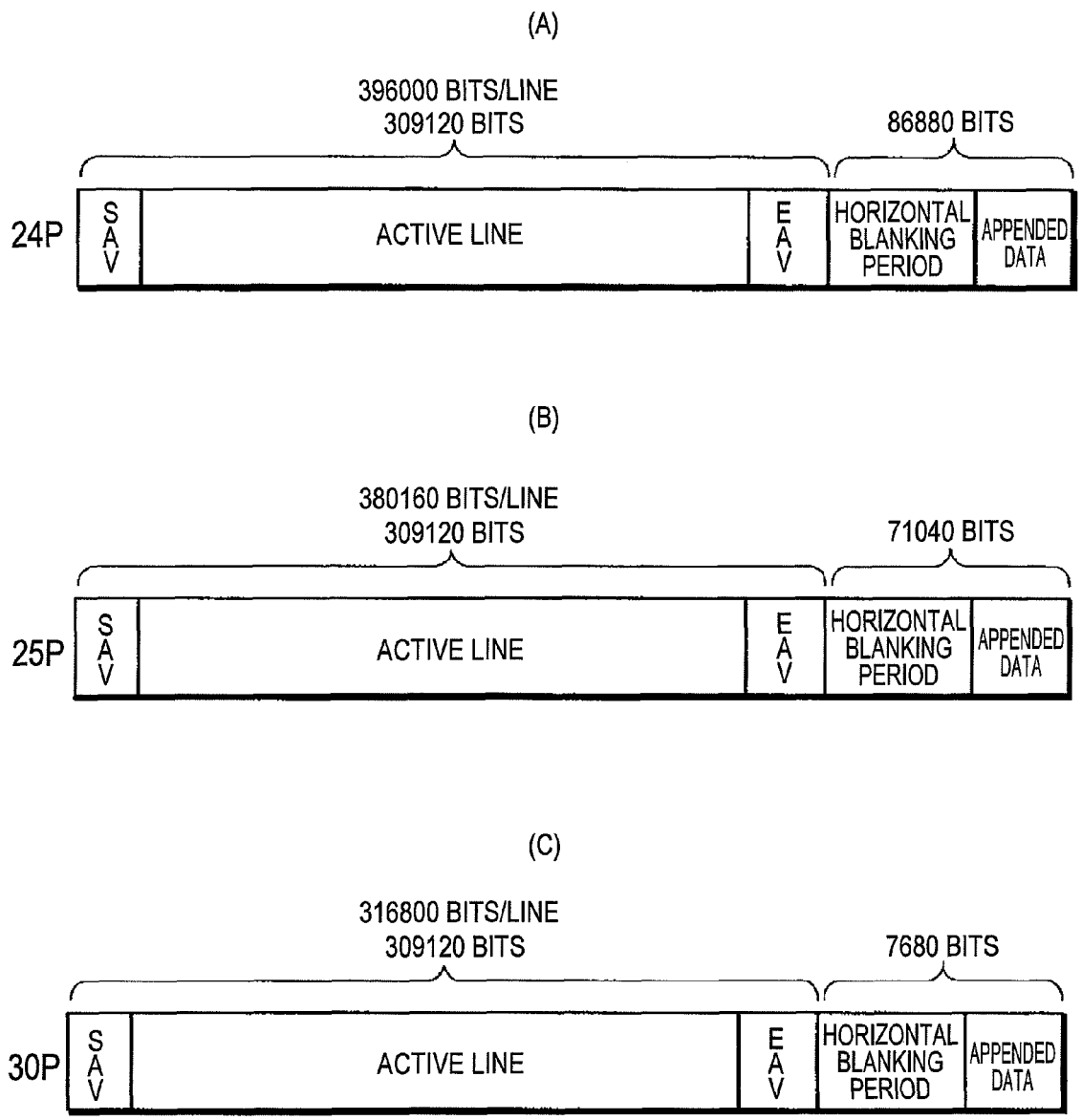
FIG. 25A, FIG. 25B, and FIG. 25C are diagrams showing the structures for one line of serial digital data that permits 10.692 Gbps and is produced by a multiplexing-P/S conversion unit.

FIG. 22 to FIG. 24 are diagrams showing the structures of parallel digital data of 256 bits wide constructed by the data length conversion unit 15. FIG. 22 shows the data structure for one line in the 30P mode. FIG. 23 shows the data structure for one line in the 25P mode. FIG. 24 shows the data structures for four lines in the 24P mode (since the number of bits of the last word becomes 128 in cycles of four lines in the 24P mode, the data structures for four lines are depicted). Under the SMPTE435, a frame rate and the number of lines are identical to those of an HD-SDI signal on the channel CH1. The S/P-scrambling-8 B/10 B unit 12 adopts both scrambling and 8 B/10 B encoding, and performs scrambling on data on the channel CH1 (scrambling adopted by the SMPTE292M). Therefore, the data structures shown in FIG. 22 to FIG. 24 are basically identical to those for the HD-SDI signal.

As shown in FIG. 22 to FIG. 24, data on one line includes three fields mentioned below.

Hatched field: a field for sets of data items of a timing reference signal SAV, active line, timing reference signal EAV, line number LN, and error detection code CRC on the channels CH1 to CH8, which are multiplexed in units of 40 bits in the order of the channels CH2, CH1, CH4, CH3, CH6, CH5, CH8, and CH7.

Blank field: a field of data items of 50 bits long of a horizontal blanking period on the channel CH1 which are 8 B/10 B encoded.

Dot-patterned field: a field of appended data for use in adjusting an amount of data.

As shown in FIG. 2, parallel digital data converted into data of 128 bits wide by the data length conversion unit 15 is transmitted to a FIFO memory 16, and written in the FIFO memory 16 responsively to a clock of 83.5313 MHz sent from the PLL 13.

Parallel digital data of 128 bits wide written in the FIFO memory 16 is read from the FIFO memory 16 as parallel digital data of 64 bits wide responsively to a clock of 167.0625 MHz sent from the PLL 13 in FIG. 2, and transmitted to a multi-channel data construction unit 17.

The multi-channel data construction unit 17 is, for example, a ten gigabit-sixteen bit interface (XSBI) (16-bit interface to be used in a 10-gigabit Ethernet (Ethernet is a registered trademark) system). The multi-channel data construction unit 17 uses a clock of 668.25 MHz sent from the PLL 13 to construct serial digital data items on sixteen channels, which permit a bit rate of 668.25 Mbps, from parallel digital data of 64 bits wide read from the FIFO memory 16. The serial digital data items on sixteen channels constructed by the multi-channel data construction unit 17 are transmitted to a multiplexing-P/S conversion unit 18.

The multiplexing-P/S conversion unit 18 multiplexes serial digital data items on sixteen channels sent from the multi-channel data construction unit 17, and parallel-to-serial converts the multiplexed parallel digital data so as to produce serial digital data items that permit 668.25 Mbps×16=10.692 Gbps. The multiplexing-P/S conversion unit 18 in this example has the capability of a parallel-to-serial conversion unit that serially converts first, second, third, and fourth sub-images mapped by the mapping unit 11.

FIG. 25A, FIG. 25B, and FIG. 25C are diagrams showing data structures for one line in serial digital data permitting 10.692 Gbps. FIG. 25A shows the structure in the 24P mode, FIG. 25B shows the structure in the 25P mode, and FIG. 25C shows the structure in the 30P mode. In the drawings, SAV, an active line, and EAV are shown as data items including a line number LN and an error detection code CRC. A horizontal blanking period is shown to include a field of appended data shown in FIG. 22 to FIG. 24.

The numbers of bits on one line in the 24P, 25P, and 30P modes respectively are obtained according to the expressions below.

10.692 Gbps÷24 frames/sec÷1125 lines/ frame=396000 bits 10.692 Gbps÷25 frames/sec÷1125 lines/ frame=380160 bits 10.692 Gbps÷30 frames/sec÷1125 lines/ frame=316800 bits The number of bits of the timing reference signal SAV, active line, timing reference signal EAV, line number LN, and error detection code CRC is obtained according to the expression below.

(1920$T$+12$T$)×36 bits×4 channels×40/36=309120 bits

The numbers of bits of a horizontal blanking period in the 24P, 25P, and 30P modes respectively are obtained according to the expressions below.

(1) In the 24P mode:

396000 bits−309121 bits=86880 bits (2750$T$−1920$T$−12$T$(SAV+EAV+LN+CRC))×20 bits× 10/8=20450 bits 86880 bits>20450 bits (2) In the 25P mode;

380160 bits−309120 bits=71040 bits (2640$T$−1920$T$−12$T$(SAV+EAV+LN+CRC))×20 bits× 10/8=17700 bits 71040 bits>17700 bits (3) In the 30P mode:

316800 bits−309120 bits=7680 bits (22$T$−1920$T$−12$T$(SAV+EAV+LN+CRC))×20 bits× 10/8=6700 bits 7680 bits>6700 bits As shown above, in all of the 24P, 25P, and 30P modes, the numbers of bits of a horizontal blanking period specified in the SMPTE435, that is, 86880 bits, 71040 bits, and 7680 bits are larger than the numbers of bits of data on the channel CH1 {data of the horizontal blanking period−(data items of the timing reference signal SAV, timing reference signal EAV, line number LN, and error detection code CRC)}, that is, 20450 bits, 17700 bits, and 6700 bits respectively. Therefore, the data of the horizontal blanking period on the channel CH1 can be multiplexed.

As shown in FIG. 2, serial digital data that is produced by the multiplexing-P/S conversion unit 18 and permits a bit rate of 10.692 Gbps is transmitted to a photoelectric conversion unit 19. The photoelectric conversion unit 19 functions as an output unit that outputs the serial digital data, which permits the bit rate of 10.692 Gbps, to the CCU 2. The serial digital data that permits the bit rate of 10.692 Gbps and is converted into a light signal by the photoelectric conversion unit 19 is transmitted from the broadcasting camera 1 to the CCU 2 over the optical fiber cable 3 shown in FIG. 1.

Using the signal transmitting device 5 of the present embodiment, signal processing to be performed on a side of transmitting a 3840×2160/24P,25P,30P/4:4:4,4:2:2,4:2:0/10, 12-bit signal as serial digital data can be carried out. In the signal transmitting device 5 and signal transmitting method, when the 3840×2160/24P/25P,30P/4:4:4,4:2:2,4:2:0/10,12-bit signal is mapped into HD-SDI signals on the channels CH1 to CH8 (channels CH1, CH3, CH5, and CH7 belonging to the link LinkA, and channels CH2, CH4, CH7, and CH8 belonging to the link LinkB), the HD-SDI signals are serial-to-parallel converted. Thereafter, the signals on the link LinkA are subjected to self-synchronous scrambling, and the signals on the link LinkB have the R, G, and B bits thereof 8-bit-to-10-bit encoded.

As for the link LinkA, self-synchronous scrambling is not performed on all data items on each horizontal line but is performed on only data items of the timing reference signal SAV, active line, timing reference signal EAV, line number LN, and error detection code CRC. The self-synchronous scrambling is not performed on data of the horizontal blanking period. All the values in the register in the scrambler are set to 0s immediately previously to the timing reference signal SAV, and encoding is carried out. Data of at least several bits succeeding the error detection code CRC is outputted.

A reason why the foregoing scrambling is performed will be described below. In the conventional self-synchronous scrambling method, all data items on each horizontal line are unintermittently transmitted. In the present invention, data of the horizontal blanking period having undergone self-synchronous scrambling is not transmitted. As a method for this purpose, there is a method in which although all data items on each horizontal line including data of the horizontal blanking period are scrambled, only the data of the horizontal blanking period is not transmitted. However, according to the method, continuity of data items is not ensured by a scrambler for transmission and a descrambler for reception. Therefore, when the descrambler on the receiving side reproduces data, the descrambler miscalculates or incorrectly carries the last several bits of a CRC. The error detection code CRC is therefore not accurately reproduced. There is a method of accurately reproducing the CRC by stopping a clock for the scrambler during a horizontal blanking interval during which no data is transmitted. When the method is adopted, the calculation of the CRC requires the subsequent timing reference signal SAV. This poses a problem in that timing control becomes hard to do.

Therefore, only the data items of the timing reference signal SAV, active line, timing reference signal EAV, line number LN, and error detection code CRC are scrambled. All the values in the register in the scrambler are set to 0s immediately previously to the timing reference signal SAV, and encoding is carried out. Data of at least several bits succeeding the error detection code CRC is outputted.

In the apparatus on the receiving side, all the values in the register in the descrambler are set to 0s immediately previously to the timing reference signal SAV, and decoding is initiated. In addition, data of at least several bits long succeeding the error detection code CRC is descrambled. Therefore, calculation can be performed accurately in consideration of carrying by the descrambler serving as a multiplication circuit in order to reproduce original data.

Further, calculations have revealed that when all the values in the register in the scrambler are set to 0s immediately previously to the timing reference signal SAV, a pathological pattern does not occur in scrambled data. A produced signal can be said to be acceptable as a transmission code.

As for the link LinkB, R, G, and B bits are extracted from only the data items of the timing reference signal SAV, active line, timing reference signal EAV, line number LN, and error detection code CRC among all data items on each horizontal line. The R, G, and B bits are 8-bit-to-10-bit encoded. The data items on the link LinkA having undergone self-synchronous scrambling and the data items on the link LinkB having been 8-bit-to-10-bit encoded are multiplexed. Serial digital data permitting a bit rate of 10.692 Gbps is produced from the multiplexed parallel digital data items.

Figure 26:
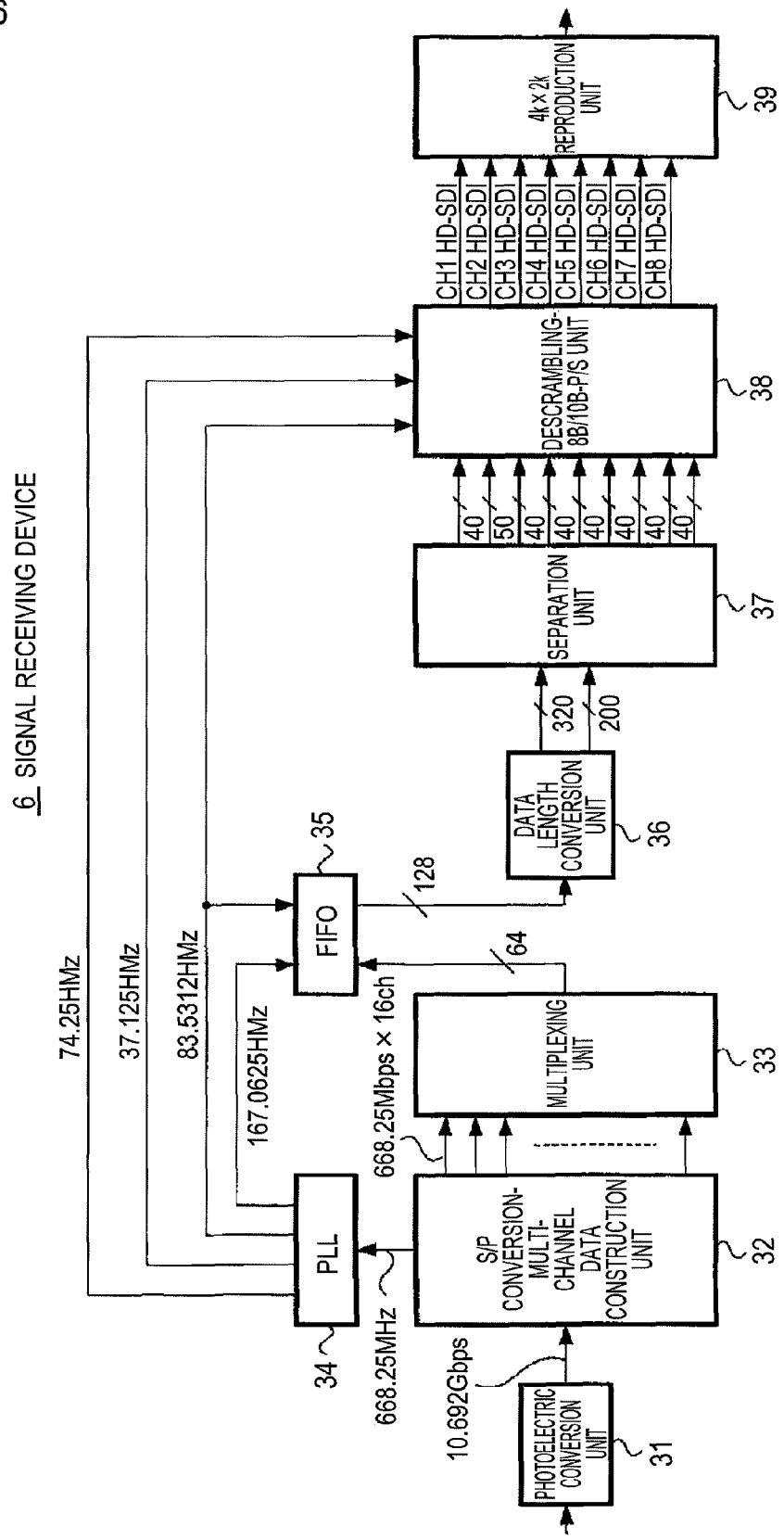
FIG. 26 is a block diagram showing an example of an internal constitution of a signal receiving device out of the circuitry of a CCU.

FIG. 26 is a block diagram showing the circuitry of the CCU 2. In the CCU 2, multiple sets of circuits like those shown in FIG. 26 are included in one-to-one association with broadcasting cameras 1.

Serial digital data that is transmitted from the broadcasting camera 1 over the optical fiber cable 3 and permits a bit rate of 10.692 Gbps is converted into an electrical signal by a photoelectric conversion unit 31, and then transmitted to a S/P conversion-multi-channel data construction unit 32. The S/P conversion-multi-channel data construction unit 32 is, for example, the aforesaid XSBI. The S/P conversion-multi-channel data construction unit 32 receives first, second, third, and fourth sub-images into which a video signal is mapped and each of which is separated into a first-link channel and a second-link channel.

The S/P conversion-multi-channel data construction unit 32 serial-to-parallel converts serial digital data that permits a bit rate of 10.692 Gbps, constructs serial digital data items on sixteen channels, which permit a bit rate of 668.25 Mbps, from parallel digital data resulting from the serial-to-parallel conversion, and extracts a clock of 668.25 MHz.

Parallel digital data items on sixteen channels constructed by the S/P conversion-multi-channel data construction unit 32 are transmitted to a multiplexing unit 33. A clock of 668.25 MHz extracted by the S/P conversion-multi-channel data construction unit 32 is transmitted to a PLL 34.

The multiplexing unit 33 multiplexes serial digital data items on sixteen channels sent from the S/P conversion-multi-channel data construction unit 32, and transmits parallel digital data of 64 bits wide to a FIFO memory 35.

The PLL 34 transmits a clock of 167.0625 MHz, which has a quarter of the frequency of the clock of 668.25 MHz sent from the S/P conversion-multi-channel data construction unit 32, as a writing clock to the FIFO memory 35.

The PLL 34 transmits a clock of 83.5312 MHz, which has a one-eighth of the frequency of the clock of 668.25 MHz sent from the S/P conversion-multi-channel data construction unit 32, as a reading clock to the FIFO memory 35, and transmits the clock as a writing clock to a FIFO memory 44 incorporated in a descrambling-8 B/10 B-P/S unit 38 that will be described later.

The PLL 34 transmits a clock of 37.125 MHz, which has a one-eighteenth of the frequency of the clock of 668.25 MHz sent from the S/P conversion-multi-channel data construction unit 32, as a reading clock to the FIFO memory 45 incorporated in the descrambling-8 B/10 B-P/S unit 38.

The PLL 34 transmits a clock of 74.25 MHz, which has a one-ninth of the frequency of the clock of 668.25 MHz sent from the S/P conversion-multi-channel data construction unit 32, as a reading clock to the FIFO memory 45 in the descrambling-8 B/10 B-P/S unit 38.

In the FIFO memory 35, parallel digital data of 64 bits wide sent from the multiplexing unit 33 is written responsively to the clock of 167.0625 MHz sent from the PLL 34. The parallel digital data written in the FIFO memory 35 is read as parallel digital data of 128 bits wide responsively to the clock of 83.5312 MHz sent from the PLL 34, and transmitted to a data length conversion unit 36.

The data length conversion unit 36 is formed using a shift register, and converts parallel digital data of 128 bits wide into data of 256 bits wide (data having the structure shown in any of FIG. 22 to FIG. 24). The data length conversion unit 36 detects K28.5 inserted into each of timing reference signals SAV or EAV so as to discriminate line periods from one another, converts sets of data items of the timing reference signal SAV, active line, timing reference signal EAV, line number LN, and error detection code CRC into data of 320 bits wide, and converts data of a horizontal blanking period (as mentioned previously, data of a horizontal blanking period on a channel CH1 having been 8 B/10 B encoded) into data of 200 bits wide. Appended data shown in FIG. 22 to FIG. 24 is discarded.

Parallel digital data of 320 bits wide and parallel digital data of 200 bits wide that have the data lengths thereof converted by the data length conversion unit 36 are transmitted to a separation unit 37.

The separation unit 37 separates parallel digital data of 320 bits wide, which is sent from the data length conversion unit 36 (sets of data items of the timing reference signal SAV, active line, timing reference signal EAV, line number LN, and error detection code CRC), into data items on channels CH1 to that are 40-bit data items identical to data items which are not multiplexed by the multiplexing unit 14 (FIG. 2) included in the broadcasting camera 1. The parallel digital data items of 40 bits wide on the channels CH1 to CH8 are transmitted to the descrambling-8 B/10 B-P/S unit 38.

The separation unit 37 separates parallel digital data of 200 bits wide, which is sent from the data length conversion unit 36 (data of a horizontal blanking period on a channel CH1 having been 8 B/10 B encoded), into 50-bit data items (see FIG. 21B) identical to data items that have not been multiplexed by the multiplexing unit 14. The parallel digital data items of 50 bits wide are transmitted to the descrambling-8 B/10 B-P/S unit 38.

Figure 27:
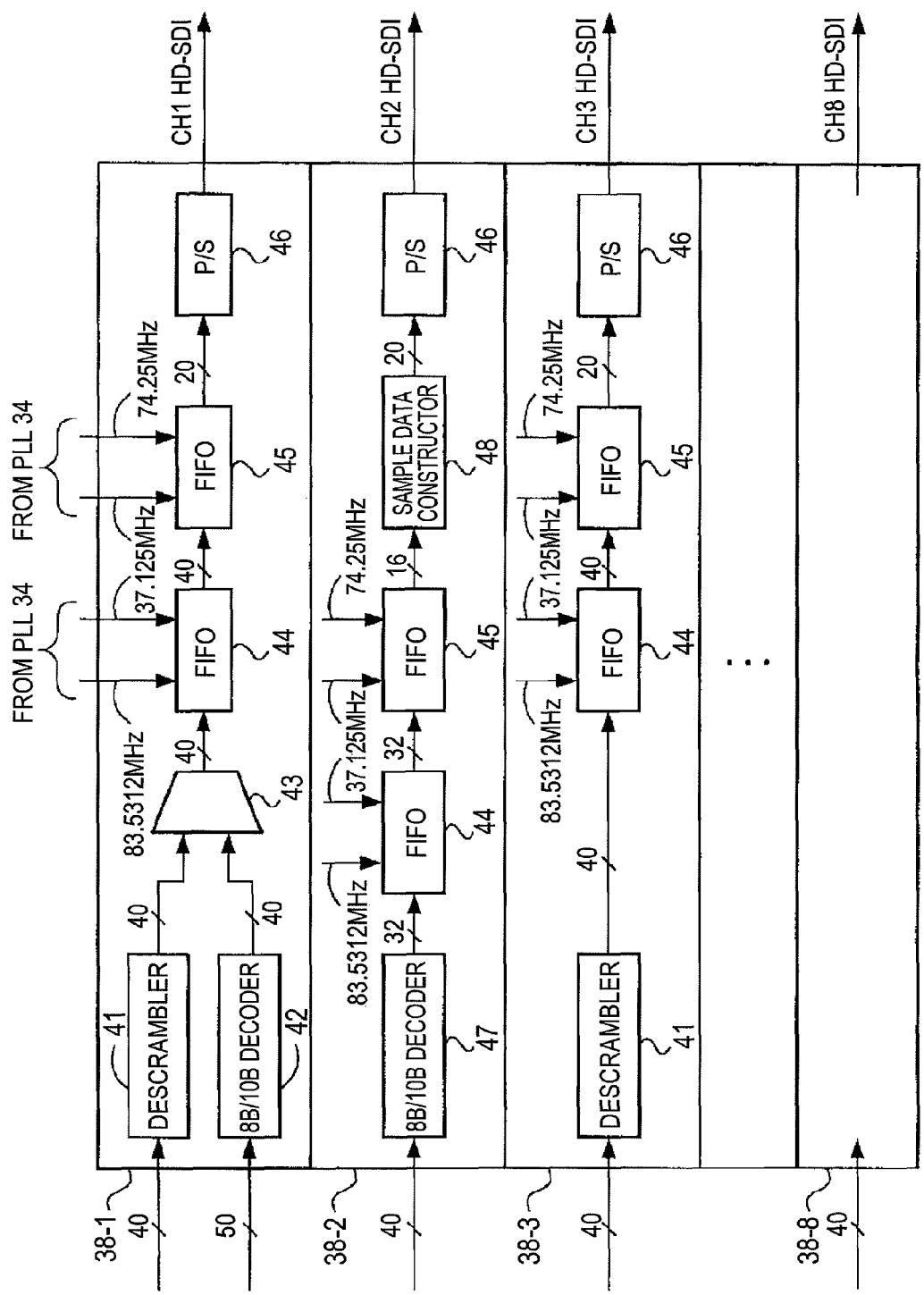
FIG. 27 is a block diagram showing a constitution of an S/P-scrambling-8 B/10 B unit.

FIG. 27 is a block diagram showing the constitution of the descrambling-8 B/10 B-P/S unit 38. The descrambling-8 B/10 B-P/S unit 38 includes eight blocks 38-1 to 38-8 associated on a one-to-one basis with the channels CH1 to CH8. The descrambling-8 B/10 B-P/S unit 38 functions as a receiving unit that receives first, second, third, and fourth sub-images into which a video signal is mapped and each of which is divided into a first-link channel and a second-link channel.

Among the blocks 38-1, 38-3, 38-5, and 38-7 for the channels CH1, CH3, CH5, and CH7 belonging to a link LinkA, the block 38-1 has a different constitution from the other blocks 38-3, 38-5, and 38-7 do. The blocks 38-3, 38-5, and 38-7 share the same constitution (in the drawing, the constitution of the block 38-3 is shown but the constitutions of the blocks 38-5 and 38-7 are not shown). The blocks 38-2, 38-4, 38-6, and 38-8 for the channels CH2, CH4, CH6, and CH8 belonging to a link LinkB share the same constitution (in the drawing, the constitution of the block 38-2 is shown but the constitutions of the blocks 38-4, 38-6, and 38-8 are not shown). In the blocks, the same reference numerals are assigned to components that perform pieces of identical processing.

To begin with, the blocks 38-1, 38-3, 38-5, and 38-7 for the link LinkA will be described below. In the blocks 38-1, 38-3, 38-5, and 38-7, inputted parallel digital data items of 40 bits wide (each including data items of a timing reference signal SAV, an active line, a timing reference signal EAV, a lin number LN, and an error detection code CRC which have undergone self-synchronous scrambling) on the channels CH1, CH3, CH5, and CH7 are transmitted to respective descramblers 41.

The descrambler 41 is a self-synchronous descrambler. The descrambler 41 descrambles received parallel digital data, sets all the values in a register in the descrambler 41 to 0s immediately previously to the timing reference signal SAV, and then initiates decoding. In addition, the descrambler 41 performs self-synchronous descrambling on data of 10 bits long succeeding the error detection code CRC.

As described in relation to the scrambler 24 (FIG. 17) incorporated in the broadcasting camera 1, although data of a horizontal blanking period having undergone self-synchronous scrambling is not transmitted, calculation is accurately performed in consideration of carrying by the descrambler 41, which serves as a multiplication circuit, in order to reproduce original data.

After performing self-synchronous scrambling, the descrambler 41 changes the values of two low-order bits of XYZ contained in the timing reference signal SAV (bits scrambled with the values thereof varied among the channels CH1, CH3, CH5, and CH7 as described in relation to the scrambler 24) into 0s that are their original values.

Parallel digital data of 40 bits wide descrambled by the descrambler 41 in the block 38-1 is transmitted to a selector 43. In the block 38-1, inputted parallel digital data of 50 bits wide (data of the horizontal blanking period on the channel CH1 having been 8 B/10 B encoded) is transmitted to an 8 B/10 B decoder 42. The 8 B/10 B decoder 42 8-bit-to-10-bit decodes the parallel digital data. The parallel digital data of 40 bits wide 8-bit-to-10-bit decoded by the 8 B/10 B decoder 42 is transmitted to the selector 43.

The selector 43 alternately selects parallel digital data sent from the descrambler 41 and parallel digital data sent from the 8 B/10 B decoder 42, constructs parallel digital data of 40 bits wide into which all data items on each horizontal line are integrated, and transmits the parallel digital data of 40 bits wide to a FIFO memory 44.

In the blocks 38-3, 38-5, and 38-7, neither the 8 B/10 B decoder 42 nor the selector 43 is included because parallel digital data of 50 bits wide is not inputted. Parallel digital data of 40 bits wide descrambled by the descrambler 41 is transmitted to the FIFO memory 44 as it is.

Parallel digital data of 40 bits wide sent to the FIFO memory 44 is written in the FIFO memory 44 responsively to the clock of 83.5312 MHz sent from the PLL 34 (FIG. 26). Thereafter, the parallel digital data is read from the FIFO memory 44 responsively to the clock of 37.125 MHz sent from the PLL 34 while having the width of 40 bits left intact, and then transmitted to a FIFO memory 45.

Parallel digital data of 40 bits wide sent to the FIFO memory 45 is written in the FIFO memory 45 responsively to the clock of 37.125 MHz sent from the PLL 34 (FIG. 26). Thereafter, the parallel digital data is read from the FIFO memory 45 as parallel digital data of 20 bits wide (data of one sample on the link LinkA shown in FIG. 16A) responsively to the clock of 74.25 MHz sent from the PLL 34, and transmitted to a parallel-to-serial (P/S) converter 46.

The P/S converter 46 parallel-to-serial converts the parallel digital data into an HD-SDI signal permitting a bit rate of 1.485 Gbps so as to reproduce the HD-SDI signal. The HD-SDI signals on the channels CH1, CH3, CH5, and CH7 reproduced by the blocks 38-1, 38-3, 38-5, and 38-7 are transmitted to a 4 k×2 k reproduction unit 39 shown in FIG. 27.

Next, the blocks 38-2, 38-4, 38-6, and 38-8 for the link LinkB will be described below. In the blocks 38-2, 38-4, 38-6, and 38-8, inputted parallel digital data items of 40 bits wide on the channels CH2, CH4, CH6, and CH8 (sets of data items of a timing reference signal SAV, an active line, a timing reference signal EAV, a line number LN, and an error detection code CRC that have undergone 8 B/10 B encoding) are transmitted to respective 8 B/10 B decoders 47.

The 8 B/10 B decoder 47 8-bit-to-10-bit decodes the parallel digital data. The parallel digital data of 32 bits wide 8-bit-to-10-bit decoded by the 8 B/10 B decoder 47 is transmitted to the FIFO memory 44.

Parallel digital data of 32 bits wide sent to the FIFO memory 44 is written in the FIFO memory 44 responsively to the clock of 83.5313 MHz sent from the PLL 34 (FIG. 26). Thereafter, the parallel digital data is read from the FIFO memory 44 responsively to the clock of 37.125 MHz sent from the PLL 34 while having the width of 32 bits left intact, and then transmitted to the FIFO memory 45.

Parallel digital data of 32 bits wide sent to the FIFO memory 45 is written in the FIFO memory 45 responsively to the clock of 37.125 MHz sent from the PLL 34 (FIG. 26). Thereafter, the parallel digital data is read from the FIFO memory 45 as parallel digital data of 16 bits wide (R, G, and B bits of one sample on the link LinkB shown in FIG. 16A) responsively to the clock of 74.25 MHz sent from the PLL 34, and then transmitted to a sample data constructor 48.

The sample data constructor 48 constructs 20-bit data items of samples on the link LinkB to each of which four bits of bit numbers 0, 1, 8, and 9 out of R'G'B'n:0-1 shown in FIG. 16 are appended. The thus constructed parallel digital data of 20 bits wide is transmitted from the sample data constructor 48 to the P/S converter 46.

The P/S converter 46 parallel-to-serial converts the parallel digital data into an HD-SDI signal permitting a bit rate of 1.485 Gbps, and thus reproduces the HD-SDI signal. The HD-SDI signals on the channels CH2, CH4, CH6, and CH8 reproduced by the respective blocks 38-2, 38-4, 38-6, and 38-8 are transmitted to the 4 k×2 k reproduction unit 39.

The 4 k×2 k reproduction unit 39 is a circuit that performs processing, which is a reverse of the processing (FIG. 15) of the mapping unit 11 (FIG. 2) of the broadcasting camera 1, on the HD-SDI signals on the channels CH1 to CH8 (links LinkA and LinkB) sent from the S/P-scrambling-8 B/10 B unit 38 so as to reproduce a 3840×2160/24P,25P,30P/4:4:4, 4:2:2,4:2:0/10,12-bit signal.

The 4 k×2 k reproduction unit 39 of this example extracts one by one pixel samples allocated to active periods of first, second, third, and fourth sub-images received by the S/P conversion-multi-channel data construction unit 32. The 4 k×2 k reproduction unit 39 sequentially reallocates the pixel samples to one frame of a video signal, and restores thinned out pixels from the allocated samples.

At this time, the 4 k×2 k reproduction unit 39 alternately allocates samples, which are mapped to the first and second sub-images, onto even-numbered lines. Likewise, the 4 k×2 k reproduction unit 39 alternately allocates samples, which are mapped to the third and fourth sub-images, onto odd-numbered lines. The 4 k×2 k reproduction unit 39 then uses samples, which are allocated to each line, to restore thinned out pixels adjoining the samples.

A 3840×2160/24P,25P,30P/4:4:4,4:2:2,4:2:0/10,12-bit signal reproduced by the 4 k×2 k reproduction unit 39 is outputted from the CCU 2, and transmitted to, for example, a VTR or the like (not shown).

Not only a 3840×2160/24P,25P,30P/4:4:4,4:2:2,4:2:0/10, 12-bit signal is transmitted from each broadcasting camera 1 to the CCU 2 but also return video (a video signal to be used to display a picture being picked up by another broadcasting camera 1) is transmitted from the CCU 2 to each broadcasting camera 1 over the optical fiber cable 3. The return video is produced using a known technology (for example, after HD-SDI signals on two channels are 8-bit-to-10-bit encoded, the resultant signals are multiplexed and converted into serial digital data). A description of circuitry for the production will be omitted.

In this example, the signal receiving device 6 performs signal processing assigned to a side of receiving serial digital data produced by the signal transmitting device 5. According to the signal receiving device 6 and signal receiving method, parallel digital data is produced from serial digital data permitting a bit rate of 10.692 Gbps, and the parallel digital data is separated into data items on respective channels classified into the links LinkA and LinkB.

Separated data items on the link LinkA are subjected to self-synchronous descrambling. All the values in the register in each of the descramblers are set to 0s immediately previously to a timing reference signal SAV, and decoding is initiated. In addition, data of at least several bits long succeeding an error detection code CRC is subjected to self-synchronous descrambling. Therefore, only data items of the timing reference signal SAV, an active line, a timing reference signal EAV, a line number LN, and the error detection code CRC are subjected to self-synchronous scrambling, but data of a horizontal blanking period is not subjected to self-synchronous scrambling. Nevertheless, calculation is accurately performed in consideration of carrying by the descrambler, which is a multiplication circuit, in order to reproduce original data.

As for the separated data items on the link LinkB, data items of samples on the link LinkB are constructed from 8-bit-to-10-bit decoded R, G, and B bits. Parallel digital data on the link LinkA subjected to self-synchronous descrambling and parallel digital data on the link LinkB having samples thereof constructed are parallel-to-serial converted, whereby mapped HD-SDI signals on the channels CH1 to CH8 are reproduced.

As mentioned above, in the broadcasting camera 1 that is a transmitting side, all the values in the register in each of the scramblers 24 are set to 0s immediately previously to the timing reference signal SAV, encoding is carried out, and data of ten bits long succeeding the error detection code CRC is outputted. In the CCU 2 that is a receiving side, all the values in the register in each of the descramblers 41 are set to 0s immediately previously to the timing reference signal SAV, decoding is initiated, and data of ten bits long succeeding the error detection code CRC is descrambled. Therefore, although data of the horizontal blanking period subjected to self-synchronous scrambling is not transmitted, the CCU 2 that is the receiving side can accurately reproduce original data.

On both the links LinkA and LinkB, self-synchronous scrambling or 8 B/10 B encoding is carried out in units of two samples. Therefore, the resultant data can be compatible with forty high-order bits of a content ID of fifty bits long specified in the SMPTE435.

Scrambling is performed by varying the values of two low-order bits of XYZ in the timing reference signal SAV among the channels belonging to the link LinkA. Therefore, even when a 3840×2160/24P,25P,30P/4:4:4,4:2:2,4:2:0/10, 12-bit signal is a flat signal (the R, G, and B values are nearly the same values over an entire screen), an incident that data values become uniform between the channels CH1, CH3, CH5, and CH7 and the channels CH2, CH4, CH6, and CH8 can be avoided. Therefore, occurrence of electromagnetic interference (EMI) can be prevented.

Since 8 B/10 B-encoded data is inserted to data, which has undergone self-synchronous scrambling, in units of 40 bits or the values in the register in each of the descramblers 41 are set to 0s immediately previously to the timing reference signal SAV, occurrence of a pathological pattern can be prevented.

In the aforesaid camera transmission system relating to the first embodiment, a 3840×2160/24P,25P,30P/4:4:4,4:2:2,4:2:0/10,12-bit signal is mapped into HD-SDI signals on the channels CH1 to CH8 (links LinkA and LinkB). Thus, the 3840×2160/24P,25P,30P/4:4:4,4:2:2,4:2:0/10,12-bit signal is converted into serial digital data permitting a bit rate of 10.692 Gbps and transmitted. This is advantageous in that a 4 k signal that is a new-generation video signal deliberated by the ITU or SMPTE can be transmitted through multiple channels supported by a conventionally employed 10.692 Gbps serial interface.

A 4 k×8 k signal representing one frame is extracted in units of two samples and mapped into sub-images. Samples mapped into the sub-images are samples constituting the frame that is original video. Since the sub-images are independently acquired, a picture on an entire screen can be viewed on an existing HD monitor or a waveform monitor, or an 8 k signal can be observed on a coming 4 k monitor or the like. This is advantageous for development of video equipment or for analysis of a defect in the optical fiber cable 3 or the like.

In the aforesaid first embodiment, a signal is thinned in units of two samples. For example, a 3840/60P signal may presumably be changed to 3840/60I signals on two channels through line-by-line thinning, or the 3840/60P signal may presumably be changed to 3840/30P signals on two channels through frame-by-frame thinning. However, similarly to the aforesaid first embodiment, when a signal is mapped in units of two samples into sub-images, an amount of data to be preserved and allocated is small. This is advantageous because a delay time occurring when a signal is transmitted from the broadcasting camera 1 to the CCU 2 is diminished. Performing signal processing that diminishes the delay time has a quite significant meaning for a professional-use camera system requested to carry out signal processing or signal transmission in real time.

In the aforesaid first embodiment, audio samples sampled at a predetermined frequency can be multiplexed into a horizontal auxiliary data space of video data sampled in conformity with the UHDTV standard. At this time, multiplexing of audio on 24 channels that is requested or stipulated by the UHDTV is realized with 48 kHz audio under the UHDTV1 or with 96 kHz audio under the UHDTV2.

An audio phase is defined at 74.25 MHz without use of a sampling clock specified in the UHDTV1 or UHDTV2. As a result, audio samples on one channel can be sequentially multiplexed through a 10G interface. This is advantageous in that a load on hardware can be reduced. A format for 96 kHz audio can be defined to be matched with the contents of the SMPTE299M that is an existing 48 kHz audio standard.

Next, an example of actions of a mapping unit 11 included in the second embodiment of the present invention will be described with reference to FIG. 28.

Figure 28:
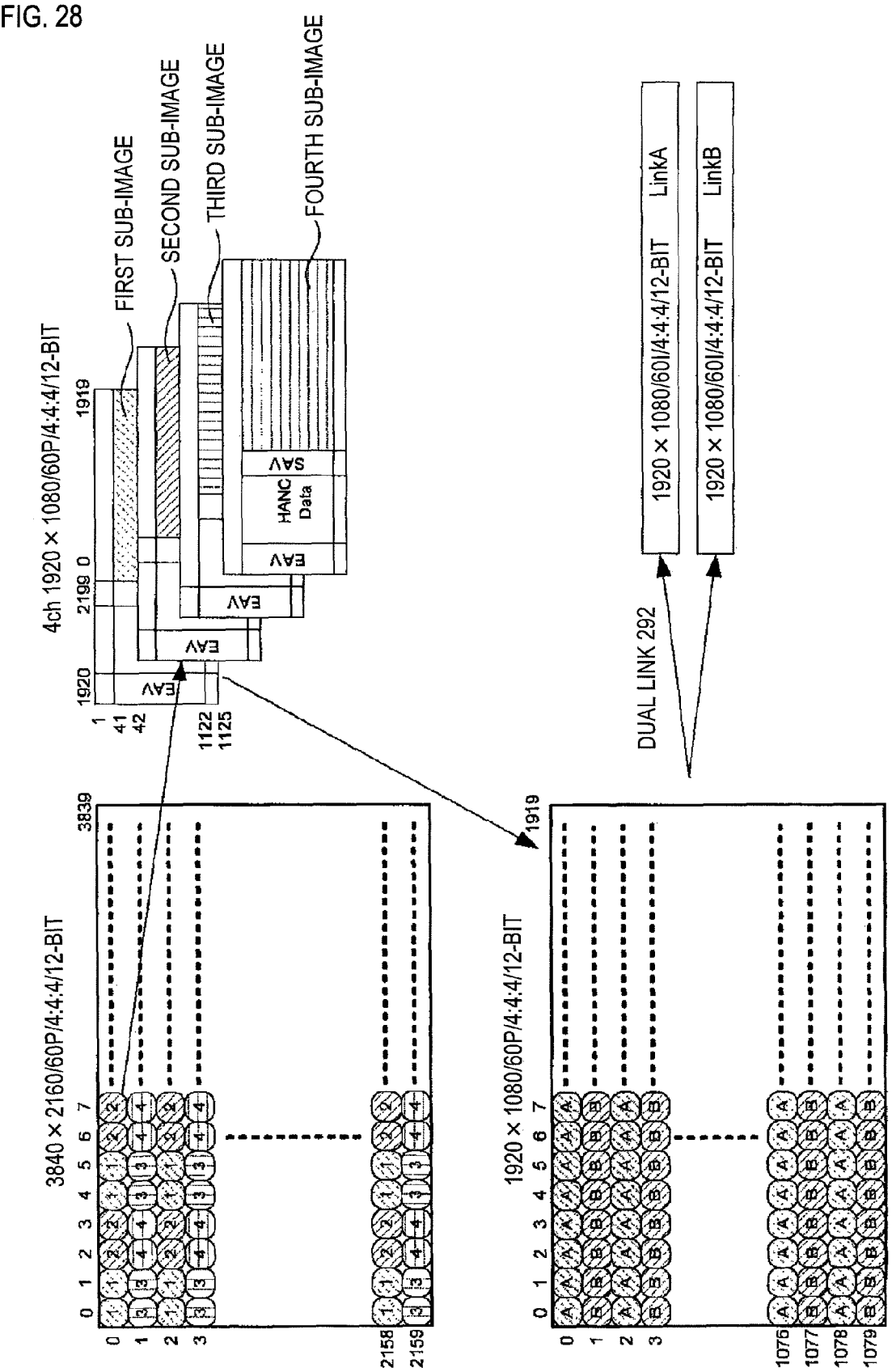
FIG. 28 is an explanatory diagram showing an example in which samples constituting a frame of a 4 k×2 k signal are mapped into first to fourth sub-images.

FIG. 28 is an explanatory diagram showing an example in which samples constituting one frame of a 4 k×2 k signal are mapped into first to fourth sub-images.

In the present embodiment, the mapping unit 11 characteristically maps a 3840×2160/50P,60P/4:4:4,4:2:2,4:2:0/10, 12-bit signal into the first to fourth sub-images, and then converts the sub-images into dual-link data items. The other components are identical to those of the first embodiment. An iterative description will be omitted. As for the processing of a signal receiving device 6 included in a CCU 2, since it is identical to that in the first embodiment, an iterative description will be omitted.

A broadcasting camera 1 in this example is a camera including a signal transmitting device 5 that produces a 3840×2160/50P,60P/4:4:4,4:2:2,4:2:0/10,12-bit signal, which is equivalent to a signal specified in the UHDTV1, as a 4 k×2 k signal (an untra-high-definition signal representing 4 k samples×2 k lines), and transmits HD-SDI signals into which the signal is mapped according to a predetermined method. A signal receiving device 6 included in the CCU 2 in this example can reproduce video of the 3840×2160/50P,60P/4:4:4,4:2:2,4:2:0/10,12-bit signal, on the basis of the HD-SDI signals received from the broadcasting camera 1.

The mapping unit 11 in this example is a circuit that multiplexes a 3840×2160/50P,60P/4:4:4,4:2:2,4:2:0/10,12-bit signal onto two channels of a dual link. Even in the present embodiment, similarly to the aforesaid first embodiment, the mapping unit 11 maps samples, which are included in a frame and contain a video signal, into first to fourth sub-images. At this time, the samples are mapped in units of two samples adjoining in a line direction.

Referring to FIG. 28, a concrete example of mapping will be described on the assumption that the position of each of samples included in a frame of a 4 k×2 k signal and in first to fourth sub-images is expressed as (sample number, line number).

For example, two samples at (0,0) and (1,0) in a frame of a 4 k×2 k signal are mapped to (0,42) and (1,42) in the first sub-image.

Two samples at (2,0) and (3,0) in the frame of the 4 k×2 k signal are mapped to (0,42) and (1,42) in the second sub-image.

Two samples at (0,1) and (1,1) in the frame of the 4 k×2 k signal are mapped to (0,42) and (1,42) in the third sub-image.

Two samples at (2,1) and (3,1) in the frame of the 4 k×2 k signal are mapped to (0,42) and (1,42) in the fourth sub-image.

Likewise, samples included in the frame of the 4 k×2 k signal are mapped to the first to fourth sub-images.

Incidentally, a signal mapped into HD-SDI signals on four channels is equivalent to "a quad link 292 comparable to a 3840×2160/50P,60P/4:4:4,4:2:2,4:2:0/10,12-bit signal conformable to the existing HD-SDI×four channels."

The mapping unit 11 in the present embodiment supports "(a quad link 292×2 channels)×2 channels (see FIG. 15). This means that resultant signals can be transmitted through two channels supported by a 10 Gbps serial interface. The mapping unit 11 in this example maps an audio signal, which is mapped to the first sub-image, so as to allocate the audio signal to either a first-link transmission channel or a second-link transmission channel.

Each quad link can be changed into two-channel dual links. Among samples assigned to a quad link 292 (1920×1080/50P, 60P/4:4:4,4:2:2,4:2:0/12-bit), samples contained in even-numbered lines shall be called samples A, and samples contained in odd-numbered lines shall be called samples B. The samples A are mapped to the link LinkA of a dual link 292. The samples B are mapped to the link LinkB of the dual link 292.

The links LinkA and LinkB of the dual link 292 are each specified with a 1920×1080/60I/4:4:4/12-bit signal. An audio signal is multiplexed onto the link LinkA or the first channel of the changed dual link.

As for an audio signal, 48 kHz audio on up to sixteen channels (up to eight channels in case of 96 kHz audio) is transmitted through the first channel of a 10 Gbps serial interface (SMPTE435). In addition, 48 kHz audio on up to sixteen channels (up to eight channels in case of 96 kHz audio) is transmitted through the second channel of the 10 Gbps serial interface (SMPTE435). Therefore, 48 kHz audio capable of being transmitted through the first and second channels supported by the 10 Gbps serial interface (SMPTE435) falls into thirty-two channels at most (sixteen channels at most in case of 96 kHz audio). For multiplexing the audio signal, the audio signal is transmitted while being sequentially embedded using the first channel of the 10 Gbps serial interface first.

Even in this case, an audio phase is determined in conformity with the 299M. Namely, the audio phase is defined based on phase information from EAV to a 3840/60P active line defined by the formatter, and the phase of a clock of 74.25 MHz that is a one-eighth of the frequency (equivalent to 594 MHz) of a clock in the 3840/60P mode.

The 1920/30P mode and 3840/60P mode will be compared with each other. A period of one line in the 1920/30P is equivalent to periods of four lines in the 3840/60P. Audio clock phase data is 13 bits long (ck0 to ck12) and can specify phases of up to 8192 clocks. Therefore, phases for about sixteen lines can be specified.

Namely, phases for four or more lines in the 3840/60P can be managed. Therefore, even when audio is multiplexed using only the channel CH1, if a sample is found on any other line, the audio phase can be specified.

In case signals on two channels supported by a 10 Gbps interface are transmitted over one optical fiber, a 1.3 μm/1.55 μm two-wavelength multiplexing technology or a CWDM/DWDM wavelength multiplexing technology can be employed.

According to the foregoing second embodiment, when a 3840×2160/50P,60P/4:4:4,4:2:2,4:2:0/10,20-bit signal is mapped onto the links LinkA and LinkB of a dual-link 292 cable, the signal can be converted into serial digital data permitting a bit rate of 10.692 Gbps and transmitted. This is advantageous in that multiple channels supported by a conventionally employed 10.692 Gbps serial interface can be used for transmission.

Next, referring to FIG. 29, an example of actions of a mapping unit 11 included in the third embodiment of the present invention will be described.

Figure 29:
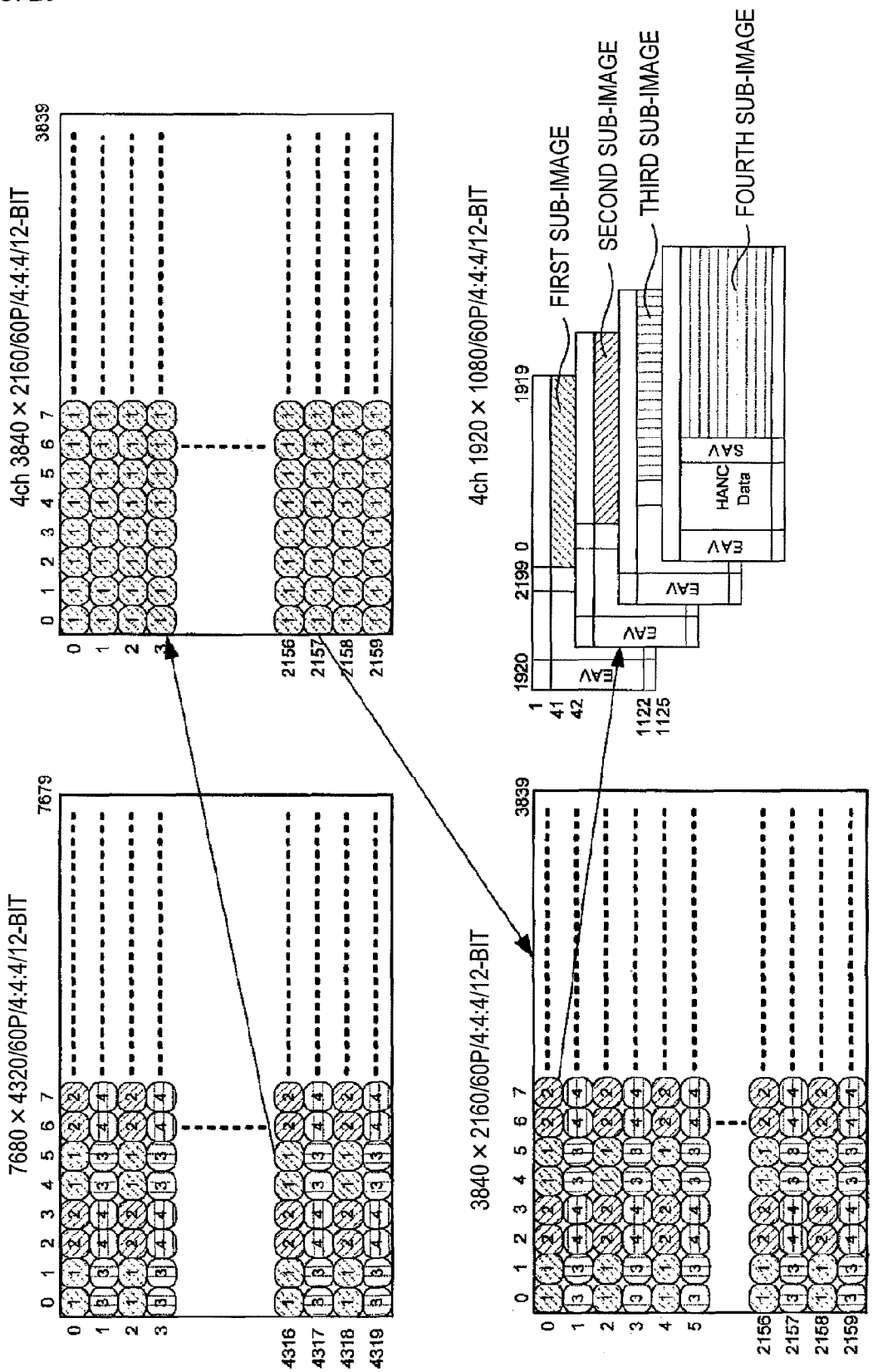
FIG. 29 is an explanatory diagram showing an example in which samples constituting a frame of a 8 k×4 k signal are mapped into one frame of a 4-channel 4 k×2 k signal.

FIG. 29 is an explanatory diagram showing an example in which samples constituting one frame of a 8 k×4 k signal are mapped into first to fourth sub-images.

In the present embodiment, the mapping unit 11 characteristically maps a 7680×4320/50P,60P/4:4:4,4:2:2,4:2:0/10, 12-bit signal into first to fourth sub-images. The other components are identical to those of the first embodiment. An iterative description will be omitted.

A broadcasting camera 1 in this example is a camera including a signal transmitting device 5 that produces a first frame, which is specified with a 7680×4320/50P,60P/4:4:4, 4:2:2,4:2:0/10,12-bit signal equivalent to a UHDTV2 signal, as a frame of a 8 k×4 k signal (an ultra-high-definition signal representing 8 k samples×4 k lines), and transmits HD-SDI signals into which the signal is mapped according to a predetermined method. A signal receiving device 6 included in a CCU 2 in this example can reproduce video of the 7680×4320/50P,60P/4:4:4,4:2:2,4:2:0/10,12-bit signal on the basis of the HD-SD signals received from the broadcasting camera 1.

The mapping unit 11 in this example is a circuit that maps a 7680×4320/50P,60P/4:4:4,4:2:2,4:2:0/10,12-bit signal into HD-SDI signals on eight channels CH1 to CH8 (channels CH1, CH3, CH5, and CH7 classified into the link LInkA and channels CH2, CH4, CH6, and CH8 classified into the link LinkB), which permit a bit rate of 1.485 Gbps, in conformity with the SMPTE435.

The 7680×4320/50P,60P/4:4:4,4:2:2,4:2:0/10,12-bit signal is thinned in units of two samples in a line direction, and samples are mapped to the second frame of four channels defined with 3840×2160/50P,60P/4:4:4,4:2:2,4:2:0/10,12-bit signals.

The 3840×2160/50P,60P/4:4:4,4:2:2,4:2:0/10,12-bit signals on four channels are further thinned in units of two samples in the line direction, and samples are mapped to active periods of respective HD-SDI signals. Thus, as shown in FIG. 16, the signals are mapped into 1920×1080/50P,60P/4:4:4,4:2:2,4:2:0/10,12-bit signals on four channels. Namely, the resultant signals can be transmitted through over a 4-channel quad-link 292 cable conformable to the existing HD-SDI.

Therefore, the 7680×4320/50P,60P/4:4:4,4:2:2,4:2:0/10,12-bit signal can be mapped to sixteen channels of quad links. Since data can be transmitted at 10 Gbps using two channels of a quad link 292, the data can be transmitted through a 10 Gbps serial interface supporting eight channels.

The first to eight channels specified in the SMPTE435 that is a 10 Gbps serial interface standard are used to transmit 48 kHz audio on up to sixteen channels (up to eight channels in case of 96 kHz audio). Therefore, 48 kHz audio can be transmitted on up to 128 channels in total (up to 64 channels in case of 96 kHz audio) can be transmitted. For multiplexing of an audio signal, the signal is sequentially embedded using the first channel of the 10 Gbps serial interface first. An audio phase conforms to the SMPTE299M, and is defined based on phase information from EAV to a 7680/60P active line defined by the formatter, and the phase of a clock of 74.25 MHz that is a ⅟₃₂ of the frequency of a clock (equivalent to 2.376 GHz) specified in the 7680/60P mode.

Now, the 1920/30P mode and 7680/60P mode will be compared with each other. A period of one line in the 1920/30P is equivalent to periods of eight lines in the 7680/60P. Audio clock phase data is 13 bits lone (ck0 to ck12) and can specify phases of up to 8192 clocks. Therefore, phases for about 32 lines can be specified.

In other words, phases for eight or more lines in the 7680/60P can be managed. Therefore, when audio is multiplexed to only one channel CH1, even if a sample is extracted from any other line, the audio phase can be specified. Incidentally, an audio phase may be deviated from the phase of a video line by lines ranging from several lines to several tens of lines, no problem occurs. Strict audio phase information is not needed.

In addition, when signals on eight channels supported by a 10 Gbps interface are transmitted over one optical fiber, a coarse wavelength division multiplexing/dense wavelength division multiplexing (CWDM/DWDM) wavelength multiplexing technology can be employed.

According to the foregoing third embodiment, when a 7680×4320/50P,60P/4:4:4,4:2:2,4:2:0/10,12-bit signal is mapped into HD-SDI signals on channels CH1 to CH8 (links LinkA and LinkB), the signal can be converted into serial digital data permitting a bit rate of 10.692 Gbps and transmitted. This is advantageous in that an 8 k signal that is a new-generation video signal deliberated by the ITU or SMPTE can be transmitted using multiple channels supported by a conventionally employed 10.692 Gbps serial interface.

Next, referring to FIG. 30, an example of actions of a mapping unit 11 included in the fourth embodiment of the present invention will be described below.

Figure 30:
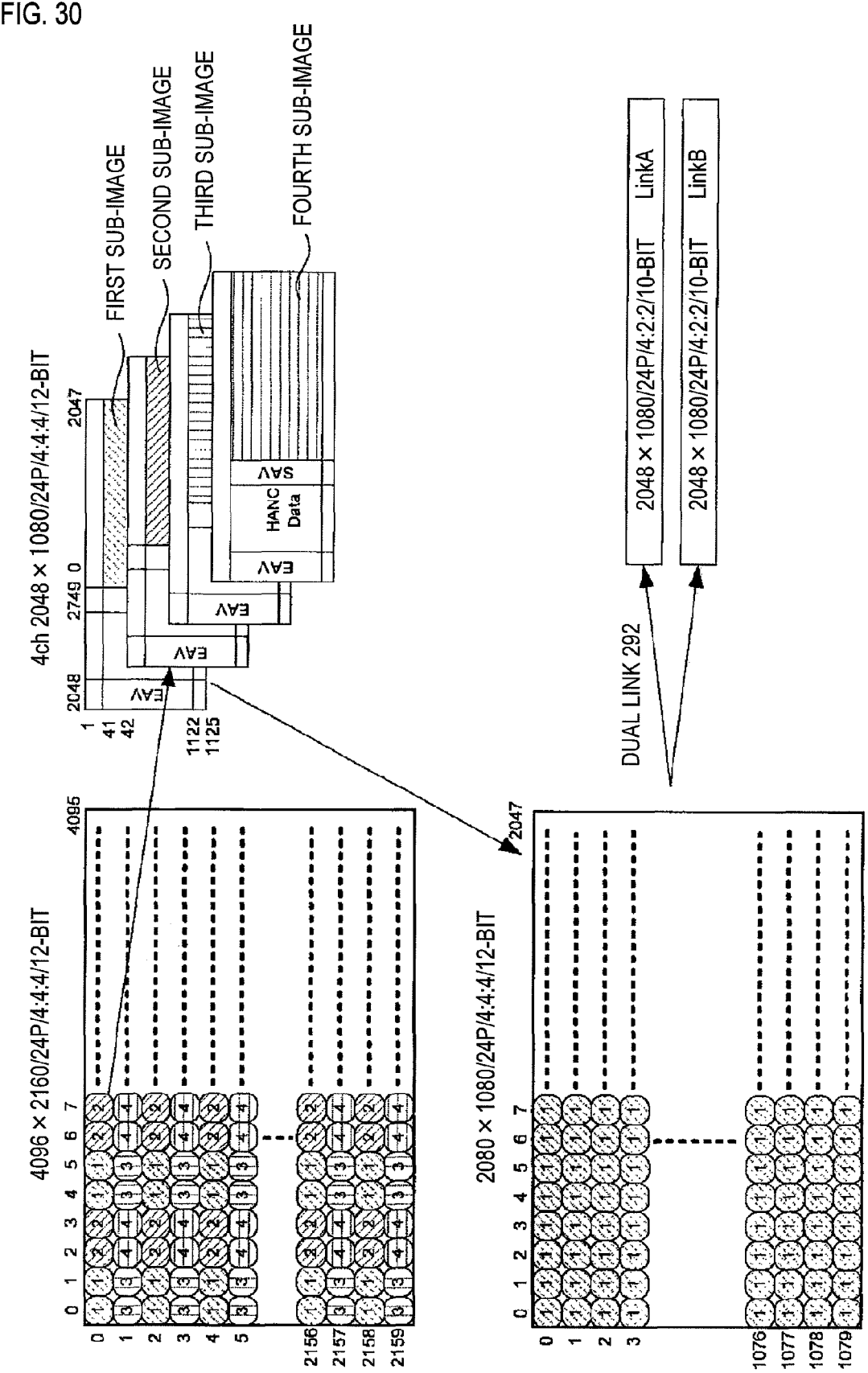
FIG. 30 is an explanatory diagram showing an example in which samples constituting a frame of a 4 k×2 k signal are mapped into first to fourth sub-images.

FIG. 30 is an explanatory diagram showing an example in which samples constituting one frame of a 4 k×2 k signal are mapped into first to fourth sub-images by the mapping unit 11.

In the present embodiment, the mapping unit 11 maps a 4096×2160/24P/4:4:4/12-bit signal into first to fourth sub-images. The other components are identical to those of the first embodiment. Therefore, an iterative description will be omitted. In addition, since processing of a signal receiving device 6 included in a CCU 2 is identical to that in the first embodiment, an iterative description will be omitted.

A broadcasting camera 1 in this example is a camera including a signal transmitting device 5 that produces a 4096×2160/24P/4:4:4/12-bit signal as a 4 k×2 k signal (an ultra-high-definition signal representing 4 k samples×2 k lines), and transmits HD-SDI signals into which the signal is mapped according to a predetermined method. The signal receiving device 6 included in the CCU 2 in this example can reproduce video of the 4096×2160/24P/4:4:4/12-bit signal as the 4 k×2 k signal (an ultra-high-definition signal representing 4 k samples×2 k lines) on the basis of the HD-SDI signals received from the broadcasting camera 1.

The mapping unit 11 in this example is a circuit that maps a 4096×2160/24P/4:4:4/12-bit signal into HD-SDI signals on eight channels CH1 to CH8 (channels CH1, CH3, CH5, and CH7 classified into a link LinkA and channels CH2, CH4, CH6, and CH8 classified into a link LinkB), which permit a bit rate of 1.485 Gbps, in conformity with the SMPTE435. Even in the present embodiment, similarly to the aforesaid first embodiment, the mapping unit 11 maps a video signal, which is allocated to a frame, into first to fourth sub-images.

Referring to FIG. 30, a concrete example will be described on the assumption that each of positions of samples contained in one frame of a 4 k×2 k signal and first to fourth sub-images is expressed as (sample number, line number).

For example, two samples at (0,0) and (1,0) in one frame of a 4 k×2 k signal are mapped into (0,42) and (1,42) respectively in the first sub-image.

Two samples at (2,0) and (3,0) in the frame of the 4 k×2 k signal are mapped into (0,42) and (1,42) respectively in the second sub-image.

Two samples at (0,1) and (1,1) in the frame of the 4 k×2 k signal are mapped into (0,42) and (1,42) respectively in the third sub-image.

Two samples at (2,1) and (3,1) in the frame of the 4 k×2 k signal are mapped into (0,42) and (1,42) respectively in the fourth sub-image.

Likewise, the other samples contained in the frame of the 4 k×2 k signal are similarly mapped into the first to fourth sub-images.

As mentioned above, the mapping unit 11 thins a 4096×2160/24P/4:4:4/12-bit signal in units of two samples in a line direction, and multiplexes the samples to active periods of HD-SDI signals. After mapping samples into 2048×1080/24P/4:4:4/12-bit signals on four channels, the mapping unit 11 maps the signals into 2048×1080/24P/4:2:2/10-bit signals on the links LinkA and LinkB. The broadcasting camera 1 can transmit the signals using eight channels in conformity with the existing HD-SDI.

According to the foregoing fourth embodiment, since a 4096×2160/24P/4:4:4/12-bit signal is mapped into HD-SDI signals on channels CH1 to CH8 (links LinkA and LinkB), the signal can be converted into serial digital data permitting a bit rate of 10.692 Gbps and transmitted. This is advantageous in that multiple channels supported by a conventionally employed 10.692 Gbps serial interface can be used for transmission.

Next, an example of actions of a mapping unit 11 included in the fifth embodiment of the present invention will be described below.

Figure 31:
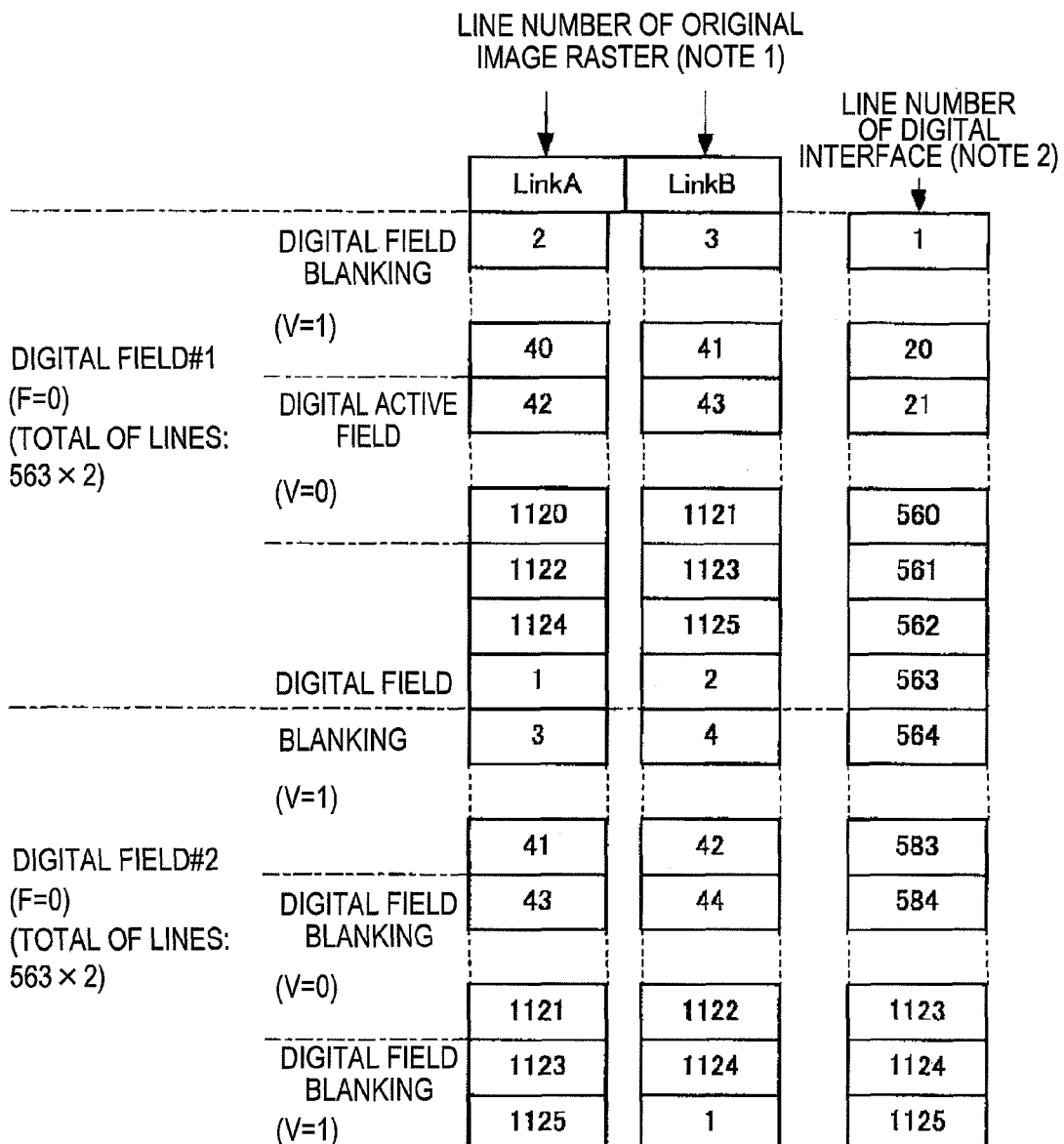
FIG. 31 is a diagram showing line numbers for a dual-link interface specified in the SMPTE372M and a package.

FIG. 2 in the SMPTE372M stipulates a method in which a 1080/60P/4:2:2/10-bit signal is transmitted over HD-SDI cables of a dual link (links LinkA and LinkB) through line-by-line thinning. FIG. 31 shows line numbers assigned to a dual-link interface specified in the SMPTE372M (FIG. 2), and a package.

In Section 6.4 in the SMPTE372M, a specification that an audio signal should be sequentially multiplexed using the link LinkA first. For example, for transmission of audio signals on eight channels, the signals are multiplexed onto the link LinkA alone. For multiplexing of audio signals on twenty channels, the signals on sixteen channels are multiplexed onto the link LinkA, and the signals on four channels are multiplexed onto the link LinkB.

Even in this case, an audio phase is determined in conformity with the 299M (see FIG. 3B). Specifically, the audio phase is defined based on phase information from EAV to a 1920/60P active line defined by the formatter, and the phase of a clock of 74.25 MHz that is a half of the frequency of a sampling clock (equivalent to 148.5 MHz) specified in the 1920/60P.

Now, the 1920/30P mode and 1080/60P mode will be compared with each other. A period of one line in the 1920/30P is equivalent to a period of one line in the 1080/60P. Audio clock phase data is 13 bits long (ck0 to ck12), and can specify phases of up to 8192 clocks. Therefore, phases for about eight lines can be specified.

In other words, phases for two or more lines in the 1080/60P can be managed. When audio on the link LinkA alone obtained through line-by-line thinning is multiplexed, even if a sample is found on any line on the link LinkB, the audio phase can be specified.

According to the foregoing fifth embodiment, since a 1080/60P/4:2:2/10-bit signal is mapped into HD-SDI signals on channels CH1 to CH8 (links LinkA and LinkB), the signal can be converted into serial digital data permitting a bit rate of 10.692 Gbps and transmitted. Namely, this is advantageous in that multiple channels supported by a conventionally employed 10.692 Gbps serial interface can be used for transmission.

Incidentally, in the aforesaid examples, the present invention is applied to a camera transmission system. A signal formatted in any of other various modes may be transmitted. The present invention can be applied to a case where various signals are transmitted.

DESCRIPTION OF REFERENCE NUMERALS

1: broadcasting camera, 2: CCU (camera control unit), 3: optical fiber cable, 5: signal transmitting device, 6: signal receiving device, 10: audio signal multiplexing unit, 11: mapping unit, 12: S/P-scrambling-8 B/10 B unit, 38-1 to 38-8: blocks of S/P-scrambling-8 B/10 B unit. 13: PLL, 14: multiplexing unit, 15: data length conversion unit, 16: FIFO memory, 17: multi-channel data construction unit, 18: multiplexing-P/S conversion unit, 19: photoelectric conversion unit, 21: S/P (serial-to-parallel) converter, 22: TRS detector, 23: FIFO memory, 24: scrambler, 25: 8 B/10 B encoder, 26: FIFO memory, 27: FIFO memory, 28: extractor, 29: K28.5 inserter, 30: 8 B/10 B encoder, 31: photoelectric conversion unit, 32: S/P conversion-multi-channel data construction unit, 33: multiplexing unit, 34: PLL, 35: FIFO memory, 36: data length conversion unit, 37: separation unit, 38: descrambling-8 B/10 B-P/S unit, 38-1 to 38-8: blocks of descrambling-8 B/10 B-P/X unit, 39: 4 k×2 k reproduction unit, 42: descrambler, 42: 8 B/10 B decoder, 43: selector, 44: FIFO memory, 45: FIFO memory, 46: P/S (parallel-to-serial) converter, 47: 8 B/10 B decoder, 48: sample data constructor

The invention claimed is:

1. A signal transmitting device that transmits an input video signal in which the number of pixels of one frame is equal to or larger than the number of pixels specified in the HD-SDI format, and an audio signal inputted synchronously with the input video signal, comprising:

a mapping unit that thins out pixel samples, which are extracted from each frame of the input video signal, in units of predetermined samples, fetches the thinned out pixel samples in equal order frame by frame, maps the samples into active periods of first, second, third, and fourth sub-images conformable to the HD-SDI format, maps the audio signal into a blanking period of the first sub-image, separates each of the mapped first, second, third, and fourth sub-images into a first-link transmission channel and a second-link transmission channel, and thus maps the sub-images into eight channels;

a parallel-to-serial conversion unit that serially converts the mapped first, second, third, and fourth sub-images; and an output unit that outputs serial digital data into which the sub-images are serially converted by the parallel-to-serial conversion unit.

2. The signal transmitting device according to claim 1, wherein the mapping unit thins out two pixel samples adjoining on the same line, maps each of pixel samples on even-numbered lines in each frame alternately to the first sub-image and second sub-image, maps each of pixel samples on odd-numbered lines in each frame alternately to the third sub-image and fourth sub-image, and nearly squares the phase of the audio signal to be mapped relative to the first sub-image, which is attained when the audio signal is mapped into the blanking period of the first sub-image, with the phase of the input audio signal relative to the input video signal.

3. The signal transmitting device according to claim 2, wherein the mapping unit maps the audio signal mapped into the first sub-image so as to assign the audio signal to either the first-link transmission channel or the second-link transmission channel.

4. The signal transmitting device according to claim 1, wherein a horizontal line in the input video signal includes a timing reference signal that represents an effective line period of the input video signal, and an auxiliary data space representing a horizontal blanking period on the horizontal line, further comprising:

an audio signal multiplexing unit that when the audio signal is an audio data packet in which first and second audio samples obtained by sampling audio data at a predetermined frequency are successively contained, multiplexes and inserts the audio data packet, which contains the first and second audio samples, into an auxiliary data space on the second horizontal line succeeding the first horizontal line including sampling points at which the audio signal is sampled, and feeds the input video signal, to which the audio data packet is multiplexed and inserted, to the mapping unit.

5. The signal transmitting device according to claim 4, wherein when the auxiliary data space succeeds a switching point, the audio signal multiplexing unit multiplexes and inserts the first audio data, which contains the first and second audio samples, and the second audio data packet, which succeeds the first audio data packet, to an auxiliary data space on the third horizontal line succeeding the second horizontal line.

6. The signal transmitting device according to claim 5, wherein the first and second audio samples are audio signals sampled at 96 kHz.

7. A signal transmitting method of transmitting an input video signal in which the number of pixels of one frame is equal to or larger than the number of pixels specified in the HD-SDI format, comprising:

mapping processing of thinning out pixel samples, which are extracted from each frame of the input video signal, in units of predetermined samples, fetching the thinned out pixel samples in equal order frame by frame, mapping the pixel samples into active periods of first, second, third, and fourth sub-images conformable to the HD-SDI format, separating each of the mapped first, second, third, and fourth sub-images into a first-link transmission channel and a second-link transmission channel, and thus mapping the sub-images into eight channels;

parallel-to-serial conversion processing of serially converting each of the first, second, third, and fourth sub-images that are mapped through the mapping processing; and output processing of outputting serial digital data into which the sub-images are serially converted through the parallel-to-serial conversion processing.

* * * * *